United States Patent
Horii et al.

(10) Patent No.: US 6,711,888 B2
(45) Date of Patent: Mar. 30, 2004

(54) GAS TURBINE

(75) Inventors: Nobuyuki Horii, Hitachi (JP); Isao Takehara, Hitachi (JP); Hidetaro Murata, Hitachi (JP); Motoaki Utamura, Hitachi (JP); Takaaki Kuwahara, Hitachi (JP); Tetsuo Sasada, Hitachi (JP); Fumiyuki Hirose, Hitachi (JP); Yasuhiro Katoh, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/855,678

(22) Filed: May 16, 2001

(65) Prior Publication Data

US 2001/0022078 A1 Sep. 20, 2001

Related U.S. Application Data

(62) Division of application No. 09/106,077, filed on Jun. 29, 1998, now Pat. No. 6,260,350.

(30) Foreign Application Priority Data

Jun. 30, 1997 (JP) .............................. 9-174667
Jun. 30, 1997 (JP) .............................. 9-174668

(51) Int. Cl.$^7$ .............................. F02G 3/00; F02C 7/00
(52) U.S. Cl. ........................................ 60/39.3; 60/39.53
(58) Field of Search ........................ 60/39.05, 39.26, 60/39.3, 39.53

(56) References Cited

U.S. PATENT DOCUMENTS

| | | |
|---|---|---|
| 3,973,391 A | 8/1976 | Reed et al. |
| 3,974,645 A | 8/1976 | Smith |
| 4,572,428 A | 2/1986 | Groff et al. |

(List continued on next page.)

FOREIGN PATENT DOCUMENTS

EP 781 909 7/1997

(List continued on next page.)

OTHER PUBLICATIONS

Boggio, "Benefits of Compressor Inlet Air Cooling for Gas Turbine Co-gener ation Plants", ASME, 95-GT-311.

(List continued on next page.)

*Primary Examiner*—Charles G. Freay
(74) *Attorney, Agent, or Firm*—Mattingly, Stanger & Malur, P.C.

(57) ABSTRACT

A gas turbine comprises a compressor for compressing a gas supplied therein and discharging the compressed gas, a combustor in which the discharged gas from the compressor and a fuel are combusted, a turbine to be driven by a combustion gas from the combustor, and a water injection unit which injects water into the gas to be supplied to the compressor, thereby lowering the temperature of the gas to be introduced into the compressor to a temperature lower than the atmospheric temperature, and causing water droplets having been injected in the gas and within the compressor to be vaporized while flowing down therein, wherein the quantity of water spray injection is controlled while monitoring operational conditions of the gas turbine.

2 Claims, 20 Drawing Sheets

U.S. PATENT DOCUMENTS

| | | | |
|---|---|---|---|
| 4,731,990 A | | 3/1988 | Munk |
| 4,773,846 A | * | 9/1988 | Munk .............................. 431/4 |
| 5,353,585 A | | 10/1994 | Munk |
| 5,454,518 A | * | 10/1995 | Munk .......................... 239/431 |
| 5,463,873 A | | 11/1995 | Early et al. |
| 5,525,268 A | | 6/1996 | Reens |
| 5,537,813 A | | 7/1996 | Davis et al. |

FOREIGN PATENT DOCUMENTS

| | | |
|---|---|---|
| JP | 56-43433 | 4/1981 |
| JP | 61-37794 | 11/1986 |
| JP | 61-283723 | 12/1986 |
| JP | 2-211331 | 8/1990 |
| JP | 5-195809 | 8/1993 |
| JP | 6-10702 | 1/1994 |
| JP | 7-97933 | 4/1995 |

OTHER PUBLICATIONS

Poletavkin, "Cycles and Thermal Circuits of Steam–Gas Turbine Installations, with Cooling of the Gas During Compression by the Evaporation of Injected Water", Institute of High Temperature, Academy of Sciences of the USSR.

Johnson, Sr., "The Theory and Operation of Evaporative Coolers for Industrial Gas Turbine Installations", Journal of Engineering for Gas Turbines and Power.

Nolan et al, "Gas Turbine Performance Improvement Direct Mixing Evaporative Cooling System", ASME 90–GT–368.

\* cited by examiner

RELATION OF WATER QUANTITY VS PARTICLE SIZE, AIR QUANTITY UNDER A CONSTANT GAS / WATER RATIO

RELATION OF INJECTION WATER QUANT. VS AUXIL. HEADERS' FEEDWATER QUANT

RELATION OF WATER QUANT. VS GAS / WATER RATIO, AIR QUANT. UNDER A CONSTANT PARTICLE SIZE

RELATION OF WATER QUANT. VS PARTICLE SIZE, GAS / MOISTURE RATIO UNDER CONSTANT AIR FLOW

A-A SECTION

B-B SECTION

REGION 1 : WATER INJECTION ALLOWABLE REGION WITH NO ICING LIMIT

REGION 2 : WATER INJECTION ALLOWABLE REGION WITH ICING LIMIT

REGION 3 : WATER INJECTION PROHIBITE REGION

POINT A : UPPER STREAM OF WATER INJECTOR 10°C RELATIVE HUMIDITY, 30%

POINT B : DOWN STREAM OF WATER 5°C RELATIVE HUMIDITY, 75%

POINT C : DOWN STREAM OF WATER INJECTOR 35°C RELATIVE HUMIDITY, 100%

GAS TURBINE

This is a divisional application of U.S. Ser. No. 09/106,077, filed Jun. 29, 1998, now U.S. Pat No. 6,260,350.

BACKGROUND OF THE INVENTION

The present invention relates to a gas turbine and a more particularly, to a gas turbine which injects water droplets into an intake air of a compressor of the gas turbine.

A conventional gas turbine is caused to drop its output in a summer season when the temperature increases, therefore, various arrangements have been proposed as a method to recover the dropped output.

JP-A Laid-Open No. 7-97933, JU No. 61-37794, or JP-A Laid-Open No. 5-195809 disclose that the intake air of the compressor is cooled.

Further, JP-A Laid-Open No. 61-283723 discloses that water is supplied from the inlet of the compressor and from the intermediate stage of the compressor in a combined system of a gasification furnace and a gas turbine.

Further, JU-A No. 56-43433 discloses that a supply port through which to supply water droplets is provided in its compressor, and JP-A No. 2-211331 discloses a gas turbine which is provided with two types of compressors of a high pressure and a low pressure, and an intermediate cooler which is provided between these two types of compressors. Still further, JP-A No. 6-10702 discloses a technique to inject water into an intermediate section between an upper-stream compressor stage and a down-stream compressor stage in a compressor group having a plurality of compressor stages in order to reduce power consumption.

However, what are disclosed by these related arts of JP-A No. 7-97933, JU No. 61-37794 or JP-A No. 5-195809 are addressed simply to dropping temperatures of intake air to be admitted into the compressor so as to be able to improve its output. JP-A No. 61-283723 merely discloses vaporization of water droplets in the compressor and utilization thereof as a medium to cool the turbine blades, and as a consequence, improvement of turbine cycle characteristics.

Further, JP-A No. 2-211331 discloses the gas turbine which is provided with an intermediate cooler which is provided between the two types of compressors of high pressure and low pressure, and wherein means for detecting a temperature and a humidity at the inlet of the high pressure compressor are provided, and a feed water flow to the intermediate cooler is controlled. However, this control does not teach nor suggest water injection into the compressor itself, and is not concerned with control of humidity at the inlet of the compressor.

In consideration of an actual operation of a gas turbine or a combined cycle using a gas turbine and a steam turbine, there is required a development of a system which can realize a safety operation of the gas turbine while always ensuring protection of the gas turbine itself, and which can improve its output and thermal efficiency using a simple arrangement.

SUMMARY OF THE INVENTION

An object of the invention is to provide a gas turbine which can realize improvements both on its output and thermal efficiency through injection of liquid droplets into intake air introduced to the inlet of the compressor using simple facilities suitable for actual application, and also a safety operating system using the same.

A first present invention is a gas turbine having a compressor for compressing an air supplied therein and discharging a compressed air, a combustor for combusting the compressed gas from the compressor and a fuel and a gas turbine to be driven by a combustion gas from the combustor, characterized by comprising an injection unit, arranged at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into the compressor with the air having been lowered in temperature are evaporated during passage through the compressor, a detection unit for detecting the humidity of air to be supplied to the compressor, and a controlling unit for controlling a quantity of water droplets to be sprayed from the injection unit on the basis of a signal from the detection unit.

For example, it is possible to control a spray quantity of the liquid droplets according to the detected signal.

The humidity of intake air at the upstream side of the injection unit, for example, is detected and a spray quantity of the liquid droplets is controlled to be more when the humidity is low than when it is high.

Further, it is preferable for the control unit to have a detection unit for detecting the temperature and humidity of air supplied to the compressor and control a spray quantity of water droplets sprayed from the injection unit on the basis of the detection signal. By detecting the temperature of air at the upstream side of the injection unit, the spray quantity of water droplets is controlled to be more at a lower temperature than at a higher temperature, and the spray quantity of water droplets is controlled to be more when the humidity of air at the upstream side of the injection unit is lower than when the humidity is higher than when low.

Further, it is possible to control the abovementioned spray quantity on the basis of output, etc. and use it as a limit value of the spray quantity on the basis of the above-mentioned detection signal. The control unit has a limit value set for a spray quantity of water droplets from the injection unit on the basis of the detection signal and controls the spray quantity to be within the above-mentioned limit value.

For example, a spray quantity of water droplets is determined according to output. In this case, the temperature of intake air at the upstream side of the injection unit is detected, the above-mentioned limit value is made higher when the temperature is lower than when high, the above-mentioned limit value is made higher when the humidity of intake air at the upstream of the injection unit is lower than when high, and a spray quantity of the water droplets is controlled (corrected) not to exceed the limit value.

Thereby, the soundness of the compressor is secured and a high output operation of the gas turbine can be executed. Since a water spray quantity is adjusted by considering the humidity of intake air when water droplets are injected into the intake air, a quantity of water droplets introduced into the compressor without evaporating until the injected water droplets reach the compressor inlet can be controlled to be a proper quantity, and a quantity of water droplets having been evaporated until they reach the compressor inlet and a quantity of water droplets having been evaporated within the compressor can be suitably controlled. Therefore, the gas turbine can be operated at a high output while securing the soundness of the plant, taking into consideration an influence on the compressor.

Thereby, it is possible to practice water injection while securing a safety operation of the gas turbine main body.

For example, when detecting means for detecting the temperature and humidity of gas at the upstream side of the compressor is provided, a water spray quantity limit value related to the temperature and humidity is set and the water quantity is controlled so that a real effective water spray quantity does not exceed the above-mentioned water spray quantity limit value during a water spraying operation, such cases can be considered that the effective water spray quantity is calculated from the humidity of gas at the compressor discharge portion and the humidity of gas at the upstream side of the injection unit and that it is calculated from a water quantity indication value of the water supply system and a drain occurrence amount in the intake air duct of the upstream side of the compressor. However, any case can be taken. The humidity of compressor discharge air can be measured by continuously drafting air into a tank for sampling which is provided with a humidity detecting means.

A second invention is a gas turbine, having a compressor for compressing an air supplied therein and discharging a compressed air, a combustor for combusting the compressed gas from the compressor and a fuel and a gas turbine to be driven by a combustion gas from the combustor, and characterized by comprising an injection unit, arranged at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into the compressor with the air having been lowered in temperature are evaporated during passage through the compressor, a detection unit for detecting the opening of a compressor inlet vane, arranged in the compressor, and a controlling unit for controlling a quantity of water droplets to be sprayed from the injection unit on the basis of a signal from the detection unit.

For example, it is possible to set a limit value of a quantity of water droplets sprayed from the injection unit on the basis of the above-mentioned detection signal and control the spray quantity to be within the limit value. It is possible to set the above-mentioned limit value to be larger when the above-mentioned compressor vane opening is larger than when small. Since a quantity of air decreases according to a change in the guide vane angle or opening, a quantity of water is decreased as well.

Thereby, it is possible to inject a quantity of water corresponding to a quantity of air at the compressor inlet at the time of partial load operation. Further, it is possible to secure the soundness of the apparatus and devices of the plant at the time of partial load operation.

There are cases such that a quantity of air introduced into the compressor is decreased by throttling the guide vane of the compressor and that the quantity of air decreases because of a rise in atmospheric temperature, however according to the present construction, it is possible to inject a suitable quantity of water according to an increase or decrease in an intake air quantity at the time of a partial load operation. It is possible to suppress a condition such as an excessive amount of water spray, and operate the gas turbine at a high output while protecting the apparatus and devices.

Further, it is preferable to detect the above-mentioned compressor inlet guide vane angle and the compressor inlet air quantity and limit the spray quantity of water droplets according to the intake air quantity. In this case, it is further preferable to have determined the water droplet spray quantity according to ratios thereof to the compressor inlet air quantity because it is possible to influence, on the water droplet spray quantity, difference between individual machines of the same kind, a decrease in a compressor intake air quantity due to aged deterioration and a scale ratio in machine kinds of similar figures.

A third invention is a gas turbine having a compressor for compressing an air supplied therein and discharging a compressed air, a combustor for combusting the compressed gas from the compressor and a fuel and a gas turbine to be driven by a combustion gas from the combustor, characterized by comprising an injection unit, arranged at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into the compressor with the air having been lowered in temperature are evaporated during passage through the compressor, and a controlling unit for controlling the injection unit so as to stop injection of water droplets from the injection unit at time of starting of the gas turbine and start injection of water droplets from the injection unit after the gas turbine has come into a rated operation.

A shift of an operation of the gas turbine to a rated operation can be detected by a prescribed opening of the compressor inlet guide vane (an opening at time of normal operation, a full opening, etc.). Further, it can be detected by coming into an operation of a constant combustion temperature.

After the shift to the rated operation, for example, when a difference occurs between a required output value and a real output value, it is possible to operate by controlling the above-mentioned water droplet spray quantity so that the real output becomes a required output.

Thereby, it is possible to provide a gas turbine with a safe output increasing mechanism by water spray while protecting the gas turbine.

Even under the condition the gas turbine is operated at a constant partial load, it is possible to control so as to execute a water spray operation. Thereby, the thermal efficiency at the time of a partial load operation can be improved.

A fourth invention is a gas turbine having a compressor for compressing an air supplied therein and discharging a compressed air, a combustor for combusting the compressed gas from the compressor and a fuel and a gas turbine to be driven by a combustion gas from the combustor, characterized by comprising an injection unit, arranged at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into said compressor with the air having been lowered in temperature are evaporated during passage through the compressor, the injection unit having a plurality of spray nozzles for spraying water droplets, and a controlling unit for controlling the injection unit so that the number of the spraying nozzles spraying water droplets more than a prescribed quantity of water droplets becomes more than the number of the spraying nozzles spraying water droplets less than the prescribed quantity of water droplets.

For example, the above-mentioned injection unit has a water supply apparatus, a water supply main pipe line for supplying water from the water supply apparatus, a water supply header distributing water supplied from the water supply main pipe to a plurality of water supply pipes, and nozzles arranged on water supply pipes in which water distributed by the header flows for spraying the water droplets, and it can be further provided with a control unit which control so that the number of water supply pipes for supplying the water when the water droplet spray quantity is larger than a prescribed amount becomes more than the number of water supply pipes supplying the water when the water droplet spray quantity is smaller than the prescribed quantity.

Further, in the case where the above-mentioned spray nozzle is a two-fluid nozzle, the spray nozzle can be arranged so as to communicate with an air supply main pipe supplying air from the air supply apparatus, an air supply header distributing the air supplied from the air supply main pipe and air supply pipes in which air distributed by the header flows.

Further, for example, the construction of the above-mentioned water supply header of the injection unit can be constructed as follows:

The injection unit comprises a water supply apparatus, a water supply main pipe supplying water from the water supply apparatus, a main water supply header distributing water supplied from the water supply main pipe to a plurality of water supply branch pipes, an auxiliary water supply header distributing water flowing the water supply branch pipes to a plurality of water supply pipes, and nozzles, arranged on the water supply pipes in which water branched by the auxiliary water supply header flows, for spraying water droplets.

Thereby, even when the spray quantity of water droplets increases and decreases, it is possible to stably spray water droplets and an operation of high output can be carried out with the stable water spray.

Further, it is possible to suppress non-uniformity in the water quantity supplied to the spray nozzles, etc.

A fourth invention is characterized by providing a water supply flow regulation valve on an upstream side of the water supply header or water supply main header and controlling a water spray quantity by the water supply flow regulation valve. Thereby, water can be supplied simultaneously to the water spray nozzles at a fixed flow rate.

Further, with respect to a control of a flow rate, it is possible to provide a feed water flow regulation valve each between a downstream side of the feed water main header and the upstream side of the feed water auxiliary headers, and control a water spray quantity by the feed water flow regulation valve according to a required water spray quantity. It also is possible to control the water spray quantity by changing the number of the operating feed water auxiliary headers according to the water spray quantity. Further, it is possible to provide a feed water regulation valve between a downstream side of the feed water main header or feed water auxiliary header and an upstream side of the spray water piping and control a water spray quantity thereby. Further, it is possible to provide a feed water flow regulation valve between a downstream side of the spray water piping and an upstream side of the spray nozzles and control the water spray quantity from the spray nozzles thereby.

A fifth invention is a gas turbine having a compressor for compressing an air supplied therein and discharging a compressed air, a combustor for combusting the compressed gas from the compressor and a fuel and a gas turbine to be driven by a combustion gas from the combustor, characterized by comprising an injection unit, arranged at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into the compressor with the air having been lowered in temperature are evaporated during passage through the compressor, the injection unit having a water supply system, an air supply system and a spray nozzle for being supplied with water and air from the water supply system and air supply system and spraying water droplets, and a controlling unit for controlling the water supply quantity and air supply quantity so as to suppress variation between a ratio of water and air supplied to the spray nozzle when the water droplet supply quantity is small and a ratio of water and air supplied to the spray nozzle when the water droplet supply quantity is large.

In this manner, an air supply quantity is controlled according to a change in a water supply quantity so that a ratio of air and water becomes constant (so that variation in the ratio is suppressed) according to a water spray quantity.

Thereby, it is possible to obtain water droplets of prescribed diameter while keeping the air quantity small (it is preferable in a case where a water quantity is relatively small). In a case where air is taken from the compressor, it is possible to supply a larger amount of air from the taken air to the combustor, and an operation of high output or high efficiency can be carried out even if the water droplet spray quantity is changed.

A sixth invention is a gas turbine having a compressor for compressing an air supplied therein and discharging a compressed air, a combustor for combusting the compressed gas from the compressor and a fuel and a gas turbine to be driven by a combustion gas from the combustor, characterized by comprising an injection unit, arranged at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into the compressor with the air having been lowered in temperature are evaporated during passage through the compressor, the injection unit having a water supply system, an air supply system and a spray nozzle for being supplied with water from the water supply system and spraying water droplets, and a controlling unit for controlling the water supply quantity and air supply quantity as to increase a ratio of water to air, supplied to the spray nozzle when a spray quantity of water droplets is more, as compared with a small spray quantity.

Thereby, it is possible to obtain water droplets of a prescribed diameter while keeping the air quantity small(it is preferable when the water quantity is relatively small). In a case where air is taken from the compressor, it is possible to supply a larger amount of air from the taken air to the combustor, and an operation of high output or high efficiency can be carried out even if the water droplet spray quantity changes.

A seventh invention is a gas turbine having a compressor for compressing an air supplied therein and discharging a compressed air, a combustor for combusting the compressed gas from the compressor and a fuel and a gas turbine to be driven by a combustion gas from the combustor, characterized by comprising an injection unit, arranged at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into the compressor with the air having been lowered in temperature are evaporated during passage through the compressor, said injection unit having a water supply system, an air supply system and a spray nozzle for being supplied with water and air from the water supply system and air supply system and spraying water droplets, and a controlling unit for controlling the water supply quantity and air supply quantity so as to increase and decrease the water supply quantity according to an increase and a decrease of a spray quantity of water droplets and maintain the air supply quantity to be constant.

Thereby, it is possible to execute a high output operation by water spray while keeping the soundness of the apparatus and devices, with a simple control.

An eighth invention is a gas turbine having a compressor for compressing an air supplied therein and discharging a compressed air, a combustor for combusting the compressed gas from the compressor and a fuel and a gas turbine to be driven by a combustion gas from the combustor, and characterized by comprising an injection unit, arranged at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into the compressor with the air having been lowered in temperature are evaporated during passage through the compressor, the injection unit having a water supply system, an air supply system and a spray nozzle for being supplied with water and air from the water supply system and air supply system and spraying water droplets, and a controlling unit for controlling the injection unit so as to start supplying of air to the spray nozzle first and then start to supplying of water to the spray nozzle, thereby to start spraying of water droplets.

A ninth invention is a gas turbine, having a compressor for compressing an air supplied therein and discharging a compressed air, a combustor for combusting the compressed gas from the compressor and a fuel and a gas turbine to be driven by a combustion gas from the combustor, and characterized by comprising an injection unit, arranged at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into the compressor with the air having been lowered in temperature are evaporated during passage through the compressor, the injection unit having a water supply system, an air supply system and a spray nozzle for being supplied with water and air from the water supply system and air supply system and spraying water droplets, and a controlling unit for controlling the injection unit so that the water droplet spraying is stopped by decreasing a quantity of air supplied to the spray nozzle first and then decreasing a quantity of water supplied to the spray nozzle.

Thereby, it is possible to secure the soundness of the apparatus and devices at a time of starting the water spray operation or at a time of stopping the water spray operation, and it is possible to provide a gas turbine which outputs a high output by the water spray operation. Further, it is possible to suppress occurrence of water droplets having an undesired diameter at the time of starting and stopping.

A tenth invention is a gas turbine having a compressor for compressing an air supplied therein and discharging a compressed air, a combustor for combusting the compressed gas from the compressor and a fuel and a gas turbine to be driven by a combustion gas from the combustor, and characterized by comprising an injection unit, arranged at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into the compressor with the air having been lowered in temperature are evaporated during passage through the compressor, and a controlling unit for controlling the injection unit so as to first issue a signal for stopping the water droplet spraying and then issue an instruction to decrease the compressor inlet guide vane opening on the basis of a gas turbine trip signal, during operation of the injection unit.

Thereby, a high output can be obtained by the water spray operation, and even if a gas turbine trip occurs during the water spray operation, it is possible to provide a gas turbine of a high safety which can effect a smooth trip, securing the soundness of the apparatus and devices.

An eleventh invention is a gas turbine having a compressor for compressing an air supplied therein and discharging a compressed air, a combustor for combusting the compressed gas from the compressor and a fuel and a gas turbine to be driven by a combustion gas from the combustor, characterized by comprising an injection unit, arranged within an intake air duct at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into the compressor with the air having been lowered in temperature are evaporated during passage through the compressor, and a controlling unit, having a plurality of air temperature detectors arranged in the duct on a peripheral direction, for controlling the injection unit so as to decrease a quantity of water spray when a deviation in detected value reaches to a prescribed value, during an operation of spraying water droplets.

Further, it is possible to control the water spray quantity so as to decrease when the a set temperature set by taking account of icing and so on exceeds a prescribed value. When the water spray quantity is decreased, it is possible to control so as to increase, according to a detection value, a flow rate of water flowing in a spray nozzle portion corresponding to a position in which a detection value changes largely by a prescribed value form an average value of the other detection values, or it is possible to decrease t he water spray quantity of the whole spray nozzles.

A twelfth invention is a gas turbine having a compressor for compressing an air supplied therein and discharging a compressed air, a combustor for combusting the compressed gas from the compressor and a fuel and a gas turbine to be driven by a combustion gas from the combustor, characterized by comprising an injection unit, arranged within an intake air duct at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into the compressor with the air having been lowered in temperature are evaporated during passage through the compressor, and a controlling unit for controlling the injection unit so as to monitor a flow rate by weight of air introduced into the compressor and decrease a quantity of water spray when the flow rate reaches to a prescribed value, during operation of spraying water droplets.

Thereby, since the change can be directly monitored, stall and icing can be precisely suppressed, whereby a gas turbine which can carry out a high output operation by water spray can be provided while keeping the soundness of the apparatus and devices.

In a case where a device for measuring an air quantity at the compressor inlet is provided and a water quantity is controlled relative to the air quantity at the compressor inlet during the water spray operation, any of the operations can be effected in one of which one arbitrary constant value is set in advance as an allowable variation range and the water quantity is decrease not to exceed the allowable variation range, in the other of which water supply is stopped when the water quantity exceeds the allowable variation range. In a case of stopping of water supply, any methods can be taken one of which is a method of stopping water supply by an operation of the feed water stopping valve of the water supply system when it exceeds the allowable variation range and other is a method of stopping the water supply by stopping the feed water pump of the water supply system.

Further, this control unit is preferable to be applied in the case where such a water spray quantity is injected that some of the quantity thereof has not been evaporated and remains as water droplets in the intake duct and the quantity of the not-evaporated liquid droplets are introduced into the compressor.

For example, the above-mentioned detection is executed at an interval of several minutes (for example, 2 to 3 minutes), and it is possible to judge after monitoring at the detection interval.

Since an air quantity decreases as the atmospheric temperature rises, in order to distinguish it from an decrease of the air quantity due to stall, it is preferable to calculate an air quantity change by detecting the air temperature.

Further, the air temperature is preferable to be detected at a compressor inlet portion (for example, between a downstream side of the injection unit and the compressor inlet).

It is possible to replace the detection of an inlet air flow rate by detection of a compressor discharge pressure by providing a detection device detecting a compressor discharge pressure on a compressor discharge air flow passage.

Alternatively, it is possible to provide means for detecting a gas turbine intake air temperature and a control unit controlling so as to inject water spray when the air temperature becomes a constant value or more. At this time, although a gas temperature at an upstream side of the injection unit and a gas temperature at a downstream side of the injection unit are considered as a gas temperature to be detected for the control, any gas temperature can be used. In a case where it is detected at the downstream side of the injection unit, it is possible to detect the air temperature at a plurality of points in the same plane in a flow direction. When the air temperature lowers than a lower limit value, a water spray injection quantity is limited according to the air temperature. Otherwise, it is possible to stop the water supply.

Thereby, a stable operation of the gas turbine can be achieved while avoiding an icing phenomenon on the compressor inlet guide vanes.

Further, by providing means for detecting the temperature and humidity of a gas turbine intake air and a calculator for calculating a wet-bulb potential temperature from the humidity, or providing means for detecting an air wet-bulb potential temperature, it is possible to provide a control unit controlling so as to inject water spray when the wet-bulb potential temperature is a constant value or more. In this case, although a wet-bulb potential temperature at a upstream side of the injection unit and a wet-bulb potential temperature at a downstream side of the injection unit are considered as a wet-bulb potential temperature used for the control, any of which can be used. In a case where the wet-bulb potential temperature lowers than a lower limit value, the water spray injection quantity can be limited according to the temperature or it is possible to stop the water supply.

Thereby, a stable operation of the gas turbine can be achieved while avoiding an icing phenomenon on the compressor inlet guide vanes.

A thirteenth invention is a gas turbine having a compressor for compressing an air supplied therein and discharging a compressed air, a combustor for combusting the compressed gas from the compressor and a fuel and a gas turbine to be driven by a combustion gas from the combustor, characterized by comprising an injection unit, arranged within an intake air duct at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into the compressor with the air having been lowered in temperature are evaporated during passage through the compressor, a detection unit for detecting the pressure of a casing wall of an inlet guide vane portion of the compressor, and a controlling unit for controlling a quantity of water spray on the basis of the detected wall pressure, during an operation of water droplet injection.

For example, the above-mentioned control unit monitors the casing wall pressure at a compressor inlet guide vane inlet and controls so as to decrease the water spray quantity when the flow rate becomes a prescribed value or more, during the water spray operation.

Thereby, it is possible to monitor the casing pressure of the compressor inlet guide vane inlet and approximate an air flow rate change thereby, whereby it is possible to easily detect a condition change, and make the output high by the water spray injection while easily securing the soundness of the apparatus and devices.

Further, other than it, it is possible to detect the pressure inside the compressor and control so as to decrease the water injection quantity on the basis of rising in the pressure more than a prescribed value. Thereby, the detecting device is easily installed and the air quantity can be easily detected.

Further, it is possible to detect a change in pressure inside the compressor and to control so as to decrease the water spray quantity when the pressure change becomes larger than a prescribed value. Thereby, it is possible to directly measure an abnormal condition and detect precisely the event.

A fourteenth invention is a gas turbine having a compressor for compressing an air supplied therein and discharging a compressed air, a combustor for combusting the compressed gas from the compressor and a fuel and a gas turbine to be driven by a combustion gas from the combustor, characterized by comprising an injection unit, arranged within an intake air duct at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into the compressor with the air having been lowered in temperature are evaporated during passage through the compressor, and a controlling unit for controlling the injection unit so as to monitor a discharge pressure of the compressor and decrease a quantity of water spray when the discharge pressure becomes less a prescribed value, during an operation of spraying water droplets.

For example, the above-mentioned control unit monitors a compressor discharge pressure and control so as to the water spray quantity when the discharge pressure becomes less than a prescribed value, during a water spray injection operation. Thereby, it is possible to rapidly detect an abnormal condition which is high in pressure level, such as icing, stall, etc. Therefore, it is possible to effect a high output operation by the water spray injection and detect early occurrence of icing, stall, etc. and maintain the soundness of the apparatus and devices.

When a means for detecting a compressor discharge pressure is provided and a water injection quantity is controlled according to the compressor discharge pressure during the water spray injection operation, a constant value is set in advance as an allowable variation range and it is possible to operate so as to decrease not to exceed the allowable variation range or to operate so as to stop the water supply when it exceed the allowable variation range.

A fifteenth invention is a gas turbine having a compressor for compressing an air supplied therein and discharging a compressed air, a combustor for combusting the compressed gas from the compressor and a fuel and a gas turbine to be driven by a combustion gas from the combustor, characterized by comprising an injection unit, arranged within an intake air duct at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into the compressor with the air having been lowered in temperature are evaporated during passage through the compressor, and a controlling unit for monitoring an adiabatic efficiency of the compressor and controlling a quantity of water spray on the basis of the adiabatic efficiency, during an operation of water droplet injection.

For example, the above-mentioned control unit monitors a compressor adiabatic efficiency and controls so as to decrease the water spray quantity when the adiabatic efficiency lowers less than a prescribed value, during the water spray injection operation.

Thereby, even if an atmospheric temperature changes, the temperature can be detected, and an icing, stall, etc. can be detected. Therefore, even if the atmospheric temperature changes, it is possible to easily protect the apparatus and devices from the icing, stall, etc. and to provide a gas turbine of high output by the water spray injection. Further, mismatching between stages inside the compressor can be detected, a further safe operation can be effected.

When a means for measuring a compressor adiabatic efficiency is provided and a water quantity is controlled according to the compressor adiabatic efficiency during the water spray injection operation, a constant value is set in advance as an allowable variation range, and any of an operation in which the water quantity is decreased not to exceed the allowable variation range and an operation in which the water supply is stopped when it exceeds the allowable variation range can be practiced.

A sixteenth invention is a gas turbine having a compressor for compressing an air supplied therein and discharging a compressed air, a combustor for combusting the compressed gas from the compressor and a fuel and a gas turbine to be driven by a combustion gas from the combustor, characterized by comprising an injection unit, arranged within an intake air duct at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into the compressor with the air having been lowered in temperature are evaporated during passage through said compressor, and a controlling unit for monitoring an exhaust gas temperature and controlling a quantity of water spray on the basis of the exhaust gas temperature, during an operation of water droplet injection.

For example, the above-mentioned control unit monitors an exhaust gas temperature and control so as to decrease the spray water quantity when the exhaust gas temperature becomes a prescribed value or more, during the water spray injection operation.

Thereby, it is possible to rapidly detect a change in event and suitably protect the apparatus and devices from an abnormal condition, and achieve a high output operation of the gas turbine by the water spray injection.

By providing a means for detecting a combustion exhaust gas temperature, when the water quantity is controlled according to the combustion exhaust gas temperature during the water spray injection operation, a constant value is set in advance as an allowable variation range and any of an operation in which the water quantity is decreased not to exceed the allowable variation range and an operation in which the water supply is stopped when it exceeds the allowable variation range, can be effected.

A seventeenth invention is a gas turbine having a compressor for compressing an air supplied therein and discharging a compressed air, a combustor for combusting the compressed gas from the compressor and a fuel and a gas turbine to be driven by a combustion gas from the combustor, characterized by comprising an injection unit, arranged within an intake air duct at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into the compressor with the air having been lowered in temperature are evaporated during passage through the compressor, and a controlling unit for monitoring vibrations of a gas turbine bearing and controlling a quantity of water spray on the basis of the vibration value, during an operation of water droplet injection.

For example, the above-mentioned control unit monitors vibrations of a gas turbine bearing and controls so as to decrease the water spray quantity when the vibrations exceeds a prescribed value, during the water spray injection operation.

Thereby, it can be directly detected that stool occurs partially in a peripheral direction, and partial stall and icing can be directly detected. It is possible to protect the apparatus and devices from abnormality by detection of partial stall and icing, and provide a high output operation of gas turbine by the water spray injection. Further, it is possible to detect suitably vibrations due to unbalance of a gas turbine rotating portion, caused by ununiformity in water droplets introduced in the compressor and carry out a high safety operation.

In a case where by providing a means for detecting vibrations of the gas turbine bearing, and the water injection quantity is controlled according to the vibrations of the bearing during the water spray injection operation, a constant value is set in advance as an allowable variation range, it is possible to effect an operation that the water quantity is decreased not to exceed the allowable variation range or an operation that the water supply is stopped when it exceeds the allowable variation range.

An eighteenth invention is a gas turbine having a compressor for compressing an air supplied therein and discharging a compressed air, a combustor for combusting the compressed gas from the compressor and a fuel and a gas turbine to be driven by a combustion gas from the combustor, characterized by comprising an injection unit, arranged within an intake air duct at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into the compressor with the air having been lowered in temperature are evaporated during passage through the compressor, and a controlling unit for monitoring a thrust bearing metal temperature of the gas turbine and controlling a quantity of water spray injection on the basis of the thrust bearing metal temperature, during an operation of water droplet injection.

For example, the above-mentioned control unit monitors a metal temperature of a gas turbine thrust bearing and controls so as to decrease the water spray quantity when the metal temperature exceeds a prescribed value, during the water spray injection operation.

Thereby, a temperature change in the thrust bearing can be detected and if an unbalance in the thrust bearing occurs, it can be surely detected. It is possible to protect the apparatus and devices from abnormality caused by the unbalance, and provide a high output operation of gas turbine by the water spray injection.

In a case where by providing a means for detecting a metal temperature of the gas turbine thrust bearing, and the water quantity is controlled according to the metal temperature of the thrust bearing during the water spray injection operation, a constant value is set in advance as an allowable variation range, it is possible to effect an operation that the water quantity is decreased not to exceed the allowable variation range or an operation that the water supply is stopped when it exceeds the allowable variation range.

A nineteenth invention is a gas turbine having a compressor for compressing an air supplied therein and discharging a compressed air, a combustor for combusting the compressed gas from the compressor and a fuel and a gas turbine to be driven by a combustion gas from the combustor, characterized by comprising an injection unit, arranged within an intake air duct at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into the compressor with the air having been lowered in temperature are evaporated during passage through the compressor, and a controlling unit for monitoring an axial flow velocity of fluid flowing in the compressor and controlling a quantity of water spray on the basis of the axial flow velocity, during an operation of water droplet injection.

For example, the above-mentioned control unit monitors an axial flow velocity of fluid inside the compressor and controls so as to decrease the water spray quantity when the axial flow velocity lowered to a prescribed value or less, during the water spray injection operation. Since it is determined irrespective of such conditions as atmospheric temperature, etc., the control can be easily carried out and a precise control can be effected with respect to this point. Further, it is possible to determine a limit value of a water spray quantity on the basis of this value and make it a control ground, whereby direct control can be effected.

Thereby, it is possible to protect the apparatus and devices from abnormality caused by an icing and so on and provide a high output operation of gas turbine by the water spray injection.

In a case where by providing a means for calculating an axial flow velocity inside the compressor, and the water quantity is controlled according to the axial flow velocity of fluid in the compressor during the water spray injection operation, although the axial flow velocity can be considered to be calculated at any stage, it is possible to calculate an axial flow velocity at the final stage of the compressor from an air quantity at the compressor inlet, a compressor discharge pressure and a compressor discharge temperature. An operation method in which a constant value is set in advance as an allowable variation range, and the water quantity is decreased not to exceed the allowable variation range and an operation that the water supply injection is stopped when it exceeds the allowable variation range are considered, however, any of the operations can be used. Further, When the water supply is stopped, although there are a method of stopping water supply by an operation of feed water shut-off valve of a feed water system and a method of stopping water supply by stopping a feed water pump, any of the methods can be used.

Alternatively, it is possible to provide a means for detecting a drain quantity in the compressor inlet air intake portion and a control unit controlling the water quantity according to the drain quantity. An. operation method in which an arbitrary constant value is set in advance as an allowable variation range, and the water quantity is decreased not to exceed the allowable variation range and an operation method in which the water supply is stopped when it exceeds the allowable variation range are considered, however, any of the operation methods can be used. The drain quantity can be detected by arranging a high level switch in the drain tank.

When the water supply is stopped, although there are a method of stopping water supply by an operation of feed water shut-off valve of a feed water system and a method and an operation method of stopping water supply by stopping the feed water pump of the feed water system, any of the methods can be used.

Thereby, since the compressor is made not to suck water droplets of large diameter, it is possible to carry out a stable operation of the compressor and gas turbine and to avoid wear of the compressor blades.

A twentieth invention is a gas turbine having a compressor for compressing an air supplied therein and discharging a compressed air, a combustor for combusting the compressed gas from the compressor and a fuel and a gas turbine to be driven by a combustion gas from the combustor, characterized by comprising an injection unit, arranged within an intake air duct at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into the compressor with the air having been lowered in temperature are evaporated during passage through said compressor, and a controlling unit for controlling said injection unit so as to increase a quantity of fuel supplied to the combustor at time of water droplet spraying, as compared with a quantity of fuel supplied to the combustor at time of stopping water droplet spraying.

Further, it is preferable to have a control unit controlling so as to increase a fuel supply quantity supplied to the combustor more than before the water spray injection starting on the basis of the water spray injection starting and decrease the fuel supply quantity less than before the water spray injection stopping on the basis of the water spray injection stopping.

Further, at the time of water spray injection also, it is preferable to provide a control unit controlling so as to increase a fuel injection amount to the combustor more when the water droplet spray injection quantity is more, than when the water spray injection quantity is small.

Further, it is preferable to control (correct or compensate) the fuel supply quantity according to the humidity.

In a case where a gas turbine exhaust gas temperature is used to control a gas turbine inlet temperature constant, a method of correcting a value detected of the gas turbine exhaust gas temperature according to the humidity quantity at the gas turbine inlet and a method of correcting a predetermined exhaust gas temperature control line according to the humidity quantity at the gas turbine inlet are considered.

Concretely, for example, it is possible to increase a fuel injection amount by correcting the exhaust gas temperature control line set based on water droplet spray not practiced toward a high temperature side during the water spray injection operation.

Alternatively, it is possible to increase the fuel injection amount by correcting a measure value of exhaust gas temperature.

In a case where detection of the humidity around the compressor is practiced at an upstream side of the compressor, a method of calculating it from the humidity of gas at the upstream side of the injection unit, water spray injection quantity from the injection unit and a drain amount occurred in the intake air duct can be considered. The detection of humidity can be practiced at the compressor discharge portion.

Thereby, an operation of the gas turbine that always keep the combustion temperature constant without influence of the water spray injection is possible and it is possible to achieve an output improving effect by water spray injection to the maximum.

Thereby, the combustion temperature is suitably corrected (for example, corrected to a higher temperature side) and a further improvement on output can be achieved during the water spray injection operation.

A twenty-first invention is a gas turbine having a compressor for compressing an air supplied therein and discharging a compressed air, a combustor for combusting the compressed gas from the compressor and a fuel and a gas turbine to be driven by a combustion gas from the combustor, characterized by comprising an injection unit, arranged within an intake air duct at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into the compressor with the air having been lowered in temperature are evaporated during passage through the compressor, a detection unit for detecting NOx concentration in the exhaust gas, and a controlling unit for controlling a quantity of water spray on the basis of the detected NOx concentration.

As compared with NOx countermeasures by water or steam spraying into the combustor, a mixing condition of water and air is better because a gas that air and water in the combustor are mixed homogeneously flows in the combustor. Therefore, it is possible realize a low NOx emission while suppressing combustion vibrations and effecting stable combustion, with a simple apparatus.

Based on a value detected of NOx concentration of gas turbine exhaust gas, a water quantity is controlled according to difference between a target NOx concentration and the above-mentioned gas turbine exhaust gas NOx concentration value, whereby it is possible to decrease the NOx concentration to the target value.

A twenty-second invention is a gas turbine having a compressor for compressing an air supplied therein and discharging a compressed air, a combustor for combusting the compressed gas from the compressor and a fuel and a gas turbine to be driven by a combustion gas from the combustor, characterized by comprising a premixer provided in the combustor for burning premixed gas formed by premixing fuel and air an injection unit, arranged within an intake air duct at an upstream side of the compressor and constructed so that water droplets are sprayed into the air to be supplied to the compressor to lower the temperature of the air to be supplied into the compressor to a temperature lower than an atmospheric temperature and the sprayed water droplets introduced into the compressor with the air having been lowered in temperature are evaporated during passage through the compressor, and a controlling unit for monitoring an adiabatic efficiency of the compressor and controlling a quantity of water spray on the basis of the adiabatic efficiency, during an operation of water droplet injection.

Further, it is preferable to control so that a ratio of fuel to air in a premixed gas becomes higher when the water spray quantity is more.

A variation in water spray quantities changes greatly a condition of fluid. However, it is possible to suppress the combustion condition becoming unstable during the water spray injection operation by the invention. Therefore, it is possible to provide a gas turbine which has a high stability of combustion and is able to carry out a high output operation by water spray injection.

Further, in stead of the above-mentioned control unit, it is possible to provide a NOx concentration detection device for detecting a NOx concentration of the combustion exhaust gas, a pressure variation detection device for detecting pressure.variation inside the combustor, and a control unit controlling so as to increase the above-mentioned water droplet spray quantity when the NOx concentration reaches to a prescribed value or more, and decrease the water droplet spray quantity when the pressure variation becomes a prescribed value or more.

Thereby, an operation that an output is made higher by the water spray injection, an emitted NOx concentration is lower and a combustion stability is higher.

Further, by providing a means for detecting the NOx concentration of gas turbine exhaust gas and the pressure variation in the combustor, it is possible to control the water spray quantity at the upstream side of the compressor so as to suppress the gas turbine exhaust gas NOx concentration and the pressure variation in the combustor within allowable values.

Further, in a case where steam or water is injected into the combustor, also, in the similar manner, it is possible to control the water injection quantity at the upstream side of the compressor and the water or steam injection quantity to the combustor so that the gas turbine exhaust gas NOx concentration and the combustor inside pressure variation during an operation of the water spray injection at the upstream side of the compressor each become within an allowable value. Thereby, it is possible to achieve a stable operation of the combustor.

Further, by providing a means for monitoring the gas turbine exhaust gas NOx concentration and the combustor inside pressure variation, it is possible to control a premixed combustion ratio so that the gas turbine exhaust gas NOx concentration and the combustor inside pressure variation each do not exceed a constant value set in advance during the water spray injection operation. Thereby, it is possible to achieve a stable operation of the combustor.

With respect to the gas turbine explained above, it is possible to make higher output of gas turbines already made and installed in addition to gas turbines newly installed. In this case, the already made gas turbines each are provided with the above-mentioned injection unit, any of the above-mentioned control units according to an object or demand, related apparatus and devices if necessary, as a gas turbine output augmenting system.

In this manner, the above-mentioned operation of each of the inventions can be achieved by providing the above-mentioned injection unit, control unit, or, further necessary related apparatus and devices even in already made gas turbines.

Further, if it is accepted that there may be some cases wherein the above-mentioned operation and effect are not sufficiently presented, instead of the above-mentioned injection unit, arranged within an intake air duct at an upstream side of the compressor and constructed so that water droplets are injected into the air to be supplied to the compressor to lower the temperature of the air to be supplied into the compressor than an atmospheric temperature and the sprayed water droplets introduced into the compressor with the air having lowered in temperature are evaporated during passage through the compressor, or in addition to the above-mentioned injection unit, the above-mentioned control unit can be employed for a system or apparatus provided with a cooling device for cooling air supplied to the compressor to increase output. The cooling device can be a device for effecting direct or indirect heat exchange with air supplied to the injection unit and the compressor, using a cold heat source such as ice, liquid air, etc.

DESCRIPTION OF EMBODIMENTS OF THE INVENTION

A first embodiment of the invention will be described with reference to FIGS. 1 and 2A and 2B.

Figure 1:
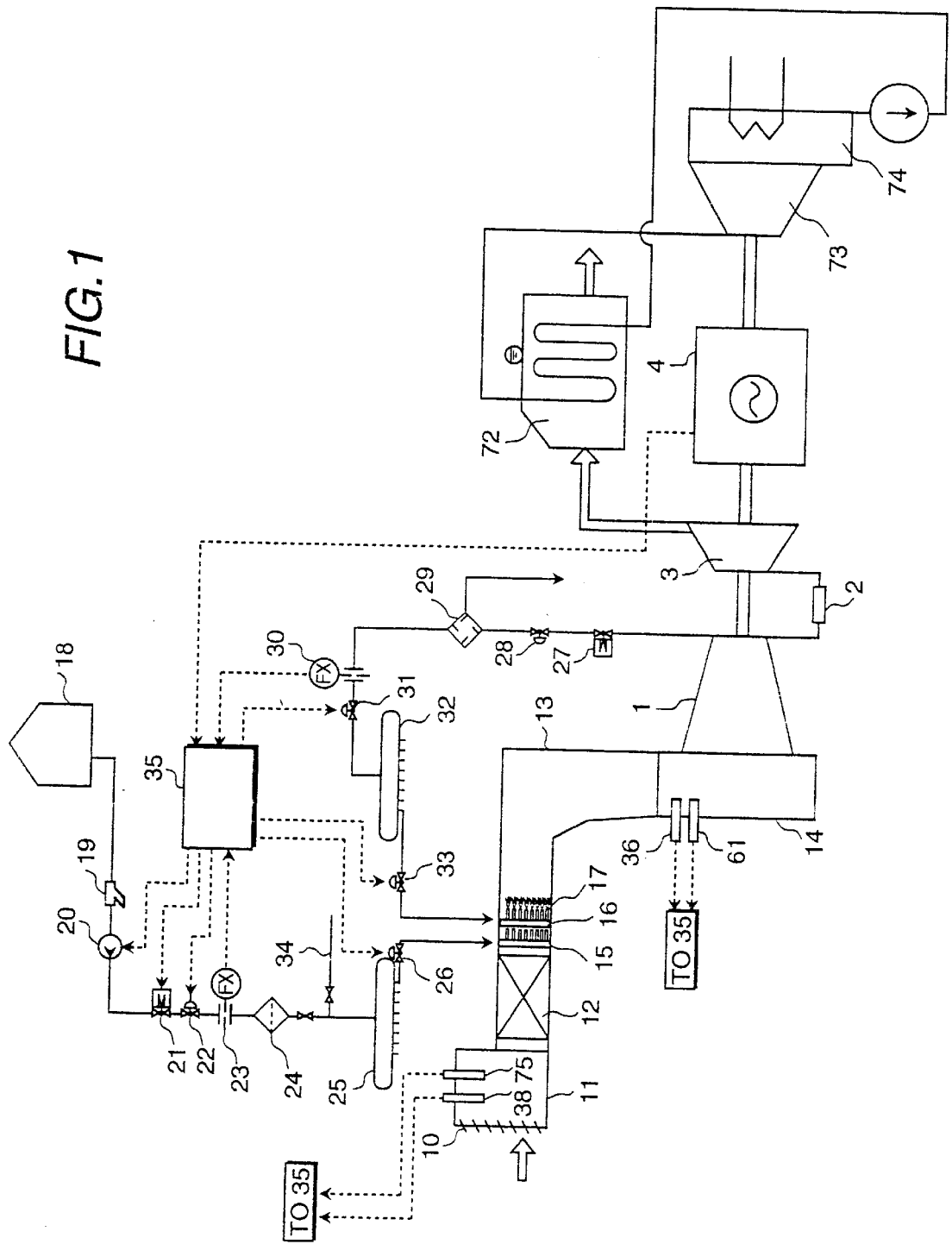
FIG. 1 is a schematic block diagram of a gas turbine of an embodiment of the invention.

A gas turbine according to this embodiment of the invention as indicated in FIG. 1 comprises a compressor 1 which compresses and discharges a gas, a combustor 2 to which the gas compressed by the compressor is supplied, a turbine 3 which is driven by a combustion gas of the combustor 2, and a generator 4 which is connected to the shaft of the turbine 3. A gas turbine exhaust gas is introduced into an exhaust heat recovery boiler 72 for heat exchange with a steam or water which becomes a working medium to drive a steam turbine 73, then it is discharged to the atmosphere. The steam turbine 73 which is driven by the steam which is heated through the heat exchange with the gas turbine exhaust gas is directly coupled with the generator 4. A steam discharged from the steam turbine 73 is cooled by a condenser 74 to be condensed into water. An air suction chamber 11 takes in air to be supplied to the compressor 1. Further, a louver 10 is normally provided in the upstream side of the suction chamber 11. The louver 10 is provided with an air filter which is installed on the side of the compressor (in the downstream side). Since the air filter is provided immediately downstream of louver 10, its illustration is omitted. An intake duct 13 is connected to the suction chamber 11 at the downstream side thereof, and a silencer 12 is installed within the intake duct. Further, within the intake duct 13, spray water piping 15, atomizing air piping 16 and a spray nozzle or nozzles 17 are provided in the downstream side of the silencer 12. The intake duct 13 is connected to a compressor intake portion 14 for introducing air into the compressor 1. Further, the spray water piping 15 and the atomizing air piping 16 are arranged as a plurality of systems. In FIG. 1, a single system is illustrated.

Spray water is supplied from a feed water tank 18 to a feed water header 25 via a foreign matter removal strainer 19, a feed water pump 20, a feed water shut-off valve 21, a feed water supply regulating valve 22, a water flowmeter 23, and a foreign matter removal filter 24. Water is supplied from the feed.water header 25 to the spray water piping 15 via a feed water header outlet flow regulating valve 26.

In a case where two-fluid spray nozzles are used, a water droplet atomizing air system becomes necessary. As a water droplet atomizing air, an air extracted from the compressor is supplied to a spray air header 32 via an air shut-off valve 27, an air pressure regulating valve 28, a foreign matter removing cyclone separator 29, an air flow meter 30 and an air flow regulating valve 31. Air is supplied from spray air header 32 to each spray air piping 16 disposed within intake duct 13.

In FIG. 1, air is indicated to be extracted from the discharge portion of compressor 1, however, it may be extracted from an intermediate stage of the compressor.

Signals of a feed water quantity and a spray air quantity measured by the water flow meter 23 the and air flow meter 30 are transmitted to a control unit 35. The control unit 35 computes a required water quantity and air quantity from operating conditions of the gas turbine itself, and controls the feed water flow regulating valve 22 and the air flow regulating valve 31. Further, through computation by comparing with the operation limits of the gas turbine itself, the control unit sends open/close operation signals to the feed water pump 20 and the feed water shut-off valve 21.

Gas turbine output augmentation according to water spray injection quantities will be explained hereunder.

Water droplets sprayed or injected from the water spray nozzle 17 each are about 10 $\mu$m by Sautor average particle diameter (S.M.D.). Water droplets sprayed from the water spray nozzle 17 are partly vaporized during flowing down within the intake duct 13 until they enter the compressor 1. The water droplets are mixed with air introduced from the suction chamber 11. Suction air including sprayed water droplets is introduced into the compressor 1 and the introduced water droplets evaporate during flowing within the compressor 1. Then, compressed air discharged from the compressor 1 and fuel are supplied to the combustor 2 and burn. Combustion gas is supplied to the gas turbine 3 and drives it. The turbine exhaust gas is introduced into the exhaust heat recovery boiler 72 as a heat source, and steam generated there drives the steam turbine 73. Detailed explanation will be given hereunder.

By introducing liquid droplets to be evaporated within the compressor 1 in which the above-mentioned mixing gas flows and by evaporation of the water droplets, it is possible to further improve an efficiency under a partial load than in the above-mentioned prior arts. When the water droplets entered into the inside of the compressor evaporate and the vaporization is completed within the compressor 1, the gas within the compressor 1 is subjected further to an adiabatic compression. At that time, a specific heat at constant pressure of water vapor has a value of approximately two-fold of that of air in the vicinity of a typical temperature (300° C.) within the compressor, therefore, there is such an advantage that, in terms of thermal capacity conversion of the vapor to air, its operating fluid is assumed to increase by an addition of air which is equivalent to twice the weight of water droplets to have been vaporized. That is, there is an effect to lower an outlet mixed gas (air and vapor) temperature of the compressor, or a temperature rise suppression effect. By vaporization of water droplets within the compressor as described above, a discharged mixed gas temperature at the outlet of the compressor is caused to drop. Since a power of the compressor is equal to a difference in enthalpies of mixed gas between inlet and outlet of the compressor, and since enthalpy of mixed gas is proportional to temperatures, when its outlet mixed gas temperature of the compressed is decreased, the power of the compressor can be reduced and an efficiency can be improved.

Assuming that a compressor inlet suction temperature is T1; a compressor outlet temperature, T2; a combustion temperature, T3; and a gas turbine outlet temperature, T4, a gas turbine efficiency $\eta$ can be approximated by the following equation:

$$\eta = 1 - (T4 - T1)/(T3 - T2).$$

Since the second term on the righthand side of equation becomes small when the compressor inlet temperature T2 lowers to T2' (<T2) by mixing and evaporation of the sprayed water, it is understood that the efficiency improves by water injection. In other words, a heat energy Cp (T4−T1) to be discharged outside a thermal engine of gas turbine does not change substantially before and after the application of the invention, however, an input fuel energy Cp (T3−T2') is caused to increase by Cp (T2−T2'), i.e., corresponding to a portion of drop in the compressor's work. On the other hand, as described above, since the portion of drop in the compressor's work is equivalent to the augmented output, all of this fuel incremental portion substantially contributes to an augmentation of output of the gas turbine. That is, an augmented output portion has a thermal efficiency of 100%.

Therefore, the gas turbine's thermal efficiency can be improved. Since the combustion temperature is kept constant, an efficiency of bottoming cycle is equal to that before application of the present invention, so that a total thermal efficiency of the combined cycle can be improved.

Further, when the particle size of the spray liquid droplets is large, the droplets impinge on blades and casing of the compressor 1 and receive heat from the metal to evaporate, so that an effect of reducing the temperature of working fluid may be prevented. Therefore, from this point of view, the liquid particle size is preferable to be small. The spray liquid droplets have a distribution of particle size. From the point of view of suppressing impingement on the blades and casing of the compressor 1 and preventing the blades from erosion, main sprayed liquid size is made into a diameter of 50·m or less. From a point of view of making less an influence of action on the blades, it is preferable to be a maximum particle diameter of 50·m or less.

Further, liquid particles of finer particle size can be distributed uniformly in intake air and suppress occurrence of a temperature distribution within the compressor 1. From this point of view, the particle diameter is preferable to be 30·m or less by Sautor average particle diameter (S.D.M.). Since liquid droplets jetted from the spray nozzle have a distribution of particle size, it is not easy to measure the particle size by maximum diameter. Therefore, practically, the size measured by the above-mentioned S.D.M. is used. The particle size is preferable to be small, however, since a high precision manufacturing technique is required for the spray nozzle making fine liquid droplets, a lower limit that the particle size can be minimized technically is a practical range of the particle size. Therefore, for example, a lower limit in the above-mentioned main particle size, the maximum particle size or the average particle size is 1·m. Further, the finer the particle size is made, the larger the energy for making particles of such sizes becomes, so that the lower limit can be determined considering the energy used for production of fine particles. Water droplets of such a size that they float in the air and are difficult to drop have a good condition of contact surface in general.

Air passes through the compressor 1 for a small time, and from the point of view that liquid droplets are caused to be well evaporated for this time and an evaporation efficiency is raised thereby, S.D.M. is preferable to be 30·m or less.

Further, since a spray nozzle for making small diameter liquid droplets requires a manufacturing technique of high precision, a limit that the droplets can be made small becomes a lower limit of the particle size or diameter. For example, it is 1 $\mu$m.

When the size of liquid droplets is too large, it is difficult for the liquid droplets to be evaporated well in the compressor 1.

The quantity of introduced liquid particles can be adjusted according to a temperature, a humidity or an extent of output augmentation as described later. For example, 0.2 wt % or more of a suction air flow rate by weight can be introduced, taking into consideration an evaporation quantity of sprayed water droplets evaporating during flow from a spraying position to the compressor inlet. An upper limit of introduced water droplets is determined from a point of view of maintaining well the function of the compressor as described later. For example, the upper limit is determined to be 5 wt % and an introduction range of quantity of water droplets can be determined to be that value or less.

In the intake duct 13, a quantity of air taken in the gas turbine is increased by cooling the intake air and making the density of the air higher. Inside the compressor 1, compressed air is cooled and the power for the compressor 1 is decreased. Further, a working fluid for the turbine increases by evaporating water droplets within the compressor 1.

Therefore, since the power for the compressor 1 can be decreased while increasing a turbine shaft output, a high output in the turbine can be obtained. Further, it can contribute to an improvement of the efficiency.

When a water spray quantity from the spray nozzle 17 is increasing, at first (as a first stage) a compressor inlet air quantity increases as a compressor inlet temperature lowers, whereby an output increases. When a water spray quantity is being increased further, as a second stage, an increasing rate of an output augmentation ratio changes, the power for the compressor decreases due to lowering of a compressor inside temperature, and the output has a tendency to increase by an increase of a gas turbine working fluid due to evaporation of water droplets.

This output augmenting method of the invention can be applied not only to the combined cycle of the gas turbine and the steam turbine as indicated in FIG. 1, but also to a power plant having a single gas turbine.

Further, the sprayed water is not limited to pure water, and any mixture solution with anti-freezing solution or alcohol such as methanol, when the atmospheric temperature is low, or with other materials may be used.

When a gas turbine output is increased by water spray, a water spray quantity is within a range in which evaporation of the injected water droplets is completed at an upstream side of the compressor, and water droplets are not introduced inside the compressor 1, whereby output augmentation can be effected only by lowering of the compressor inlet temperature. In this case, only an output increase until the above-mentioned first stage can be obtained. When the atmospheric temperature is low or the atmospheric humidity is high, since an evaporation quantity of water droplets within the intake duct at the upstream side of the compressor is small, an output augmentation amount is small, however, a gas flow in the compressor is not deviated from a design flow condition and a stable operation of the compressor can be carried out.

Further, when an output of the gas turbine is increased by water spray, a spray nozzle 17 is provided at an inlet of the compressor 1 as in the compressor intake portion 14, in the downstream side of the intake duct 13, almost all quantity of the sprayed water is introduced in the compressor 1 at a condition of water droplets, and the water droplets are evaporated during flowing within the compressor, whereby the heat of ambient air is absorbed, the temperature within the compressor is lowered and the power for the compressor is decreased. The output augmentation also can be carried out thereby. In this case, an output augmentation amount is smaller by such an amount that an output increase can be obtained by lowering the compressor inlet temperature, and the output increase can be achieved by an action of water droplets within the compressor. In this method, a control is simple because the water spray conditions are not related to the atmospheric humidity, and the number of the spray nozzles can be reduced because the water droplet size can be relatively large. Therefore, this can be achieved by the most simple equipment as a gas turbine output augmenting mechanism by water spray.

Figure 2A:
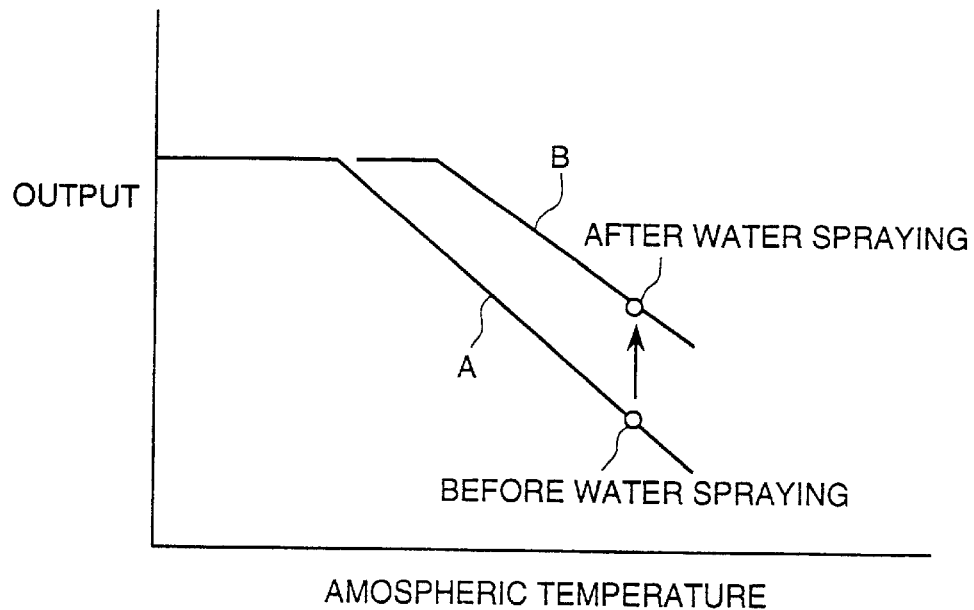
FIG. 2A is a diagram indicating gas turbine output characteristics versus atmospheric temperatures.

In this time, as indicated by line A in FIG. 2A, under normal operation without application of water spray, outputs of the gas turbine decline as shown by a line A in FIG. 2A since the air quantity at the inlet of the compressor which is the working medium decreases with an increase of the atmospheric temperature. Here, in order to recover the drop of the gas turbine's output, when water is sprayed in the upstream side of the compressor 1, a resultant gas turbine output increases with respect to a same atmospheric temperature as indicated by line B in FIG. 2A. As a method of water injection, by predetermining line B, until an output of the generator 4 arrives at an output value required for a given atmospheric temperature, the control unit 35 sends an open operation signal to the feed water flow regulating valve 22 to increase its water spray quantity. At the same time, in order to maintain atomized particle sizes constantly, the control unit also sends an open operation signal to air flow regulating valve 31 in proportion to an increases water quantity to increase the injection air.

Figure 2B:
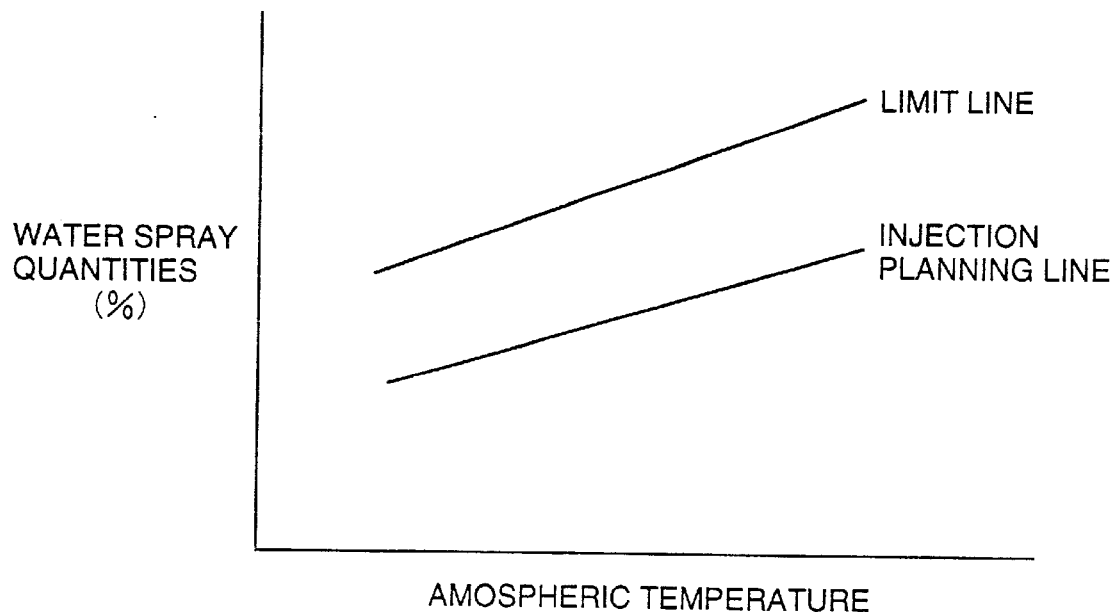
FIG. 2B is a diagram indicating water injection quantities versus atmospheric temperatures.

Alternatively, as indicated in FIG. 2B, by determining an injection planned quantity line having a predetermined margin with respect to a water droplet limit quantity line which has been set relative to atmospheric temperatures and humidities, water is sprayed corresponding to the injection planned quantity. In this case where a water droplet spray limit quantity (limit line) and a planned injection quantity are indicated, a gas turbine output has an augmentation value corresponding to the atmospheric temperature and humidity during operation and the injection water quantity.

Also, output characteristics of FIG. 2A and quantities of water injection (water spray) of FIG. 2B may be set with respect to the inlet temperatures of the compressor. In the case they are set up with respect to the atmospheric temperature, the temperature detector 38 and humidity detector 75 provided in the upper stream of the water injection unit as indicated in FIG. 1 will be used. In the case they are set up with respect to the inlet temperature of the compressor, the temperature detector 36 and humidity detector 61 which are provided between the down stream of the water injection unit and the upper stream of the compressor are used. In order to improve precision of measurements, detection at a plurality of points may be made.

Further, in shift to a normal operation (for example, a rated operation) of the gas turbine from starting by raising the r.p.m. of the gas turbine and increasing a turbine load from a partial load operation, an output augmentation by water spray at the upstream side of the compressor 1 is carried out by stopping the water spray injection in a time from the starting to the load raising, and starting the water spray after shifting to the normal operation.

For example, water spray from the water spray nozzle 17 is stopped during the time from starting of the gas turbine to a partial load operation, and the water spray is practiced by detecting the condition that the gas turbine reaches an operation of a constant combustion temperature under the conditions that the compressor inlet guide vanes are fully opened and the combustion temperature becomes maximum.

Alternatively, the water spray is stopped by detecting the compressor inlet guide vane opening until the inlet guide vanes reach to an opening at a normal operation from starting, and the water spray from the spray nozzle 17 is started when the inlet guide vanes reach the opening at the normal operation. Thereby, misfire at the time of starting is prevented and the starting of high stability is carried out. Further, a starting time of the gas turbine in which a water spray operation is carried out can be shortened.

Otherwise, in a case where in a gas turbine which comprises a compressor 1, a combustor 2 and a turbine 3, and is provided with a spray nozzle 17 for water spray injection as mentioned above, the above-mentioned combustor 2 has a pilot burner for diffusion combustion of fuel and a main burner for premixed combustion of a premixture of fuel and an oxidizer such as air, after the gas turbine has reached a rated r.p.m. at the time of starting, water spray injection is started at a predetermined quantity by the spray nozzle 17 before a load is output, and it is possible to effect a combustor operation by the pilot burner and then start a load operation by the main burner. And it may be possible to increase to a rated load. Further, in a case where a plurality of main burners are provided, it is preferable to conduct the water spray injection even at the switching time at which the number of the burners used is increased, or the like.

By controlling the spray nozzle 17 in this manner, even in the gas turbine which is designed to be low in NOx concentration during normal operation, it is possible to suppress occurrence of NOx at the switching time from the pilot burner by which NOx may occur temporarily at the stating time to the main burner. Therefore, it is possible to execute low NOx combustion. Additionally, since the water spray injection is started before a load is output, it is possible to stably and smoothly increase the load.

Alternatively, it is possible that the water spray injection is started at a predetermined quantity by the spray nozzle 17 after an operation by the pilot burner starts to output a load, and then it is shifted to a load operation to output a load by igniting the main burner, and so on. Thereby, even with a gas turbine which is designed to be low in NOx concentration during normal operation, it is possible to suppress occurrence of NOx at the switching time from the pilot burner by which NOx may occur temporarily at the starting time to the main burner. Therefore, it is possible to execute a low NOx operation even at the time of starting. Additionally, since the water spray is injected before using the main burner after starting to output a load by the pilot burner, it is possible to surely generate pilot flame and increase a load.

Further, it is preferable for the spray nozzle 17 to provide a Si strainer or Ca strainer for capturing Si or its compounds, or Ca or its compound in feed water in the spray water piping 15. It is more preferable to provide a strainer for capturing Si and Ca and their compounds. It also is possible to remove foreign matter in the make-up feed water tank 18, and to construct the above-mentioned foreign matter removing filter 24 to be the above-mentioned strainer for the Si, Ca, etc. Thereby, it is possible to suppress a decrease in efficiency of the gas turbine according to time passage, which decrease is caused by introduction of water droplets into the compressor, which droplets include fine Si, Ca, etc. included in feed water and are injected from the spray nozzle 17, and by adhesion and accumulation of Si, Ca, etc. on the compressor blades, etc. The provision of the strainer can contribute to maintaining of the efficiency of gas turbine.

Alternatively, feed water is caused to be supplied to the spray nozzle 17 through a desalting apparatus and the Si strainer or Ca strainer. For example, it is preferable to cause feed water to be supplied to the spray nozzle 17 after purifying the feed water in the desalting apparatus, and then further purifying it in the Si strainer or the Ca strainer. The desalting apparatus removes Na, etc. in the feed water, and the strainer captures and removes Si, etc. which is difficult to dissolve in the water.

For example, it is considered to provide the Si strainer and/or the Ca strainer with a filter of mesh which captures Si or its compounds of 1 $\mu$m or larger and causes Si, its compounds of smaller than 1 $\mu$m to pass through. Taking account of a stable operation of the gas turbine for a long time, it is more preferable to provide a filter of mesh capturing of Si, its compounds of 0.3 $\mu$m or larger and passing through of them smaller than the size.

A second embodiment of the invention will be described with reference to FIGS. 1 and 3.

In the second embodiment, a water spray quantity is controlled according to an opening of inlet guide vanes of the compressor 1. Concretely, a water spray quantity is made more when the compressor inlet guide vane opening is larger than when small.

The present embodiment has basically the same construction as the first embodiment. The second embodiment is provided with a control unit in which signals of opening of the compressor inlet guide vanes are inputted in the control unit 35 and a water spray quantity is controlled according to the signals, in addition to the construction of the first embodiment.

Figure 3:
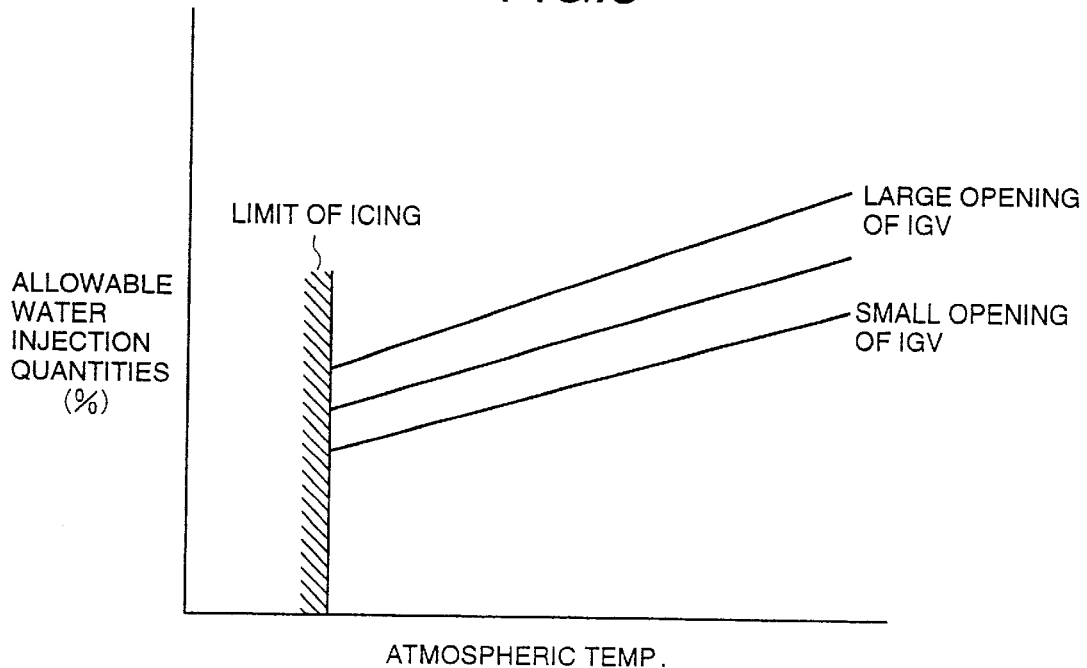
FIG. 3 is a diagram indicating allowable water injection quantities relative to atmospheric temperatures and angles of compressor inlet guide vanes (IGV)

FIG. 3 shows planning lines for water injection (spray) quantities controlled according to atmospheric temperatures, in which its water spray quantity is controlled so as to differ according to openings of the inlet guide vanes of the compressor.

In this embodiment, its water spray injection is executed when the opening of its inlet guide vanes of the compressor is at an intermediate opening, namely, under a partial loading condition. According to a power demand from the plant, a partial load operation with the load being kept constant is considered. In this case, by water spray by the spray nozzle 17 at the upstream side of the compressor 1, power for the compressor 1 is reduced and a working fluid for the turbine 3 increases, whereby the same load operation can be maintained with a smaller amount of fuel. That is, a thermal efficiency at a partial load can be improved by the water spray.

In the case of intermediate openings of the compressor inlet guide vanes, a spray quantity also is decreased proportionally to a decrease in a compressor inlet air flow rate. For example, a ratio of the water spray quantity to a compressor inlet air quantity is set or corrected, corresponding to an angle of the compressor inlet guide vanes, independently of a rated load operating condition. Thereby, a stable operation can be executed according to changes in characteristics of the compressor and turbine from a partial load operating condition to a rated load operating condition.

FIG. 3 indicates that a larger ratio of water spray quantity can be applied in the case of a larger opening of the compressor inlet guide vanes, however, since it depends on the types of gas turbines and the characteristics and operation methods of the combustors mounted thereon, it may be set so that the characteristics of each component of individual type of machines are reflected.

Further, a water spray quantity of the spray nozzle 17 is controlled on the basis of output, atmospheric pressure, etc, the spray quantity may be controlled so as not to exceed a limit value based on the compressor inlet guide vane openings. For example, in the case of control of water spray quantities based on the atmospheric pressure, a water spray quantity for each compressor inlet guide opening in FIG. 3 is set as a water spray limit quantity of FIG. 2B, and water spray injection planned line with a prescribed margin can be set. In an actual operation, when a water spray quantity limit value is determined, the control unit 35 sends signals controlling the openings of the feed water regulating valve 22 and the atomizing air flow adjusting valve 31 so that the really effective water spray quantity does not exceed the limit value.

Thereby, in the case of control based on the water spray injection planned line, even if a rapid increase in the spray quantity occurs because of a rapid load change or for any other reasons, the gas turbine itself can be protected by using the water spray quantity limit line.

A third embodiment of the present invention will be described hereunder, referring to FIGS. 1, 2A, 2B, 4, 5A, 5B and 6.

In the present embodiment, a water spray quantity from the spray nozzle 17 is controlled on the basis of the atmospheric temperature and humidity. Concretely, a water spray quantity is made more when the atmospheric temperature is higher than when low and the water spray quantity is made larger when the humidity is lower than when high.

Figure 4:
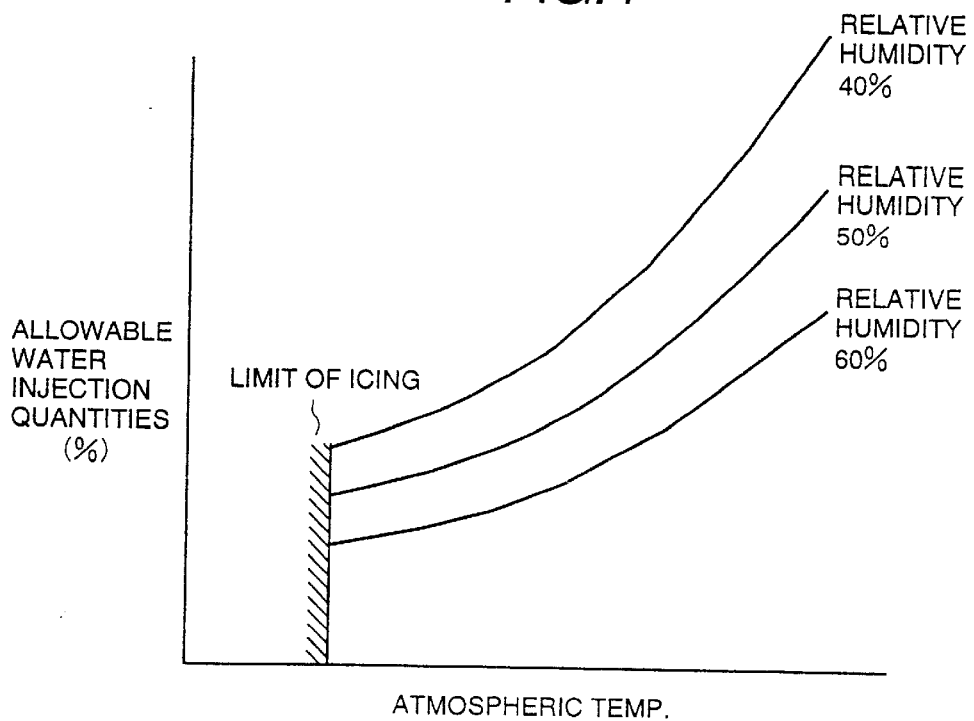
FIG. 4 is a diagram indicating allowable water injection quantities relative to atmospheric temperatures and relative humidities.

The present embodiment has basically the same construction as the first embodiment. The present embodiment is provided with a temperature detecting device 38 and humidity detecting device 75 at the upstream side of the spray nozzle 17, for example within the intake chamber 11, in addition to the construction of the first embodiment. Signals from the detectors are input in the control unit 35 and a water spray quantity of the water spray nozzle 17 is controlled according to the signals. FIG. 4 indicates a water spray quantity limit line with respect to the atmospheric temperature and humidity.

In a method of water spraying, a B line in FIG. 2A has been set in advance, and a water spray quantity is increased until a required output is output. However, in a case where an extent of aged deterioration due to contamination of the compressor of the gas turbine itself is large, and a case where a difference between individual machines, caused by machining tolerance in the same kind of machines is large, in order to take out of outputs of the B line, a lot of water is needed to be injected. When an excessive amount of water is injected into the gas turbine, a condition of flow in the compressor is deviated from a designed flow condition, a margin for surging decreases and an unstable operation of the combustor is caused. Therefore, it is protected by the water injection limit line determined according to the atmospheric temperature and humidity, indicated by FIG. 4. In this case, in a case where the above-mentioned aged deterioration and difference between individual machines are large, a water spray quantity may reach the water injection limit line before an output reaches the output of the B line, so that a target output. can not be obtained, however, the gas turbine is protected from water injection of an excessive quantity.

Further, in a water spray method, in the case where a planning water injection quantity has been determined in advance with respect to the atmospheric temperature, as shown in FIG. 2B, also, the gas turbine itself can be protected with respect to a rapid increase due to any reasons.

As shown in FIG. 4, the water spray quantity limit line is determined according to the atmospheric temperature and humidity. As items limiting a spray quantity, there may be a water droplet quantity introduced inside the compressor, a quantity of humidity introduced in the combustor, a compressor inlet temperature, a pump capacity in the feed water system, designed pressure of the feed water piping, a feed water apparatus supply capacity, etc. The pump capacity of the feed water system, the designed pressure of the feed water piping, the feed water capacity, etc. of them are not referred to because usually, their capacities are assumed to have been studied sufficiently at the time of design. Therefore, as restricting conditions given by the gas turbine itself, a water droplet quantity introduced into the compressor, a humidity quantity flowing into the combustor and a compressor inlet temperature are totalized to determine the water spray quantity limit line as indicated in FIG. 4.

The water droplets introduced inside the compressor are evaporated during flow-down inside the compressor, whereby heat is absorbed from the ambient air and the temperature inside the compressor is lowered. Since a decrease in temperature increases the density of the air, axial flow velocity inside the compressor decreases, a velocity triangle is deviated from a designed point at the downstream stage. During usual operation, the axial flow velocity of compressor after stage decreases when the atmospheric temperature is low. Therefore, an operating condition inside the compressor changes, by water spray, to a condition close to the condition of normal operation at a low atmospheric temperature without water spray. Therefore, when the atmospheric temperature is low, an operating condition within the compressor has exceeded an inherently allowable design range by water injection of a small quantity, on the contrary, when the atmospheric temperature is high, a water spray quantity can be increased. An operating condition deviated from a design point in this manner is called as mismatching within the compressor, it has reduced a margin for surging. Since the mismatching within the compressor is caused by evaporation of water droplets within the compressor, a quantity of water droplets having been not evaporated in the intake duct 13 and having entered the inside of the compressor cause a problem, and the mismatching is not influenced by compressor inlet humidity due to water evaporated in the intake duct 13. However, a quantity of evaporation of water droplets in the intake duct 13 is determined by the atmospheric temperature and humidity, and a compressor inlet temperature is determined by the quantity of evaporation of water droplets in the intake duct. Further, an allowable quantity value of water droplets introduced into the compressor is determined by the compressor inlet temperature, so that finally, a water spray quantity limit line with respect to the compressor is determined by correlation of the atmospheric temperature and humidity.

On the other hand, a quantity of humidity flowing in the combustor causes an unstable operation. Further, since the temperature of an air flowing in the compressor decreases by evaporation of water droplets within the compressor, when the gas turbine is operated at the same temperature, a quantity of injected fuel increases and backfire of flames becomes easy to occur. Therefore, since all quantity of humidity flowed in the combustor influences on an operation of combustor, a water spray quantity limit line with respect to the combustor is determined by correlation of the atmospheric temperature and humidity.

A compressor inlet temperature may cause an icing phenomenon at the compressor inlet when the atmospheric temperature is low such as in winter season, icing occurrence is determined by the atmospheric temperature and humidity.

The water spray quantity limit line is set by associating or synthesizing the above-mentioned matters. However, according to types of gas turbines, considered are the case where the characteristics of the compressor are influential over all over operational atmospheric temperatures, the case where the characteristics of the combustor are influential on the contrary, and the case where the characteristics of the compressor are influential when the atmospheric temperature is low and the characteristics of the combustor are influential when the atmospheric temperature is high. In any of the cases, the water spray quantity limit line is determined by the atmospheric temperature and humidity.

After the water spray quantity limit line is determined based on the atmospheric temperature and humidity at the time of a gas turbine operation, the control unit 35 of FIG. 1 sends signals controlling openings of the feed water regulating valve 22 and the atomized air flow regulating valve 31 so that a real effective water spray quantity does not exceed the limit value.

An effective water quantity is a water spray quantity obtained by subtracting a quantity of drain occurred in the intake duct 13 from a quantity of water sprayed in the intake duct 13 at the upstream side of the compressor 1. The effective water quantity is indicated by Gw3 in FIG. 5B. Further, a water quantity evaporated within the intake duct 13 of the effective water quantity Gw3 is Gw2. A remaining water quantity Gw1 is introduced into the compressor in form of water droplets. In a wet-air diagram of FIG. 5B, for example in a case where a condition of the compressor inlet before water spraying is a point A, a water droplet quantity corresponding Gw2 is evaporated within the intake duct by water spraying to lower a temperature of the ambient air, and the condition of the compressor inlet shifts to a point B. When the water spray quantity is increased further, a quantity Gw1 of water droplets which have not been evaporated is introduced into the compressor.

Figure 6:
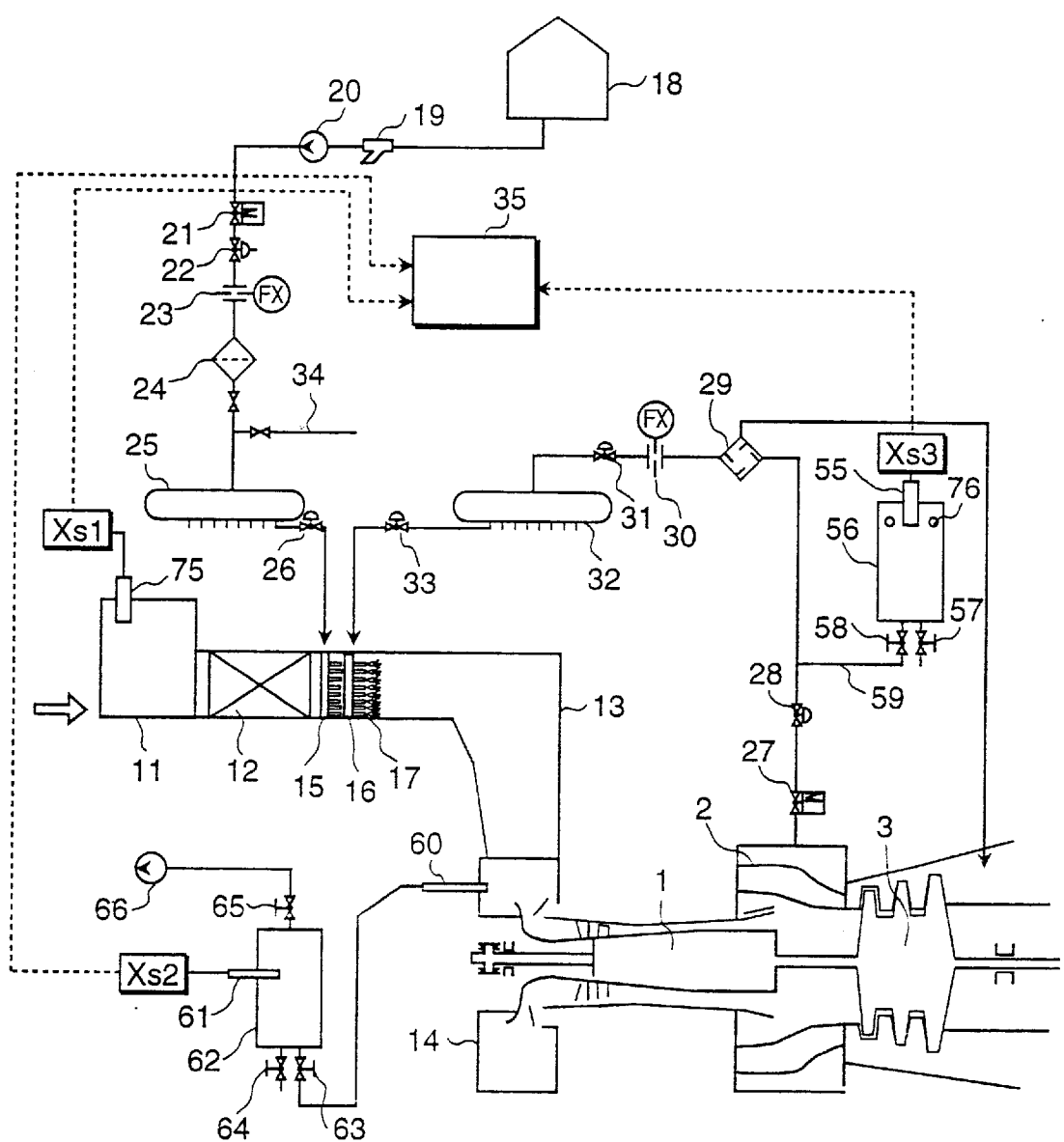
FIG. 6 is a schematic block diagram of a gas turbine of another embodiment of the invention.

Therefore, the effective water spray quantity can be calculated from an indication value Xs3 of a humidity detection device 55 for a compressor discharge air, an indication value Xs1 of a humidity detection device 75 at the upstream side of the injection unit upstream of the compressor, as shown in FIG. 6. The indication value of the humidity detection device may be relative humidity, however, by setting the device so as to put out absolute humidity, an effective water spray quantity can be calculated only by subtracting an indication value Xs1 of the humidity detection device 75 upstream of the injection unit from an indication value Xs3 of the humidity detection device 55 for compressor discharge air. Humidity detection signals are sent to the control unit 35 and an effective water quantity Gw3 is calculated.

Referring to FIG. 6, an example of the humidity detector will be explained hereunder.

In the case where a discharge air from the compressor is used for water atomizing spray air, the piping branches at the downstream side of the air shut-off valve 27 and an air pressure regulating valve 28. A branch pipe 59 is connected to a sampling tank 56 for measuring absolute humidity at the bottom. A flow adjusting valve 58 mounted on the branch pipe adjust a sampling air so that an ambient temperature of the humidity sensor 55 does not rise above a durability temperature. Considering the case of occurrence of drain, a drain discharge valve 57 is provided on the lower side of the sampling tank 56. Air supplied to the sampling tank 56 rises in the tank to reach a ventilation hole 76. The above-mentioned humidity sensor 55 is inserted to the position of the ventilation hole 76 so that supplied air always contacts with the humidity sensor 55. During an operation, air is always continuously flowed into the sampling tank 56 under this condition and measure. Further, in the case where extraction air from the middle stage of the compressor is used as water atomizing spray air, a measuring pipe may be connected to the discharge casing of the compressor or a combustor mounting casing for directly measuring humidity.

Further, an effective water spray quantity may be calculated by subtracting a quantity of drain in the intake duct from an indication value of the water flow meter. In this case, practically, it is difficult to detect instantaneous values of the drain quantities occurred in the intake duct, so that usually an integrated value is detected. Therefore, it is effective in the case where a continuous operation is effected for 1 to 2 hours under the same condition in gas turbine performance test, etc. and the performance is detected by time-averaging the value. However, it is not suitable for monitoring gas turbine operating conditions. In order to solve this problem, it is carried out by making a function of a drain quantity occurred in the intake duct to a water spray quantity in advance. For example, such a function is formed that a drain occurrence quantity increases as a water spray quantity increase.

A fourth embodiment of the invention will be described hereunder, referring to FIGS. 1, 5A, 5B and 6.

In the present embodiment, a water droplet quantity from the water spray nozzle 17 is controlled on the basis of the temperature of an inlet air entering the compressor. Concretely, for example, a water spray quantity from the water spray nozzle 17 is made more when the compressor inlet temperature is higher than when low. Alternatively, a limit value of water spray quantity is made variable so as to become higher when the compressor inlet temperature is higher than when low.

Further, by inputting the compressor inlet temperature, compressor discharge humidity and humidity of compressor discharge air, a water spray quantity from the water spray nozzle 17 is controlled on the basis of the values.

This embodiment, basically, can have a similar construction to that of the first embodiment. That is, in addition to the construction of the first embodiment, a temperature sensor 36 and a humidity sensor 61 are provided on the intake duct 13 in the vicinity of the compressor inlet, on the downstream side of the injection unit 17. A humidity sensor 55 is provided so as to communicate with a compressor discharge air. Signals form the sensor 55 are input into the control unit 35 and a water quantity of the water spray nozzle 17 is controlled on the basis of the signals.

In some kinds of gas turbines, the stability of a combustors is very excellent and in some cases, a factor influential to determining the water spray quantity limit line is mismatching within the compressor. For example, in a case where the combustor is a type of oil-burning diffusion combustion of which the construction is relatively simple, the combustor can be considered to exhibit a stable operation, being little influenced by a quantity of steam contained in the combustion air, compared with combustors of oil-burning pre-evaporation/premixing combustion and gas-burning premixing lean combustion. In this case, a water spray quantity is limited by mismatching within the compressor and lowness of compressor inlet temperature in a winter season.

Figure 5A:
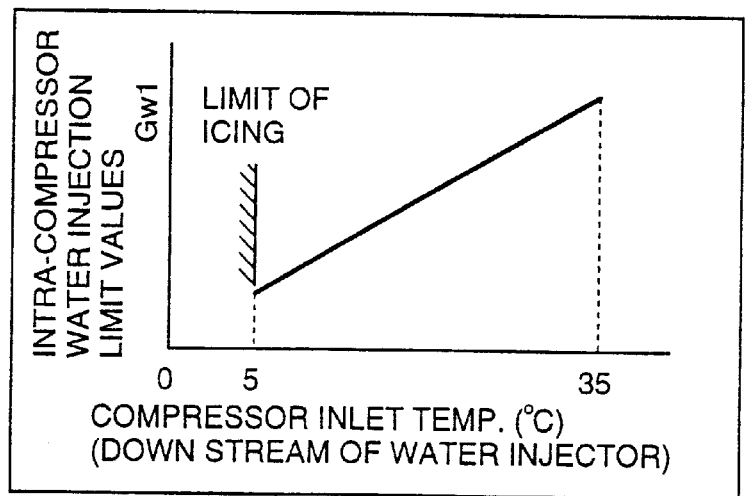
FIG. 5A is a diagram indicating a limit value for quantities of water droplets to be introduced into the compressor.
Figure 5B:
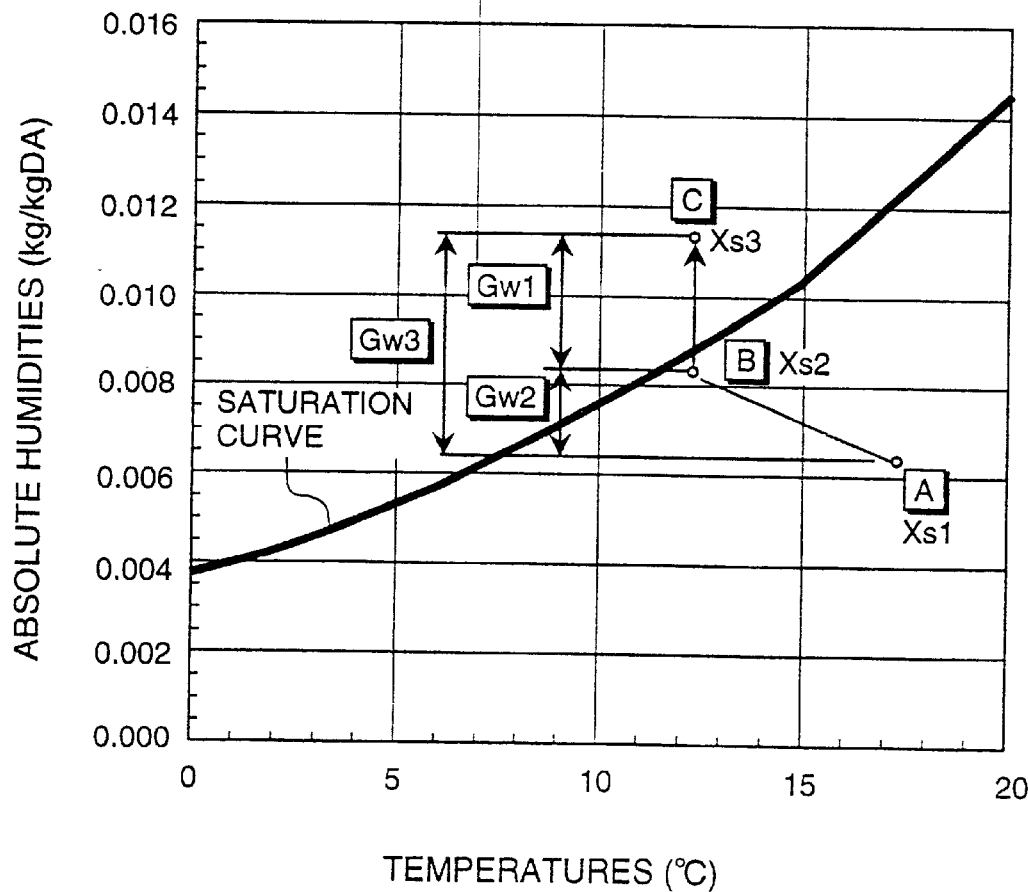
FIG. 5B is a diagram indicating operation status along a wet air curve.

A limit line of a quantity of water droplets introduced inside the compressor with respect to compressor inlet temperature is set as shown in FIG. 5A. Thereby, water spray quantities are made variable according to compressor inlet temperatures. Thereby, it is possible to suppress mismatching within the compressor, caused by compressor inside evaporation of water droplets introduced in the compressor under a condition of water droplets which remain without being evaporated in the intake duct. Thereby, the gas turbine itself can be protected. A humidity quantity corresponding to Gw1 indicated in FIG. 5B is limited on the basis of a compressor inlet temperature.

Further, in the same manner as in the second embodiment, the compressor inside water droplet introduction limit line may be set as a function based on the compressor inlet temperature and angle of the compressor inlet guide vanes 7.

When the system is really operated, the compressor inside water droplet introduction quantity limit line is determined on the basis of compressor inlet temperature at the time of operation of the gas turbine, the control unit 35 in FIG. 1 sends signals for controlling openings of the feed water flow regulating valve 22 and water atomizing air flow regulating valve 31 so that a true water droplet quantity introduced in the compressor during operation does not exceed the limit value.

A compressor inlet temperature is detected by the gas temperature sensor 36 arranged between the downstream side of the injection unit and the compressor inlet.

A compressor inside water droplet introduction quantity Gw1 indicated by Gw1 in FIG. 5A, 5B can be computed from an indication value of the humidity sensor 55 for compressor discharge air and an indication value of the humidity sensor 61 set between the downstream of the injection unit and the compressor inlet. The indication value of the humidity sensor may be relative humidity, by setting it in advance so as output absolute humidity, Gw1 can be obtained by subtracting an indication value Xs2 of the humidity sensor 61 downstream of the injection unit from an indication value Xs3 of the humidity sensor 55 for compressor discharge air. Detection signals of the humidity are sent to the control unit 35 in which a compressor inside water droplet introduction quantity Gw1 is computed.

Referring to FIG. 6, an example of a measuring device of absolute humidity of the compressor intake portion 14.

A measuring pipe 60 for sampling humidity is connected to the bottom side of a sampling tank 62. The measuring pipe from the upper portion of the sampling tank 62 is connected to a vacuum pump 66. Air inside the compressor intake portion 14 is introduced into the sampling tank 62 and the humidity is measured. The reason that the measuring pipe 60 is connected to the bottom side of the tank 62 and led to the vacuum pump from the upper portion of the tank is because of preventing the humidity sensor 61 from contacting with drain. Further, a sampling air flow regulating valve 63 is mounted on the measuring pipe 60 and a drain discharge valve 64 is provided on the bottom of the sampling tank 62.

An absolute humidity Xs2 of the compressor intake portion 14, used for calculation of a compressor inside water droplet introduction quantity Gw1 can be measured by continuously flowing air to the sampling tank. The compressor intake portion 14 becomes negative pressure to the atmospheric pressure because of pressure loss of the intake duct 14. Use of the measuring means of this construction prevents that an air flows back from the atmosphere into the compressor intake portion 14 and measurement of the absolute humidity of the compressor intake portion 14 is impossible, and make it possible to execute a suitable measurement.

Further, as for a compressor inside water droplet introduction quantity Gw1, an effective water spray quantity is directly obtained by subtracting a drain quantity in the intake duct from an indication value of the water flow meter, and the quantity Gw1 can be computed by subtracting therefrom a quantity of water evaporated within the intake duct. In this case, the quantity of water evaporated within the intake duct is calculated by subtracting an indication value Xs1 of the humidity sensor 75 upstream of the injection unit from an indication value Xs2 of the humidity sensor 61 downstream of the injection unit. The quantity of drain occurred within the intake duct can be made, in advance, into such a function that it increases as a water spray quantity increases, for example.

Further, it is preferable to provide a mode switch by which water is sprayed according to months and days, and time. As for a condition of months and days and time, from April to November, from nine o'clock to 18 o'clock as the time of a large electric demand or the time when a gas turbine output lowers according to elevation of the atmospheric temperature are taken as the condition. Thereby, the time for use of the output augmenting apparatus can be made clear, so that it is easy to maintain and manage the equipment, etc.

A fifth embodiment of the present invention will be described hereunder, referring to FIGS. 1, 8, 9, 10, 11A and 11B.

In this embodiment, the intake duct 13 is provided with a plurality of water spray nozzles 17, and it further comprises a water feed apparatus, main feed water piping in which water flows from the feed water apparatus, a feed water header causing water from the main feed water pipe to branch into a plurality of feed water pipes.

In the case of two-fluid nozzles, air supplied to the water spray nozzles, and a construction therefor comprises an air supply apparatus, a main air pipe in which air from the air supply apparatus flows and an air supply header causing air supplied from the main air pipe to branch into a plurality of air supply pipes in the same manner as in the case of water. The air supply pipes are connected to the water spray nozzles.

In this manner, the water spray nozzles 17 are divided into a plurality of systems, and the systems (the number of the water spray nozzles) used are controlled so that the number of the systems in which water is supplied becomes larger when a water spray quantity is more than when less.

The control unit controls so as to change the number of the water spray nozzles 17 used for water spray, corresponding to water spray quantities.

The present embodiment, basically, may have a similar construction to that of the first embodiment. That is, in addition to the first embodiment construction, a temperature detector 36 and humidity detector 35 are provided, for example, on the intake duct 13 in the vicinity of the compressor inlet at the downstream of the water spray nozzles 17. The humidity detector 55 is provided so as to communicate with compressor discharge air. Signals form the humidity detectors are input into the control unit 35 to control a water quantity of the water spray nozzles 17 on the basis of the signals.

Figure 8:
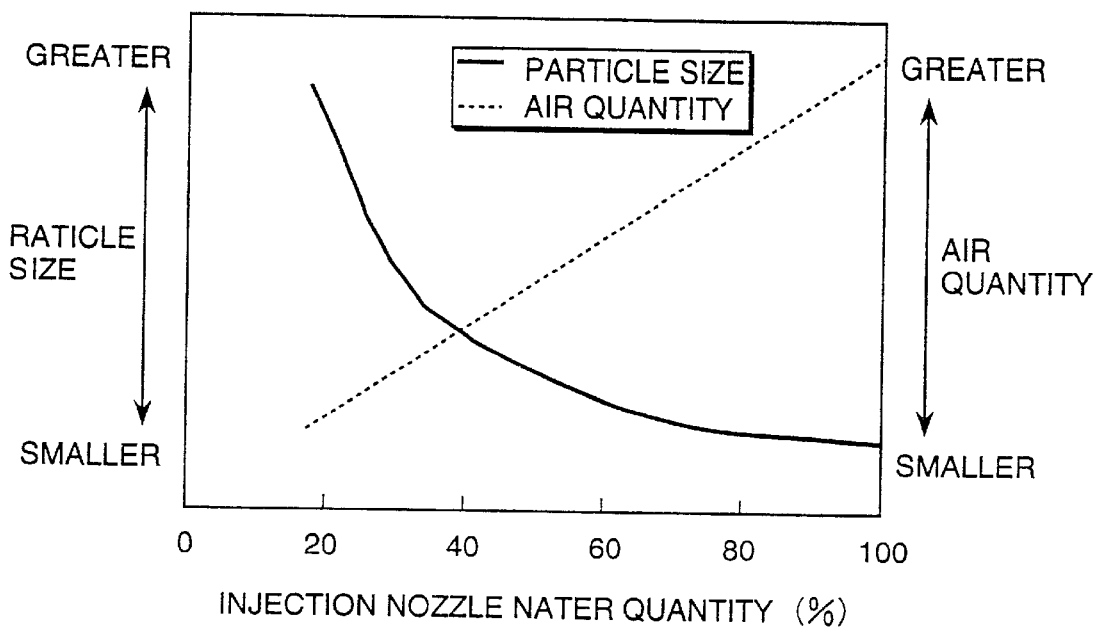
FIG. 8 is a diagram indicating relationship of water injection quantities with particle diameter and air quantities when a air water ratio is constant.

Water spray characteristics in a case where two-fluid nozzles are used are shown in FIG. 8. A water/air ratio is defined by a volume ratio of atomizing air quantity and water spray quantity. Since spray pressure decreases as a water quantity decreases under the condition that an air water ratio is constant, particle size of water droplets becomes large. Further, when one-fluid nozzles are used, also, since spray pressure decreases as a water quantity decreases, particle size of water droplets becomes large.

When water droplets sprayed from the water spray nozzles 17 becomes large, erosion occurs by impingement of the water droplets on the compressor blades, there is the possibility that the performance of the compressor is worsened. However, when the size of the water droplets is sufficiently small, the droplets do not impinge on the compressor blades, but they flow with flowing air and evaporate within the compressor. In order to pass water droplets through between the compressor blades without impingement on the compressor blades, although there is a difference by a design condition such as air flow velocity and shape inside the compressor, the above-mentioned average particle diameter is smaller than a prescribed size. For example the diameter is made to be 20 $\mu$m or less. In the intake air humidification cooling system, even if a water spray quantity changes, it is preferable that the particle diameter of the water spray droplets is a prescribed value or less.

In order to solve the problem, as shown in FIG. 1, when a water spray quantity is small, the flow regulating valves 26 communicating with the spray water pipes are controlled so that a part of the feed water valves 26 are opened and the others are closed so as to supply water to a prescribed part of the spray water pipes 15 communicating with the feed water header 25. In the same manner, air distributed by the atomizing air header 32 is controlled by the air flow regulating valves 33. When a water spray quantity is increased, the number of the opened flow regulating valves communicating with the spray water pipes is increased. The number of the air flow regulating valves 33 also is increased corresponding to the number of the feed water flow regulating valves 26.

Figure 9:
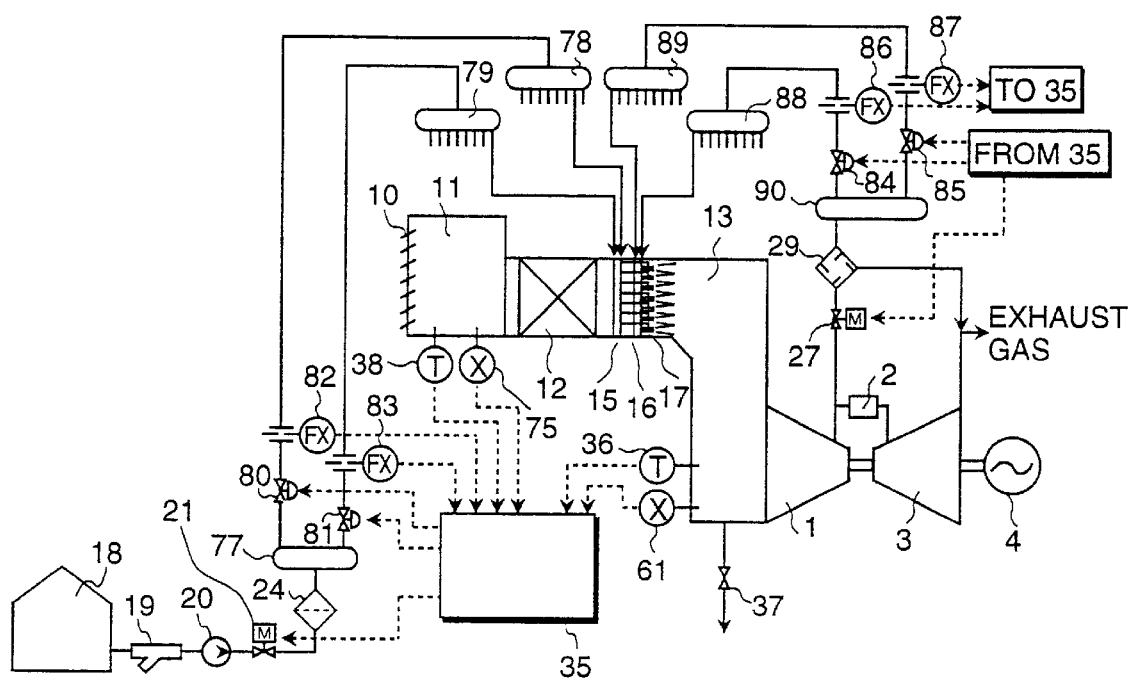
FIG. 9 is a schematic block diagram of a gas turbine of another embodiment of the invention.

Further, a construction until the spray nozzles may be made by increasing the number of feed water headers as shown in FIG. 9, constructing a main feed water header 77 and auxiliary feed water headers 78,79, and providing feed water flow regulating valves 80 and 81 and feed water flow meters 82 and 83 on feed water lines connected to the auxiliary feed water headers 78, 79.

In this Figure, also, only one spray water pipe branched from the auxiliary header 78, 79 is illustrated.

When a water spray quantity is small, only one auxiliary feed water header 78 is used and so on, whereby water is sprayed by a part of the number of installed water spray nozzles 17. Thereby, spray pressure of the spray nozzles can be maintained high, whereby such control is possible that water supply is in a water spray quantity range in which water droplets become a certain size or less in the nozzle spray characteristics of FIG. 8. Further, the spray pressure increases with increase in the water spray quantity, however, in order not to exceed the designed pressure in the feed water system, two of the auxiliary feed water headers 78, 79 are used and so on when the spray pressure becomes higher than a certain value, whereby the number of the water spray nozzles 17 used for spray is increased. The number of the installed auxiliary feed water headers is determined by the design conditions such as the maximum water quantity, the number of water spay nozzles, the minimum and maximum water spray pressures, etc. In FIG. 9, the feed water system is illustrated in which two auxiliary feed water headers are used.

Further, even in the case where the water spray quantity is small as a whole, a stable output augmenting operation can be effected by increasing a water spray quantity per one nozzle and suppressing variation in average particle diameter of the water droplets, caused by variation of the water spray quantity.

Figure 10:
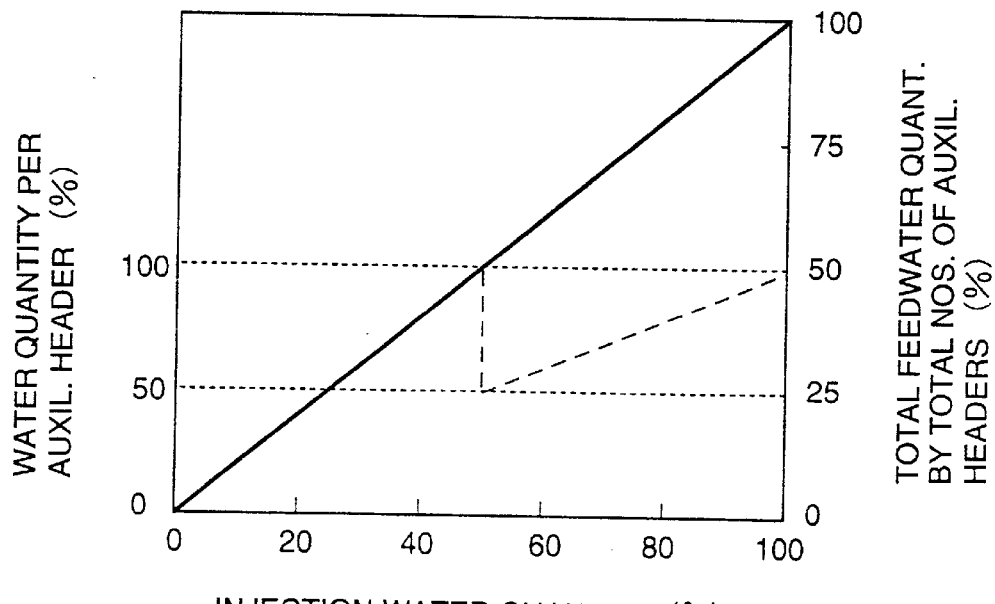
FIG. 10 is a diagram indicating relationships of water spray quantities with auxiliary header water supply quantities.

An operation method in which two auxiliary feed water headers are used is shown in FIG. 10. In the case of the maximum water quantity 100%, one auxiliary feed water header is used until the water quantity reaches to 50%. As a switching point at a water quantity of 50%, by using the second auxiliary feed water header, the two headers are used supplying water of the same quantity to then until the water quantity reaches to 100%.

In this manner, according to the present embodiment, even if there is variation in water spray quantity, water droplets of desired particle size can be stably obtained, and an operation of variable output argumentation can be carried out while keeping the soundness of the apparatus and devices.

Further, by providing the feed water header with a plurality of feed water pipes 15 without installing auxiliary feed water header, and by arranging a feed water flow regulating valve and flow meter at the downstream side of the main feed water header of the feed water system, it is possible to change the number of water spray nozzle pipes being operated.

Further, by providing a feed water flow regulating valve for each water spray nozzle of the feed water system and providing air flow regulating valve for each water atomizing air nozzle of the air supply system, without providing auxiliary feed water header, it is possible to change the number of water spray nozzles being operated.

A sixth embodiment of the present invention will be described hereunder, referring to FIGS. 1, 5, 6, 11A and 11B.

In this embodiment, a water quantity or air quantity supplied to the water spray nozzles 17 are controlled according to a water spray quantity.

The present embodiment, basically, may have a similar construction to that of the first embodiment. In addition to the construction of the first embodiment, the feed water outlet flow regulating valve 26 and atomizing air header flow regulating valve 33 are controlled, according to a water spray quantity, so as to increase and decrease an air supply quantity so that an air water ratio becomes constant (so as to suppress a variation).

Thereby, water droplets of a certain particle size can be obtained (in the case of a relatively large water quantity it is remarkable) while suppressing an air flow rate to be small. When air is taken from the compressor, a lot of air among the intake air can be supplied to the combustor, and an operation so as to improve output and efficiency can be carried out.

Further, the feed water outlet flow regulating valve 26 and atomizing air header flow regulating valve 33 are controlled, according to a water spray quantity, so as to increase and decrease an air supply quantity so that a variation of an air water ratio may be suppressed and, preferably, a air water ratio becomes constant.

Concretely, an air water ratio is controlled to be small when a water spray quantity-is larger than when small.

Thereby, water droplets of a certain particle size can be obtained (in the case of a relatively large water quantity it is remarkable) while suppressing an air flow rate to be small. When air is taken from the compressor, a lot of air among the intake air can be supplied to the combustor, and an operation so as to improve output and efficiency can be carried out.

Figure 11A:
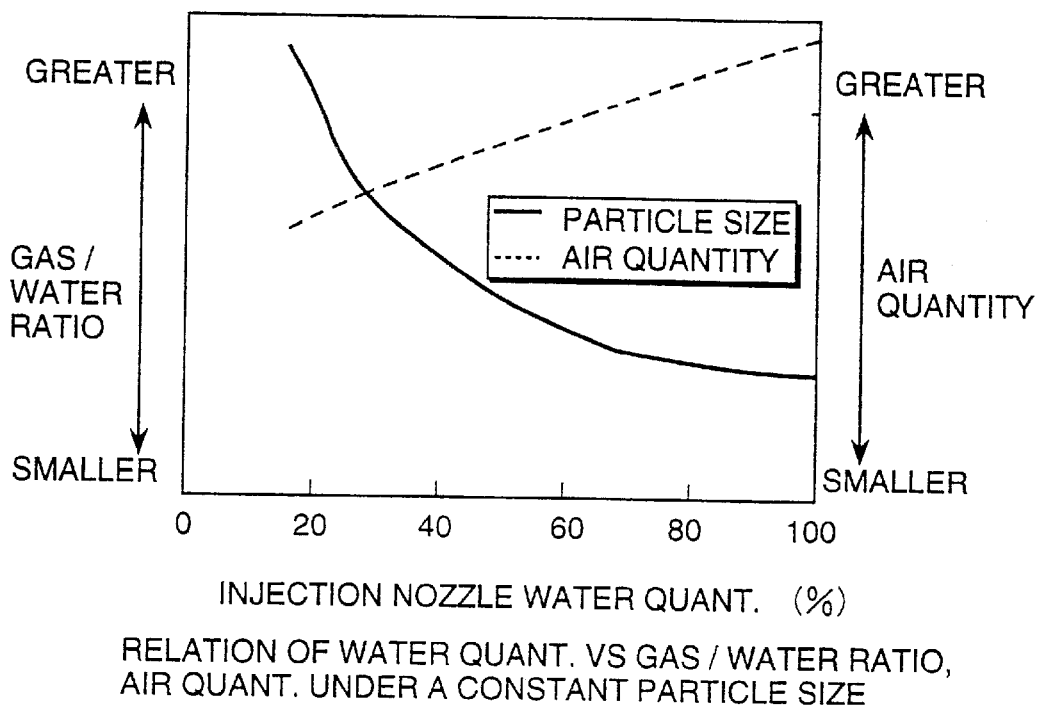
FIG. 11A is a diagram indicating relationships of water spray quantities with air water ratios and air quantities when the particle diameter is constant.

Nozzle spray characteristics in which particle size of water droplets is made constant are indicated in FIG. 11A. Since it is necessary to make an air water ratio larger according to decrease in the water spray quantity in order to make the particle size constant, for example, a relationship between a water spray quantity and an atomizing air quantity or an air water ratio, for making the particle size constant, have been input in advance into an arithmetic unit, and then by measuring a water spray quantity by the feed water flow meter and calculating a necessary atomizing air quantity, the atomizing air quantity is controlled. Thereby, variation of particle size according to water spray quantity can be suppressed. Therefore, erosion occurrence on the compressor blades by impingement of the water droplets on the blades can be prevented and a variable output augmenting operation can be executed while maintaining the soundness of the apparatus and devices.

Alternatively, even by increasing and decreasing a feed water quantity, even by changing the feed water header outlet flow regulating valve 26 so as to make the air supply quantity constant, according to a water spray quantity, the atomizing air header flow regulating valve 33 is controlled to be constant. Thereby, a variable output augmenting operation can be executed while maintaining the soundness of the apparatus and devices by a simple control.

Figure 11B:
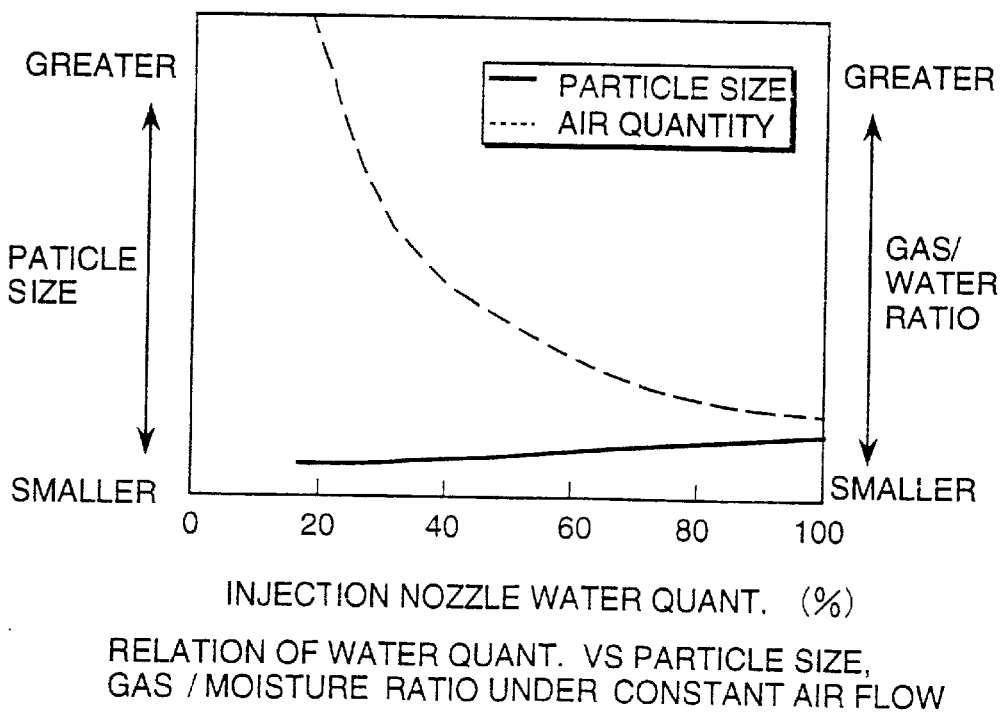
FIG. 11B is a diagram indicating relationships of water spray quantities with particle diameter and air water ratios when air quantity is constant.

For example, spray nozzle characteristics when an atomizing air quantity is made constant is indicated in FIG. 11B. As indicated in FIG. 11B, an air flow quantity has be determined on the basis of the air water ratio at a water quantity of 100% of the water nozzle, air of a constant quantity is supplied to the water spray nozzle irrespective of variation in the water spray quantity. Thereby, the particle size of sprayed water droplets becomes always a rated size or less, and a variable output augmenting operation can be executed while preventing occurrence of erosion by relatively simple control.

A seventh embodiment of the present invention will be described hereunder, referring to FIG. 1 and 9.

In this embodiment, when water spray starts, a control is carried out so that first, supply of atomizing air is started, and then supply of atomized water is started. Further, when the water spray is stopped, the control is executed so that first, the supply of atomized water is stopped, and then the atomizing air supply is stopped. Further, at the time of a water spray operation, control devices for feed water and feed air supplied to the spray nozzles are controlled so as to be throttled on the basis of a gas turbine trip signal.

The present embodiment, basically, may have a similar construction to that of the first embodiment. Concretely, the following control is executed.

When the water spray is started on the basis of a water injection instruction, first, the extraction air shutoff valve 17 of the atomizing air system is opened. At this time, air flows by a quantity of the air exhausted from a cyclone separator 29. Next, the air flow regulating valve 84 is opened so as to flow by an initial set flow rate and the air flows into the spray nozzle 17. After the air passage through the nozzle 17 is completed, the feed water system is started. The feed water pump 20 is started, the feed water shut-off valve 21 is opened, and water of an initial set flow rate is flowed by operation of a feed water flow regulating valve 80. According to this process, the spray water is atomized by water atomizing air sprayed, and sprayed from the spray nozzle 17. Then, a spray water quantity is gradually increased until the water quantity reaches a water injection instruction value.

Further, in the case where a plurality of auxiliary feed water headers and auxiliary atomizing air headers are used as shown in FIG. 9, a switching operation is executed at a water quantity of 50% in FIG. 10 according to an increase in water quantity, the air flow regulating valve 84 is opened to flow air of a set flow rate, and then the feed water flow regulating valve 81 is operated to open. In this manner, by flowing air of a set flow rate first, it is possible to maintain a water droplet atomizing characteristics even in the process of increasing a quantity of water.

A process of stopping the water spray is explained, referring to FIG. 9. First of all, the feed water shut-off valve 21 is closed, and then the feed water flow regulating valves 80, 81 are fully closed. Here, since in some cases, water downstream of the feed water flow regulating valve is sprayed by injection of atomizing air for several minutes, after time passage for a certain time after stopping of supply of feedwater, the extraction air shut-off valve 27 is closed, and the air flow regulating valves 80, 81 are fully closed. In this manner, in the water spray stopping operation process, also, the air spraying is stopped after the feedwater is stopped, whereby the water atomizing characteristics can be maintained after the stopping.

Thereby, water spray starting or stopping operation can be executed while maintaining the soundness of the apparatus and devices.

Further, at the time of gas turbine trip during the water spray operation, the feedwater shut-off valve 21 and the extraction air shut-off valve 27 are fully closed by a trip signal. In this case, although atomizing air sprayed is lacked and water of large particle diameter in the feed water duct is sprayed or the water drops by difference in weight, it occurs for a short time, so that such a problem as erosion of the compressor blades is not caused thereby.

Further, concretely, first, an instruction of stopping water spray is issued on the basis of a signal of gas turbine trip. Then an instruction of decreasing the compressor inlet guide vane opening is issued. Thereby, the soundness of the plant can be secured further at the time of gas turbine trip.

An eighth embodiment of the present invention will be described hereunder, referring to FIGS. 1, 12A and 12B.

In this embodiment, by detecting a temperature distribution of air at the inlet of the compressor 1 in a peripheral direction, a control is carried out so that a temperature deviation does not exceed a prescribed value.

The present embodiment, basically, may have a similar construction to that of the first embodiment. In this embodiment, a plurality of temperature detectors 36 are further arranged on the intake duct 13 as shown in the section taken along line A—A of FIG. 12A.

Water droplets 40 injected from injection nozzle 17 are partly vaporized within the intake duct 13 thereby dropping the temperature of ambient air, and are introduced into compressor 1. At this time, when a water quantity supplied from some of a series of water spray pipes 15 is insufficient due to clogging or the like of spray nozzle 17, a difference in measured temperatures occurs when intake duct air temperature detectors 36 are provided at a plurality of positions. Since nonuniformity of flow at the intake portion will normally cause unstable operation of the compressor, uniformity in the temperatures is also required to be ensured. Nonuniformity or deviation of temperature in the circumferential direction at the intake portion of the compressor implies that correcting revolution numbers of the compressor differ in the circumferential direction, which causes mismatching between stage characteristics within the compressor.

Further, in the case where the temperature deviation at the inlet of the compressor is due to the above-mentioned deviation of water flow, there occurs a difference in amounts of water droplets to be introduced into compressor 1 without having been vaporized within intake duct 13 in the circumference direction of the intake portion. Since water droplets introduced into compressor 1 serve to drop ambient temperatures of a main air stream within compressor 1 by being vaporized therein, when a deviation of water droplet distribution in the circumference direction is large, there occurs that a temperature drop in a particular portion within the compressor becomes large while as a temperature drop in another portion becomes small, thereby further deteriorating the circumferential temperature deviation within the compressor. Therefore, there may be considered such a case where an excess drift water exceeding the limit value is unintentionally allowed to flow partially within the compressor although the operation within the injection water limit line is intended.

Further, when use of the inlet temperature and humidity of compressor 1 is considered for the control of water quantity, the above-mentioned temperature deviation will affect the control of water quantity, and will cause such a case where an excess quantity of water over the water quantity limit value is injected, or contrarily an adequate amount of water which is required for obtaining a target gas turbine output cannot be injected.

Figure 12A:
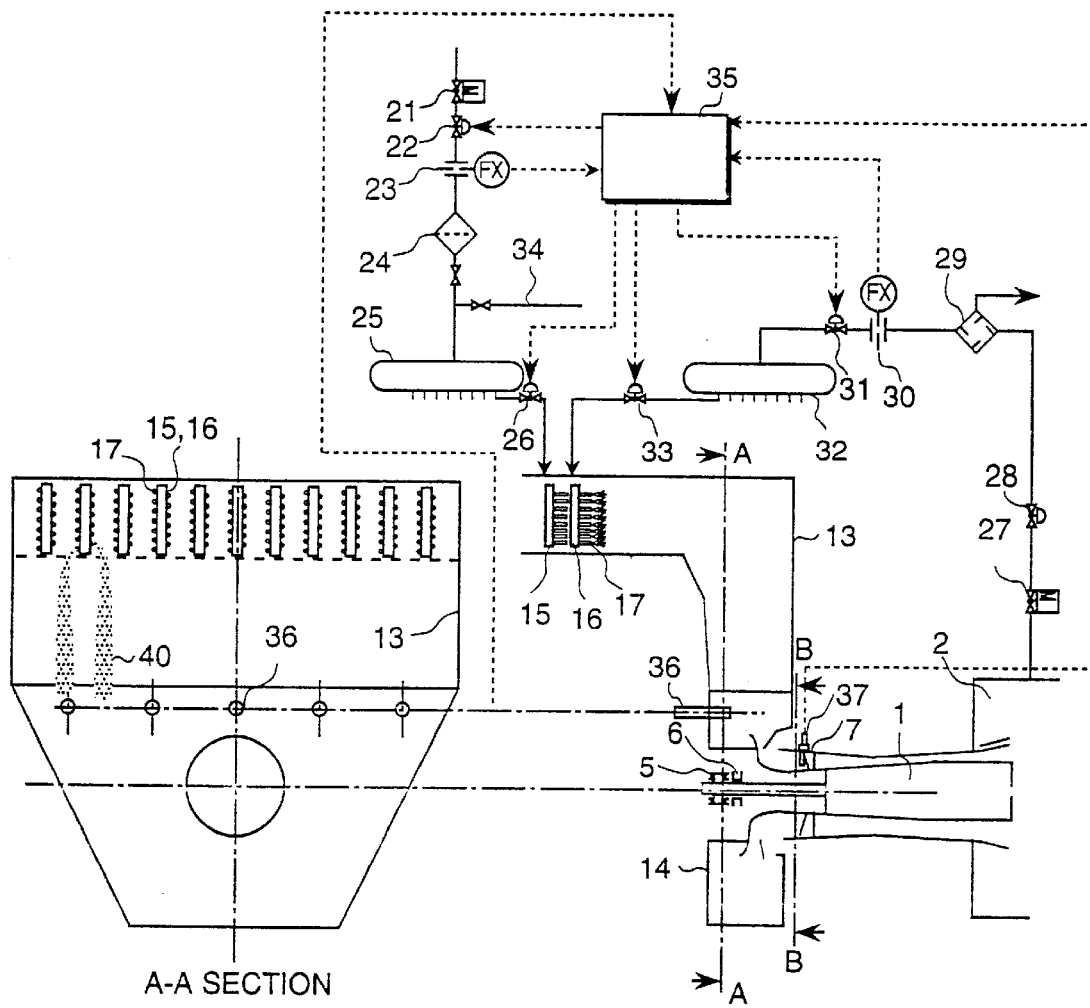
FIG. 12A is a schematic block diagram of a gas turbine of another embodiment of the invention.
Figure 12B:
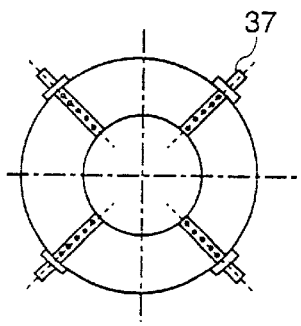
FIG. 12B is a section taken along a line B—B of FIG. 12A.

A value is predetermined arbitrarily as an allowable value for temperature deviations, temperature signals at a plurality of points detected by air temperature detector 36 indicated in FIGS. 12A, 12B are transmitted to control unit 35, then in the case when a temperature deviation exceeds the predetermined allowable value, the control unit controls the opening of the feed water header outlet flow regulating valve 26 such that a supply water quantity to be supplied from each water spray pipe 15 to its spray nozzle 17 becomes constant thereby suppressing the deviation within the allowable value. For example, in such a case where injection nozzle 17 is clogged by foreign matters such as rust accumulated in the piping, since a feed water pressure in each water spray piping 15 is the same, and since a water quantity to flow into a particular water injection piping having many clogged nozzles decreases than quantities in other water spray piping, there results in a temperature deviation. Therefore, in order to balance water flows among the water spray piping, openings of the feed water header outlet flow regulating valves 26 of other water spray piping without being subjected to clogging are decreased. Thereby, the temperature deviation at the inlet of the compressor is eliminated upon balancing of flows in respective water spray piping 15. However, since the feed water quantity drops due to the decreased opening of the feed water header outlet flow regulating valve 26, the control unit 35 sends an open valve operation signal to the feed water flow regulating valve 22 to raise the pressure of the feed water header such that an indication by water flowmeter 23 increases to a target water flow. Further, when the feed water pressure is raised, a quantity of water droplet atomizing air becomes insufficient, thereby, the control unit 35 sends an open valve operation signal also to the air flow regulating valve 31 to raise its supply pressure and control the air flow to become at a target value.

Thereby, partial occurrence of icing or stalling is suppressed and a high output operation will be possible while securing the soundness of the apparatus and device.

Further, instead of the construction shown in the section of A—A of FIG. 12A, an air temperature detector 37 can be arranged at the upstream side of the compressor inlet guide vanes as shown in the section B—B of FIG. 12B. The section B—B is a section upstream of the compressor inlet guide vanes 7. This construction can have a similar effect to the construction shown by the section A—A. The air temperature detectors 37 are arranged at the inlet of the compressor inlet guide vanes 7 at an interval in the peripheral direction, preferably, at an equi-interval, whereby more precise temperature deviation can be detected, abnormality of the apparatus and devices can be detected precisely and maintenance of the apparatus and the devices can be effected.

Although an allowable value of preset temperature deviation should be set to different values according to types or kinds of gas turbines, in the present invention, it can be set to 15° C. or lower.

An example of operation of the present invention will be described hereunder, referring to FIGS. 1 and 13.

Figure 13:
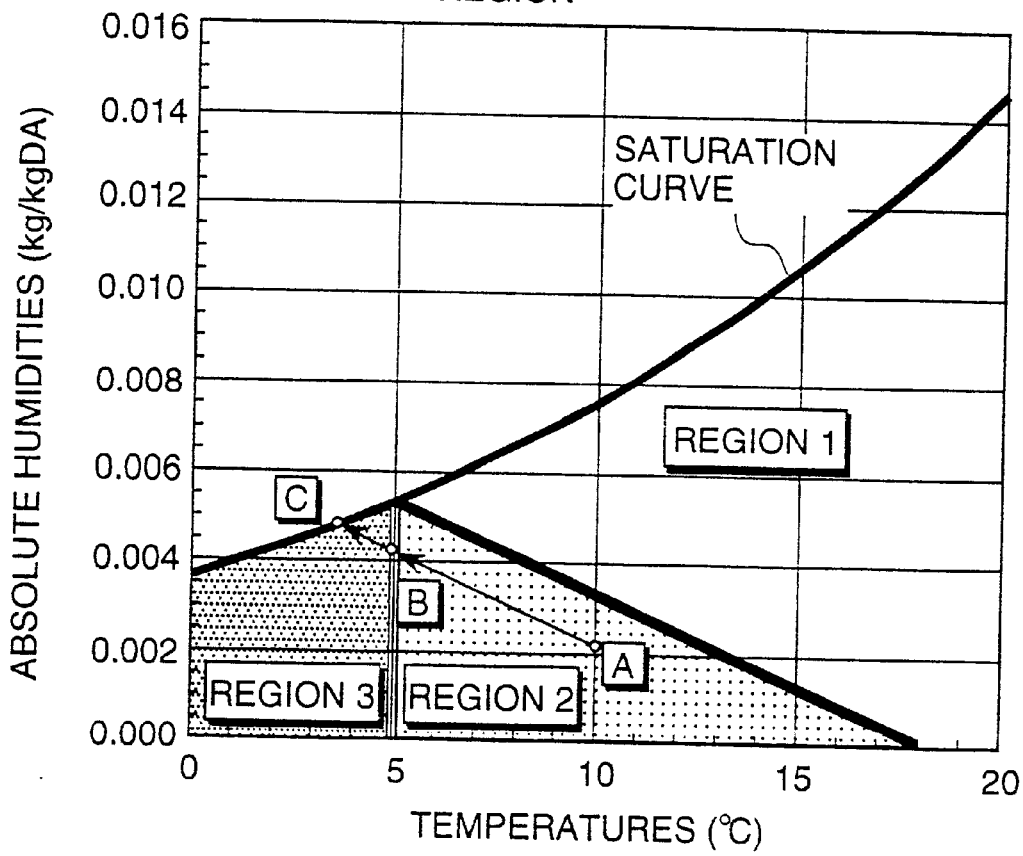
FIG. 13 is a diagram indicating water injection limits relative to compressor inlet temperatures when atmospheric temperature is low.

FIG. 13 indicates icing limit at the inlet of the compressor 1.

For example, in the case of atmospheric condition being 10° C. and relative humidity being 30%, it is located at point A in FIG. 13. Upon vaporization of a portion of injected water between the downstream side of the water injection unit and the upstream side of the compressor, an inlet temperature of the compressor 1 drops theoretically to 3.5° C. at point C with a relative humidity of 100%. However, an air velocity in the vicinity of the compressor inlet guide vane 7 is accelerated to approximately 200 m/s. Thereby, a static temperature of air drops, and a recovery temperature on the surface of blades of the compressor inlet guide vane 7 decreases by 2–3° C. Therefore, there is a possibility for water droplets introduced into the compressor to freeze on the wall surface of casing and on the compressor inlet guide vane 7.

When an icing phenomenon takes place, the output of the gas turbine drops due to a decrease in quantity of intake air to the compressor 1. Further, there is a possibility that the compressor blade is damaged by periodical scattering of grown-up ice. Still further, in the case where partial icing in the circumferential direction at the inlet of the compressor takes place, intake air quantities sucked into the compressor become uneven in the circumferential direction, thereby causing unbalanced vibrations of a rotating portion of the gas turbine or unstable operation of the compressor.

In actual operation, it is required to preset a lower limit value of temperatures, which should be determined with an adequate margin in consideration of an opening of compressor inlet guide vane 7 under operation, a temperature deviation in the circumferential direction in the inlet of compressor 1, and respective variations and precision of measurements of the air temperature detectors 36. In this embodiment, it is preset at 15° C. In FIG. 13, for example, the lower limit value is set at 5° C., and a region 3 which is lower than 5° C. is defined as a water spray prohibit region. Therefore, in the case of FIG. 13, a water spray allowable region is until point B in which an inlet temperature of the compressor 1 is 5° C. and a relative humidity is 75%.

In FIG. 13, in the case where an atmospheric condition is located in region 1, it does not occur theoretically that any inlet temperature of the compressor 1 becomes lower than 5° C., thereby eliminating any water spray limitation against icing. Further, in the case where its atmospheric condition is located in region 2, since it is possible for the inlet temperature of the compressor 1 to drop below 5° C. and enter region 3, the water quantity is controlled such that the inlet temperature of the compressor 1 will not drop below 5° C. At this time, since any partial icing at the inlet of the compressor should not be allowed, the same water flow control as in the first embodiment of the invention is executed such that every detected values of temperature signals of air temperature detectors 36 will not drop below 5° C.

When the atmospheric condition enters region 3 of FIG. 13 during operation, namely, when a dry bulb temperature of the atmospheric condition becomes below 5° C., since icing phenomenon starts in two or three minutes, it becomes necessary to stop water supply speedily, thereby, the control unit 35 sends a closing valve operation signal to the feed water shut-off valve 21. Otherwise, the feed water pump 20 is subjected to emergency stop.

In the case where the atmospheric condition of FIG. 6 is in region 2, that is, a dry bulb temperature of the atmosphere is below 5° C. since a water spray quantity for control in actual operation becomes small, an increase in output of the gas turbine to be augmented is limited, thereby providing less advantage. Therefore, without allowing the water control to be executed to the verge of icing, when the wet bulb temperature drops below 50C, the control unit 35 sends a closing valve operation signal to the feed water shut-off valve 21. Otherwise, the feed water pump 20 is subjected to emergency stoppage. In this case, the possibility of icing is completely eliminated, thereby ensuring a safer operation.

In the suction chamber 11 in FIG. 1, the atmospheric condition detector 38 and atmospheric humidity detector 75 are installed. The atmospheric condition detector 38 and atmospheric humidity detector 75 may be placed anywhere in the upstream side of the water injection unit provided that they are not affected by rain drops. As a result of detection by the atmospheric temperature detector 38 and atmospheric humidity detector 75, it is found in which region of FIG. 13 to be positioned. Further, a result of detection by the compressor inlet suction duct air temperature detector 36 and compressor inlet gas humidity detector 61 of FIG. 13 may be used as well. Further, in the case where a signal of detected humidity is a relative humidity, it may be converted to an absolute humidity in control unit 35.

A ninth embodiment of the present invention will be described hereunder, referring to FIG. 1, 14, 15 and 16.

Figure 14:
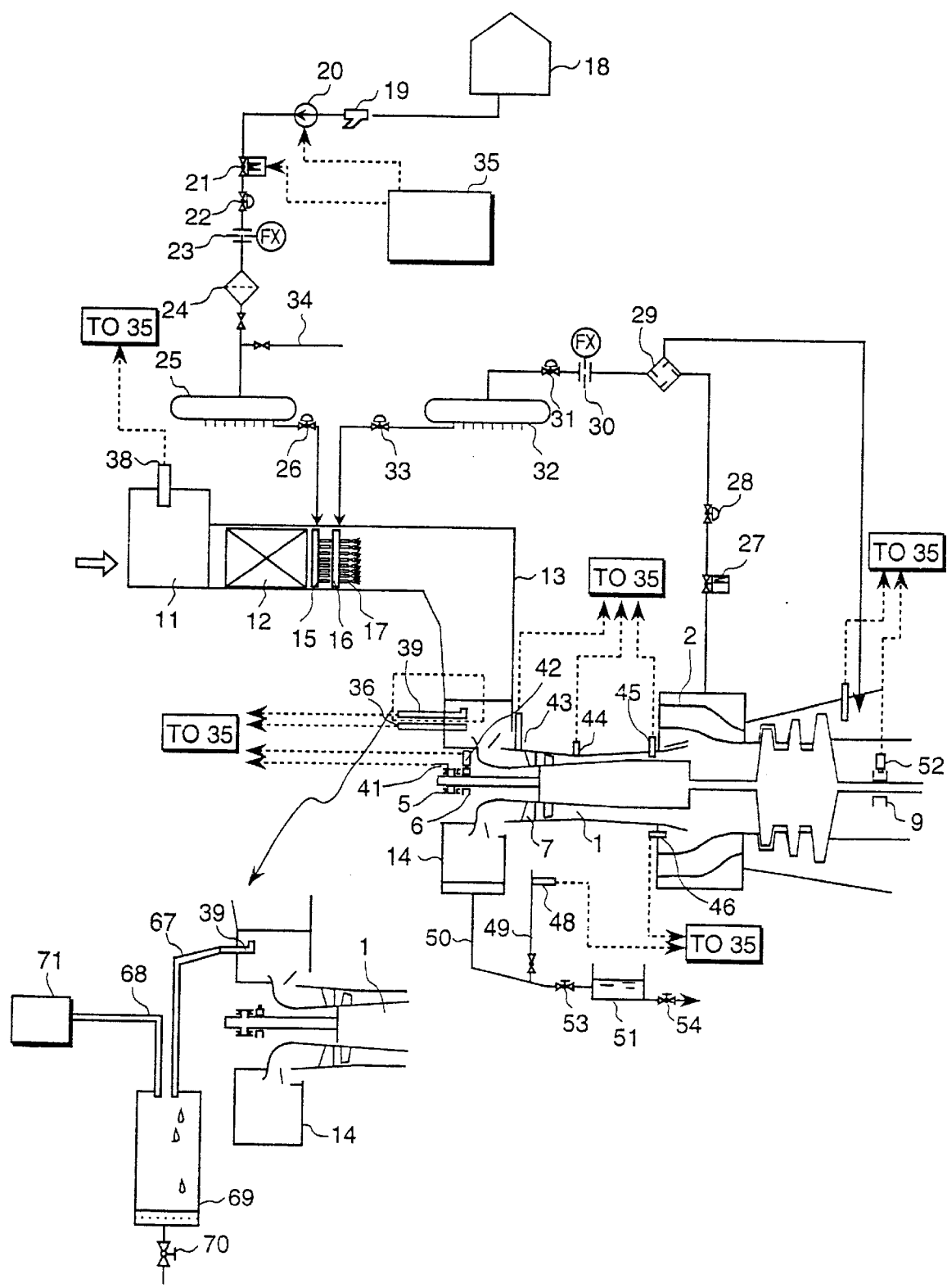
FIG. 14 is a schematic block diagram of a gas turbine of another embodiment of the invention.

FIG. 14 is a schematic diagram showing an example of operational condition detectors surrounding the gas turbine itself relating to the water flow control.

The present embodiment, basically, may have the construction of the first embodiment. In addition to the construction, as shown in FIG. 14, a compressor inlet total pressure gauge 39 is provided in the upper portion of the compressor air intake portion 14, a wall pressure detector 43 is provided in an inlet casing of the compressor inlet guide vane 7, a compressor wall pressure variation detecting pressure sensor 44 is provided in an intermediate stage of the compressor, a compressor discharge portion temperature detector 45 and a compressor discharge pressure detector 46 are provided at a discharge portion of compressor 1, a gas turbine exhaust gas temperature detector 47 is provided in a gas turbine exhaust diffuser 8, a bearing vibration detector 42 is provided on compressor frontal bearing 6, a bearing vibration detector 52 is provided on a turbine exhaust side bearing 9, a metal temperature detector 41 is provided on a thrust bearing 5, and a drain detection level switch 48 is provided in the compressor air intake portion. It is not necessary to provide all the above-mentioned detectors, etc.

Figure 15:
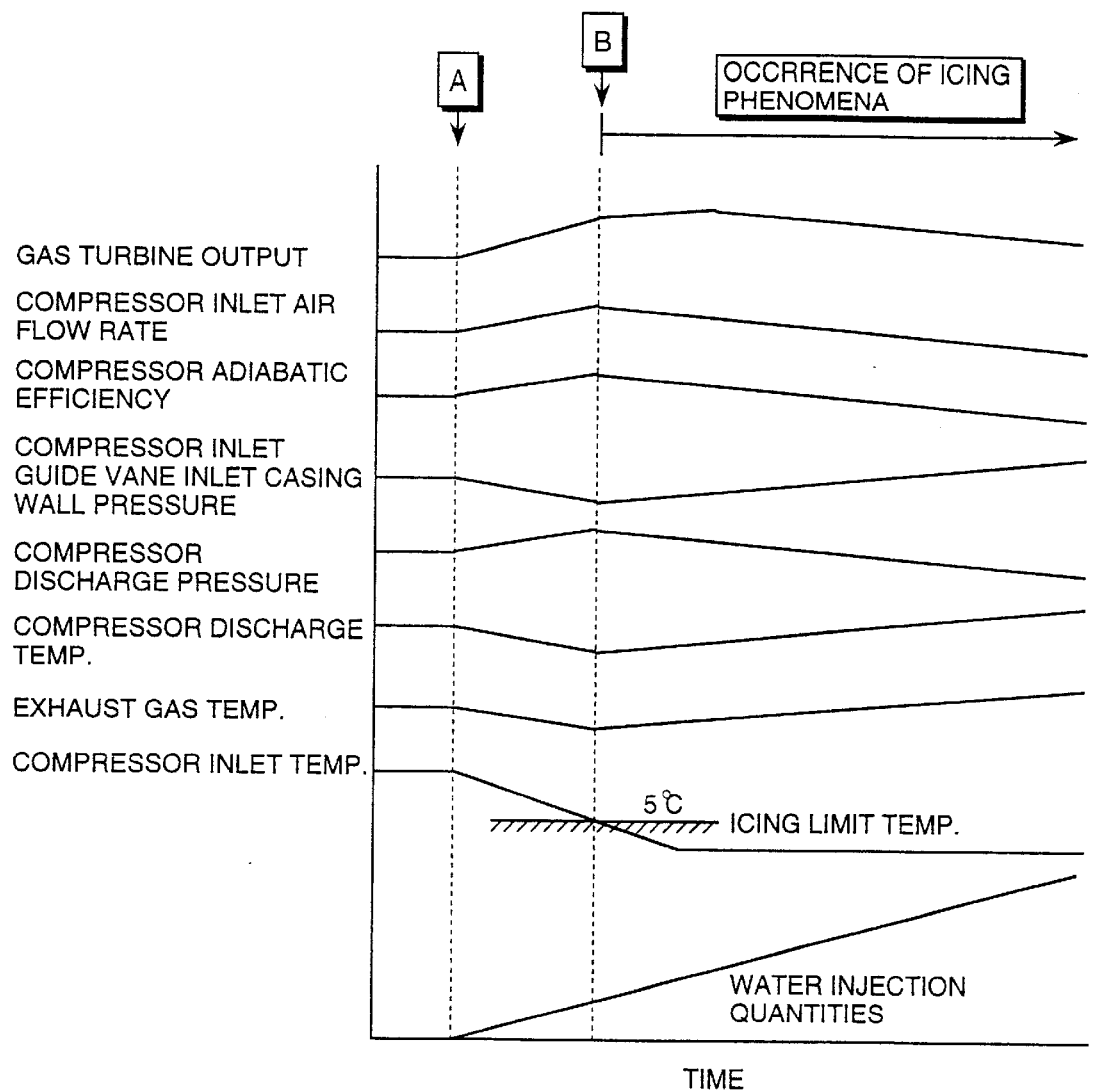
FIG. 15 is a diagram indicating operational status of the gas turbine under occurrence of icing phenomena in the inlet of the compressor.

FIG. 15 indicates changes in the operating conditions of the entire gas turbine under occurrence of icing phenomena.

Water spray injection starts at point A in FIG. 15, and in accordance with an increasing quantity of water spray, a compressor inlet temperature decreases. However, in such a condition where its atmospheric temperature is too low, an icing phenomenon starts to takes place from point B, thereby affecting the overall performance of the gas turbine. When icing phenomenon takes place in the inlet of the compressor, ice grows on the surfaces of inlet guide vane 7 and the casing, thereby decreasing a frontal annulus area of the compressor, and thereby decreasing a compressor inlet air flow. When the compressor inlet air flow decreases, a gas turbine output drops. Further, since a velocity of air flow in the inlet of the compressor drops, a pressure on the wall of casing in the inlet portion of compressor inlet guide vane 7 increases. A decrease in amounts of air flow at the inlet of the compressor will result in a decrease in amounts of air flow at the inlet of the gas turbine, thereby decreasing a discharge pressure of the compressor so far as the operation is maintained at a constant combustion temperature. when the discharge pressure of the compressor drops during operation at the constant combustion temperature, an exhaust gas temperature of the gas turbine increases. In the case where an interstage mismatching occurs within the compressor triggered by the icing phenomenon, an adiabatic efficiency of the compressor drops remarkably, thereby increasing the discharge temperature of the compressor.

Figure 16:
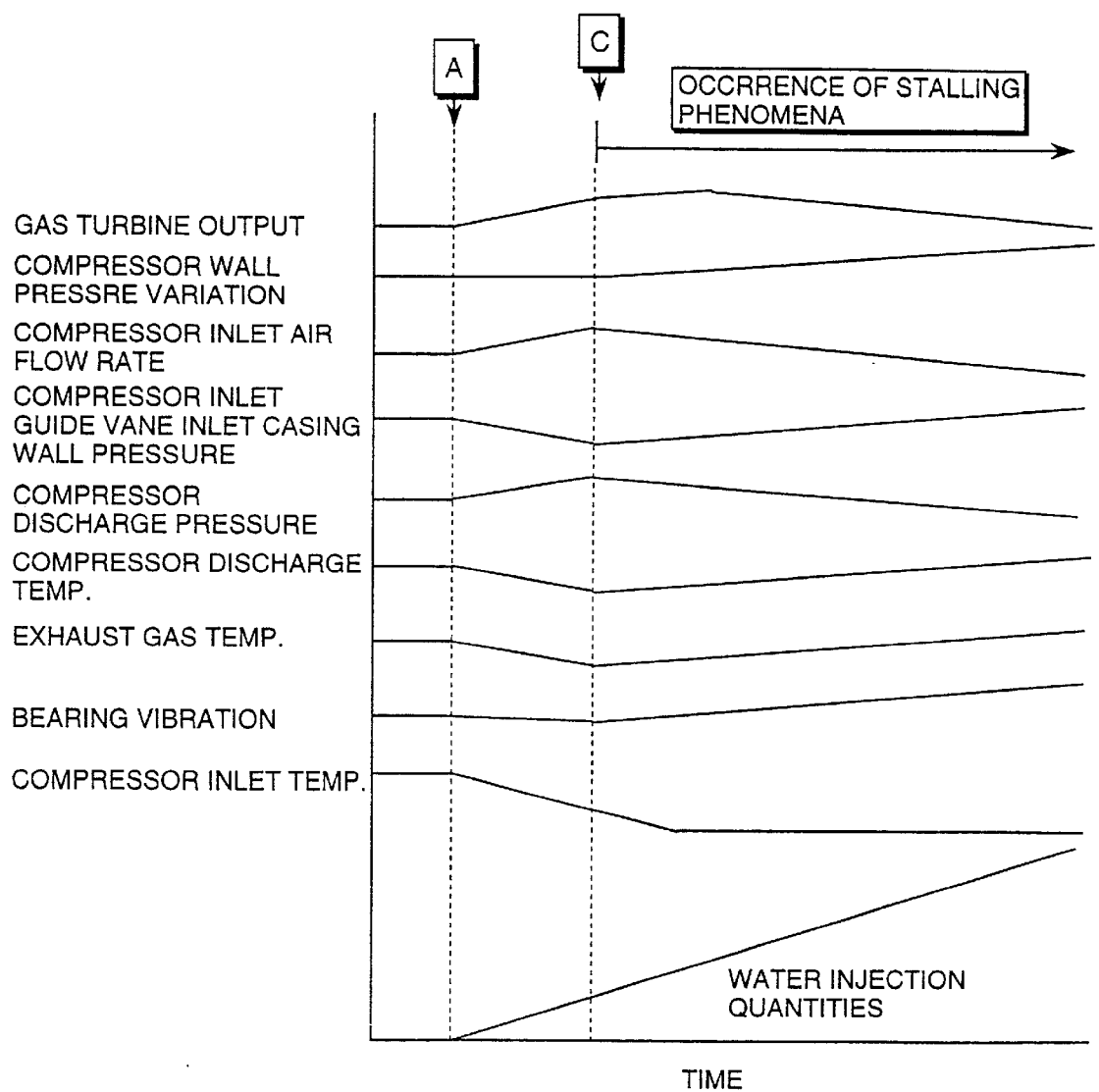
FIG. 16 is a diagram indicating operational status of the gas turbine under occurrence of stall phenomena within the compressor.

FIG. 16 indicates changes in overall operational conditions of the gas turbine under occurrence of a stall phenomenon.

Water injection is started from point A in FIG. 16. With an increasing quantity of water injection, the inlet temperature of the compressor decreases, and its output starts to increase. However, in the case there is a non uniform temperature distribution at the inlet of the compressor, a non-uniform distribution of water droplets introduced into the compressor in the circumferential direction thereof, any interstage mismatching within the compressor due to excess water injection therein or the like, there is a possibility that a blade stalling phenomenon within the compressor may result in. When there occurs a stalling phenomenon of blades, a variation of wall pressures of the compressor increases due to an unstable flow by the stalling. Since a stalled blade region inhibits its air flow, the quantity of inlet air of the compressor decreases. The decrease in the quantity of the inlet air of the compressor causes to decrease the gas turbine's output. Further, since an air flow velocity at the inlet of the compressor is caused to decrease, a casing wall pressure in the inlet portion of compressor inlet guide vane 7 increases. Since the decrease of the inlet air quantity of the compressor results in a decrease in the inlet air to the gas turbine, the discharge pressure of the compressor is also decreased so long as operation at a constant combustion temperature is maintained. When the discharge pressure of the compressor is decreased under operation at a constant combustion temperature, an exhaust gas temperature of the gas turbine increases. The adiabatic efficiency of the compressor drops remarkably due to the stalling phenomenon, thereby increasing the discharge temperature of the compressor. Along with a rise of variation level of compressor wall pressures, a vibration in a rotating portion of the gas turbine increases as well thereby increasing a value of vibration of its bearing.

Although, as mentioned above, the gas turbine itself is essentially protected by the spray water quantity limit lines, in the long run there may be considered such a case where use of the same limit lines alone may not be able to ensure the protection of the gas turbine itself in consideration of influences such as decreases in surge margins due to ageing deteriorations of the compressor and the like. Therefore, it becomes necessary for the operational conditions in the circumference of the gas turbine inclusive thereof to be detected and monitored for each item of detection with respect to its predetermined allowable value of variation.

(1) Since the stall phenomenon within the compressor and the icing phenomenon on the inlet guide vane 7 of the compressor result in the drop of the compressor inlet air quantity, it becomes possible to detect their occurrences by monitoring the compressor inlet air quantity. In practical operation, in case the compressor inlet air quantity drops lower than the predetermined allowable value within a predetermined period of time, the control unit 35 sends a signal to the feed water flow regulating valve 22 to decrease its opening so as to decrease the water injection quantity. Further, in case the allowable value for variation is exceeded, water supply may be shut off to protect the gas turbine. In this case, the control unit 35 transmits a closing operation signal to the feed water shut-off valve 21. Otherwise, the feed water pump 20 may be stopped in emergency.

Here, the compressor inlet air quantity is calculated, for example, using signals from the compressor inlet total pressure gauze 39 installed in the upper portion of the compressor intake portion 14, the inlet portion casing wall pressure detector 43 in the inlet of compressor inlet guide vane 7, and a temperature signal from the intake duct air temperature detector 36.

Thereby, the icing or stalling phenomena can be surely detected, so that the soundness of the gas turbine can be surely secured.

(2) Monitoring of the inlet portion casing wall pressure in the inlet of compressor inlet guide vane 7 is executed in order to detect the phenomena of stalling within the compressor and icing on the compressor inlet guide vane, and to achieve the safety operation of the gas turbine. In case the compressor inlet flow decreases, the above-mentioned compressor guide vane inlet casing wall pressure increases. For example, at stoppage of the gas turbine, a compressor inlet flow quantity becomes 0, at this time, its casing wall pressure is in the condition of atmospheric pressure which is a maximum value. With an increasing speed of the gas turbine and with an increase in the quantity of the inlet air flow, a velocity of air increases, thereby decreasing its static pressure, or its casing wall pressure drops.

The above-mentioned compressor guide vane inlet casing wall pressure is used for calculation of the compressor inlet air quantity. Both of them can be approximated in a linear function with an adequate precision being ensured in an actual extent of the gas turbine operation. Therefore, there is such an advantage that when the operational condition of compressor 1 becomes unstable, feed water can be shut off immediately only by referring to the compressor guide vane inlet casing wall pressure, without need of executing the result of calculation of the compressor inlet air quantity.

In an actual operation, the casing wall pressure detector 43 is installed in the inlet portion of compressor inlet guide vane 7, and in case where the above-mentioned compressor inlet casing wall pressure increases over the predetermined limit value for a predetermined period of time, the control unit 35 is caused to send a signal to the feed water flow regulating valve 22 to decrease the opening thereof so as to decrease the quantity of water injection. Further, in the case of exceeding the allowed value for variation, water supply may be shut off to protect the gas turbine itself. In this case, the control unit 35 sends a closing operation signal to the feed water shut-off valve 21. Alternatively, the feed water pump 20 may be stopped in emergency.

Thereby, the detectors can be easily installed, the phenomenon of icing or stalling can be easily detected and the soundness of the gas turbine can be secured.

(3) Monitoring of the compressor discharge pressure is executed in order to detect the phenomena of stalling within the compressor and icing on the compressor inlet guide vane, and achieve the safety operation of the gas turbine. When the compressor inlet flow quantity decreases, the above-mentioned compressor discharge pressure drops so long as under operation at a constant combustion temperature. A relationship between the compressor inlet air flow and the compressor discharge pressure can be approximated by a linear function with an adequate precision in the case of operation at the constant combustion temperature. Therefore, there is such an advantage that when the operational condition of the compressor 1 becomes unstable, water supply can be shut off immediately based on the compressor discharge pressure without need of executing the result of calculation of the compressor inlet air flow quantity.

In actual operation, the compressor discharge pressure detector 46 is installed in the discharge portion of compressor 1, and in case the above-mentioned compressor discharge pressure drops below the predetermined limit value within a predetermined period of time, the control unit 35 is caused to send a signal to the feed water flow regulating valve 22 to decrease its opening so as to decrease the quantity of water injection. Further, in case the allowable value of variation is exceeded, water supply may be shut off for protection of the gas turbine. In this case, the control unit 35 sends a closing operation signal to the feed water shut-off valve 21. Otherwise, the feed water pump 20 may be stopped in emergency.

Since the pressure level is high and a change in the level can be rapidly detected, the soundness of the gas turbine can be rapidly secured upon occurrence of an icing or stalling phenomenon.

(4) Monitoring of the compressor discharge temperature is executed in order to detect the phenomena of stalling within the compressor and icing on the compressor inlet guide vane, and to ensure the safety operation of the gas turbine. In case there occurs a stall or icing phenomena with an increasing water injection quantity, since the adiabatic efficiency of the compressor decreases, the compressor discharge temperature does not drop but remains constant or increases despite the increased quantity of water. Inherently, the inlet temperature of the compressor should decrease by water injection, and in addition, since the temperature of the main air stream is to be decreased by vaporization of water droplets having been introduced into the compressor, the compressor discharge temperature should drop approximately in a linear relationship with the quantity of injected water. Therefore, an instance that the compressor discharge temperature does not drop indicates that the compressor efficiency has dropped due to unstable operation within the compressor.

In actual operation, the compressor discharge temperature detector 45 is installed in the discharge portion of the compressor 1, and in case the above-mentioned compressor discharge pressure drops below the predetermined limit value within the predetermined period of time, the control unit 35 is caused to send a signal to the feed water flow regulating valve 22 to decrease its opening so as to decrease the quantity of water injection. Further, when in excess of the allowable value of variation, water supply may be shut off for protection of the gas turbine itself. In this case, the control unit 35 sends a close operation signal to the feed water shut-off valve 21. Otherwise, the feed water pump 20 may be stopped in emergency.

(5) Monitoring of the compressor adiabatic efficiency is executed in order to detect the stall phenomenon within the compressor and icing phenomenon on the compressor inlet guide vane, as well as to detect the interstage mismatching a within the compressor, and to attain the safety operation of the gas turbine. Since the compressor discharge temperature drops with an increasing quantity of water injection, apparently, the compressor adiabatic efficiency increases. However, where there occurs any stall or icing phenomena with an increased quantity of water injection, the adiabatic efficiency of the compressor decreases. Further, a subtle mismatching between interstages within the compressor which does not appear remarkably from a mere detection of the above-mentioned compressor inlet flow quantity, discharge pressure and discharge temperature, can be detected more clearly by the compressor adiabatic efficiency. The compressor discharge temperature which is simple because it does not need calculation thereof tends to be affected by a drop of the compressor discharge pressure when detecting deterioration of performance of the compressor. Therefore, there is such a case where the drop of performance of the compressor cannot be detected after all without calculation of the compressor adiabatic efficiency.

In practical application, on the basis of measurements by the compressor inlet total pressure gauge 39 and intake duct air temperature detector 36 which are installed in the upper portion of compressor intake portion 14, and by the compressor discharge temperature detector 45 and compressor discharge pressure detector 46 which are installed in the discharge portion of compressor 1, when it is found that the above-mentioned compressor adiabatic efficiency has dropped more than the predetermined limit value within the predetermined period of time, the control unit 35 is caused to send a signal to the feed water flow regulating valve 22 to decrease its opening so as to decrease the quantity of water injection. Further, in case it is in excess of the allowable value of variation, water supply may be shut off for protection of the main body of the gas turbine. In this case, the control unit 35 sends a closing operation signal to the feed water shut-off valve 21. Otherwise, the feed water pump 20 may be stopped of its operation in emergency.

Thereby, even if the atmospheric temperature changes, occurrence of icing or stalling phenomena can be detected easily, whereby the soundness of the gas turbine can be easily secured.

(6) Monitoring of gas turbine exhaust gas temperatures is executed for detection of the stall phenomenon within the compressor and the icing phenomenon on the compressor inlet guide vane, and for attainment of the safety operation of the gas turbine. Upon lowering of the compressor inlet flow quantity, the above-mentioned compressor discharge pressure drops and the gas turbine exhaust gas temperature rises so long as the operation at a constant combustion temperature is maintained. Thereby, there is such an advantage that in any case where the operating condition of compressor 1 becomes unstable, feed water can be shut off immediately with reference to the gas turbine exhaust gas temperatures.

In practical application, the gas turbine exhaust gas temperature detector 47 is installed in the gas turbine exhaust diffuser 8, and in case said exhaust gas temperature rises more than a predetermined limit value within a predetermined period of time, the control unit 35 is caused to send a signal to the feed water flow regulating valve 22 to decrease its opening so as to decrease the quantity of water injection. Further, in case in excess of its allowable value for variation, water supply may be shut off for protection of the main body of the gas turbine. In this case, the control unit 35 sends a closing operation signal to the feed water shut-off valve 21. Otherwise, the feed water pump 20 may be stopped its operation in emergency.

Monitoring of fluctuations of gas turbine exhaust gas temperatures is executed for detection of non-uniform distribution of water droplets having been introduced into the compressor in the circumferential direction thereof, unstable operation of the combustor and for attainment of the safety operation of the gas turbine. In the case of non-uniform distribution of the compressor inlet temperatures, and non-uniform distribution of water droplets having been introduced into the compressor in the circumferential direction thereof, since there occur variations in quantities of air and steam to be supplied to the combustor, stable operation of the combustor is disturbed, and it appears as a variation in turbine inlet temperatures, that is, as an increased fluctuation in the exhaust gas temperatures.

In practical application, with reference to the gas turbine exhaust gas temperature detector 47 installed in the gas turbine exhaust diffuser 8, when a deviation of the exhaust gas temperature exceeds the predetermined limit value, the control unit 35 sends a signal to the feed water flow regulating valve 22 to decrease its opening so as to decrease the quantity of water injection. Further, in case in excess of the allowable value for variation, water supply may be shut off for protection of the main body of the gas turbine. In this case, the control unit 35 sends a closing operation signal to feed water shut-off valve 21. Otherwise, the feedwater pump 20 may be stopped immediately.

Thereby, upon occurrence of icing or stalling phenomena, they can be rapidly detected, so that the soundness of the gas turbine can be rapidly secured.

(7) Monitoring of bearing vibrations is executed for detection of non-uniformities of compressor inlet air quantities and water droplets having been introduced into the compressor in the circumferential directions thereof due to the stall phenomena within the compressor or the icing phenomena on the compressor inlet guide vane, and for attainment of the safety operation of the gas turbine. When there occurs a stalling phenomenon, even if it is a rotating stall such as to induce forced vibrations on the compressor blades, or a stall flutter to induce a self oscillation of compressor blades, it causes vibration levels of the rotating body to increase. Therefore, there is such an advantage that when the operational state of compressor 1 becomes unstable, water supply can be shut off immediately responsive to the bearing vibrations.

In practical operation, the bearing vibration detector 42 is provided on the compressor frontal bearing 6, and bearing vibration detector 52 is provided on the turbine exhaust side bearing 9, and when a vibration value of said bearings rises in excess of a predetermined limit value, the control unit 35 is caused to send a signal to the feed water flow regulating valve 22 to decrease its opening so as to decrease the quantity of water injection. Further, when an allowable value for variations is exceeded, water supply may be shut off for protection of the main body of gas turbine. In this case, the control unit 35 sends a closing operation signal to the feed water shut-off valve 21. Otherwise, the feed water pump 20 may be stopped immediately.

Thereby, partial occurrence of icing or stalling phenomena can be directly detected. The soundness of the gas turbine can be secured against such phenomena.

(8) Monitoring of metal temperatures of the thrust bearings is executed for detection of changes in thrust forces in axial directions of the compressor and the turbine caused by water injection, and for attainment of the safety operation of the gas turbine. By water injection, an interstage work distribution within the compressor is caused to deviate from its original state of the design. Therefore, a balance between thrust forces in axial directions of the compressor and the turbine is disrupted, thereby causing a surface pressure on the thrust bearing to increase, and thereby causing the metal temperature of the bearing likely to increase.

In actual operation, the metal temperature detector 41 is installed on the thrust bearing 5, and when the thrust bearing metal temperature rises more than a predetermined limit value, the control unit 35 is caused to send a signal to the feed water flow regulating valve 22 to decrease its opening so as to decrease the quantity of water injection. Otherwise, when in excess of an allowable value for variation, water supply may be shut off for protection of the main body of gas turbine. In this case, the control unit 35 sends a closing operation signal to the feed water shutoff valve 21. Otherwise, the feed water pump 20 may be stopped of its operation immediately. Unbalance between the compressor 1 and the turbine 3 can be surely detected, so that the soundness of the gas turbine can be surely secured.

(9) Monitoring of fluctuations in compressor wall pressures is executed for detection of stalling phenomena within the compressor and for achievement of the safety operation of the gas turbine. It is difficult to discriminate, when its atmospheric condition corresponds to regions 2 or 3 in FIG. 6 described with reference to the second embodiment of the invention, whether it is a stall phenomenon or an icing phenomenon simply from a compressor inlet air quantity, a compressor inlet guide vane inlet casing wall pressure, a compressor discharge pressure, a discharge temperature, a compressor adiabatic efficiency, and a gas turbine exhaust gas temperature. Further, in such a case where there are many stall regions, and in addition, these stall regions are disposed uniformly in the circumferential directions, they may not appear clearly as bearing vibrations. Upon occurrence of a stall phenomenon, and when it is such a forced vibration on compressor blades due to rotating stall, since its stall region is caused to shift toward the circumferential direction, a pressure fluctuation involved in the stall can be detected directly.

In actual operation, the compressor wall pressure variation detection pressure sensor 44 is installed in an intermediate stage of the compressor 1, and when a fluctuation value of the compressor wall pressure rises more than a predetermined limit value, the control unit 35 is caused to send a signal to the feed water flow regulating valve 22 to decrease its opening. Otherwise, when in excess of an allowable value for variations, water supply may be shut off for protection of the main body of gas turbine. In this case, the control unit 35 sends a closing operation signal to the feed water shut-off valve 21. Otherwise, the feed water pump 20 may be stopped in emergency.

Since the stalling phenomenon can be directly detected, the soundness of the gas turbine can be surely secured.

(10) Monitoring of discharge temperatures of the compressor at a plurality of points is executed for detection of non-uniformities of the compressor inlet air quantities and water droplets having been introduced into the compressor in the circumferential directions thereof due to icing phenomena on the compressor inlet guide vane, and for attainment of the safety operation of the gas turbine. Merely from a compressor inlet temperature alone, it is difficult to detect a circumferential distribution of the water droplets having been introduced into the compressor. Further, as a means for detecting circumferential non-uniformities within the compressor, this method is more direct than by the gas turbine exhaust gas temperature and the bearing vibration.

In actual operation, a plurality of compressor discharge portion temperature detectors 45 are installed uniformly in the circumferential direction on a same plane in the discharge portion of the compressor 1, and when a variation in temperatures of the compressor discharge temperature detectors rises more than a predetermined limit value, the control unit 35 is caused to send a signal to the feedwater flow regulating valve 22 to decrease its opening so as to decrease the quantity of water injection. Further, when in excess of an allowable value of variations, water supply may be shut off for protection of the main body of gas turbine. In this case, the control unit 35 sends a closing operation signal to the feedwater shut-off valve 21. Otherwise, the feedwater pump 20 may be stopped of its operation immediately in emergency.

Thereby, an icing or stalling phenomenon which occurs partially can be suitably detected.

Figure 17A:
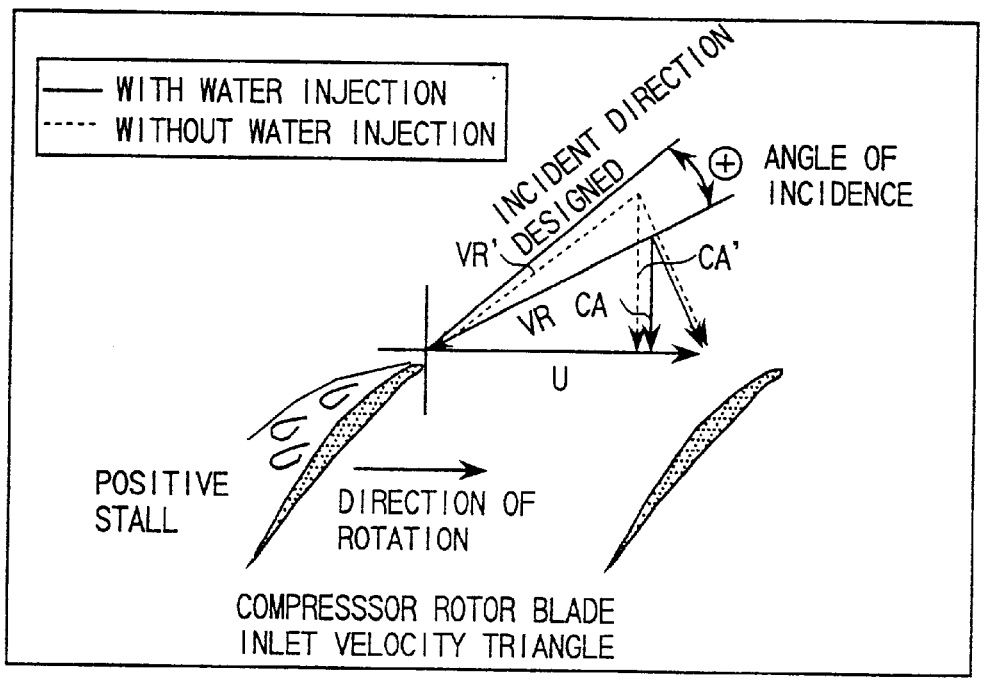
FIG. 17A is a diagram indicating a change in velocity triangles of a compressor rotor blade due to injection of water droplets into the compressor.
Figure 17B:
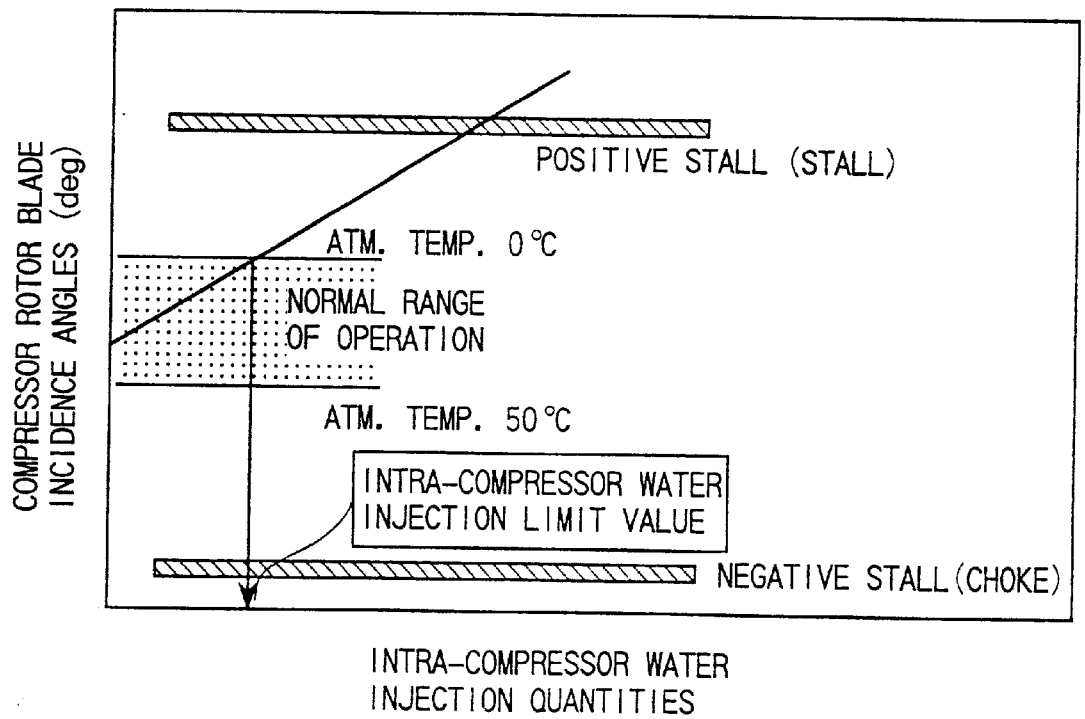
FIG. 17B is a diagram indicating a change in incident angles of the compressor rotor blade with respect to a quantity of water droplets to be injected into the compressor.

(11) Mismatching within the compressor is detected based on an axial flow velocity at the compressor final stage, thereby executing a safety operation of the gas turbine. FIG. 17A depicts each velocity triangle on compressor rotor blades in presence and absence of water injection in the upper stream of the compressor. FIG. 17B depicts a relationship of incident angles of the compressor rotor blades versus quantities of water droplets introduced into the compressor.

The water droplets having been introduced into the compressor are vaporized therein, absorbing heat from ambient main air stream, and lowering the temperature of the main air stream, thereby resulting in a reduced volume flow rate of air. This reduced volume flow rate means that the axial flow velocity of the main air flow is reduced, and its effect appears most significantly in the final stage of the compressor. When the axial flow velocity drops, an incident angle of a rotor blade in the inlet of compressor rotor blades becomes large as indicated in FIG. 17A, thereby tending easily to cause a positive stall thereof. When a stall occurs, a substantial drop in the compressor efficiency results in, and in addition, a possible damage of the blade due to stall flutter is feared to take place, therefore, this occurrence must be avoided always in the practical operation.

Therefore, a limit value for an allowable region in which the incident angle of the compressor rotor blades is allowed to change is set up, and it is ensured that the changes of its incident angle are restricted within a range of incident angles which is applicable corresponding to changes of atmospheric temperatures under normal operation. In normal operation of the compressor, when an incident angle of a compressor rotor blade in the rear stage thereof becomes maximum is when its atmospheric temperature becomes lowest. In this embodiment of the invention depicted in FIG. 17B, an incident angle at 0° C. of atmospheric temperature is defined to be a limit value for the time of water injection. The axial velocity within the compressor may be calculated at any stage thereof. However, since the mismatching is most likely to occur in the final stage thereof, the final stage is selected in this embodiment.

Figure 18:
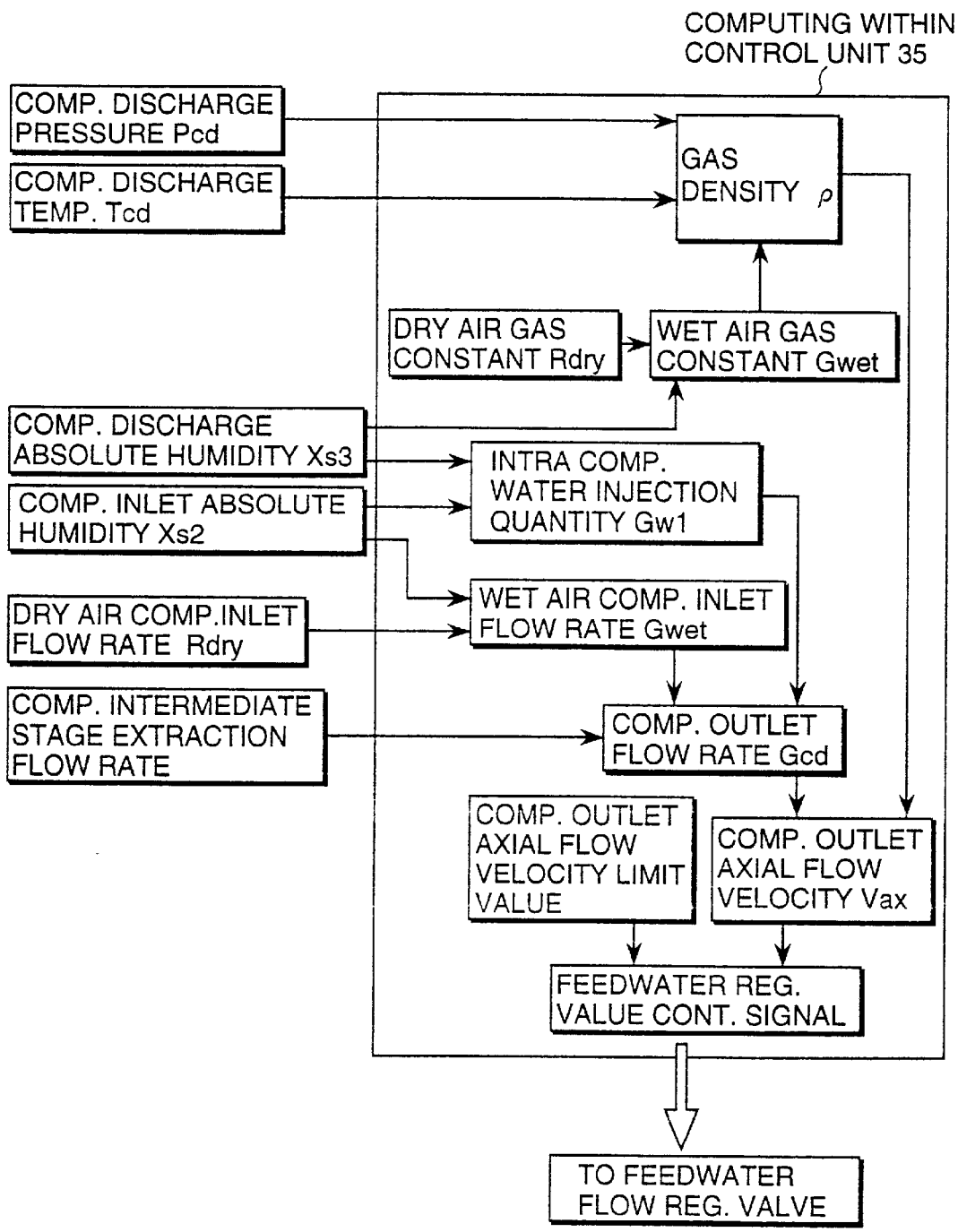
FIG. 18 is a block diagram indicating a method for calculating an axial velocity at the final stage of the compressor for the purpose of water quantity limitation.

FIG. 18 indicates a control unit for detecting a mismatching in the final stage of the compressor by detecting an axial flow velocity at the compressor final stage, and controlling a water spray quantity of the spray nozzle 17 on the basis of the detected value.

The incident angle depicted in FIG. 17B may be considered to be determined approximately by its axial flow velocity alone provided that the number of revolutions is constant at its rated value. Therefore, the quantity of water is controlled such that the axial flow velocity of the final stage of the compressor is ensured not to drop below the predetermined limit value, namely, for example, the axial flow velocity at 0° C. of atmospheric temperature under normal operation. Instead of the axial flow velocity of the final stage of the compressor, a calculated incident angle or flow efficiency may be used for control of the water quantity. In any case of the above methods, calculation of the axial flow velocity becomes necessary.

The axial flow velocity at the final stage of the compressor is calculated on the basis of a compressor outlet flow quantity Gcd, a compression outlet gas density ρ, and a compressor outlet annulus area. The compressor outlet annulus area among them is a constant value which is determined by dimensions of each type of machines, therefore, it is only required to calculate compressor outlet flow quantity Gcd and compression outlet gas density ρ.

Compression outlet gas density ρ can be calculated if a pressure, temperature and gas constant at the outlet of the compressor are known. As its pressure and temperature, detected values of compressor discharge pressure Pcd and compressor discharge temperature Tcd may be used. As for gas constant Rwet, since components of the compressor outlet gas slightly differ from components of inlet dry air due to vaporization of water droplets within the compressor, gas constant Rwet may be obtained by compensating gas constant Rdry of dry air with absolute humidity Xs3 of the compressor discharge air. Further, in case a ratio of the quantity of water injection relative to the compressor inlet air flow is small, since its gas constant is less influenced, gas constant Rdry of the dry air may be used without correction of humidity to simplify the calculation.

Compressor outlet flow quantity Gcd is calculated by adding water droplet quantity Gw1 having been vaporized within the compressor to compressor inlet wet-state air quantity Gwet. This is because that since the entire portion of the water droplets having been introduced into the compressor will be fully vaporized while flowing down to the outlet portion of the compressor, in order to calculate an axial flow velocity at the final stage of the compressor, it becomes necessary to take into account an increase in its working gas flow quantity due to vaporized wet contents. Further, in the case where extraction of the gas from the intermediate stage of the compressor is executed for use of cooling the turbine blades, sealing the bearing and the like, an extracted amount of the gas is subtracted.

Water droplet quantity Gw1 having been vaporized within the compressor refers to the intra compressor water droplet injection quantity described in the fourth embodiment of the invention, which is calculated in the same manner as in the fourth embodiment. Further, this may be substituted by the effective water injection quantity described in the third embodiment of the invention, or an indication by water flowmeter 23 may be used directly for simplification.

Since a compressor inlet air flow to be calculated by a normal measuring instrument is in a dry-state, wet-state compressor inlet air quantity Gwet is calculated by compensating for a slight difference in gas components due to vaporization of water droplets within the compressor. For this compensation, absolute humidity Xs2 between the bottom stream of the compressor water injection unit and the upper stream of the compressor is detected, and wet-state compressor inlet flow quantity Gwet is calculated using a specific gravity of the wet air. In order to simplify its calculation, a dry-state compressor inlet flow quantity Gdry may be used as it is without compensation.

The control unit 35 calculates an axial flow velocity at the final stage of the compressor from compressor outlet flow quantity Gcd and compressor outlet gas density ρ which have been calculated, then, in the case where its axial flow velocity is lowered more than a predetermined limit value, the control unit 35 sends a signal to the feedwater flow regulating valve 22 to decrease its opening so as to reduce the quantity of water injection. Further, when in excess of an allowable value for variations, water supply may be shut off for protection of the main body of gas turbine. In this case, the control unit 35 sends a closing operation signal to the feedwater shut-off valve 21. Otherwise, the feedwater pump 20 may be stopped of its operation in emergency.

Monitoring of the quantity of drain at the inlet portion of the compressor is executed to prevent an overflow of drain into the compressor when by any reason the drain within the intake duct fails to be discharged, and to ensure the safety operation of the gas turbine and avoidance of wear or erosion of compressor blades.

In the case where the intake duct 13 in the upstream side of the gas turbine's compressor is located in the upper direction as indicated in FIG. 14, if the drain outlet valves 53, 54 in a drain discharge system are closed by malfunction or the like, a level of drain in the compressor intake portion will rise as high as it overflows into the compressor unless some measure is taken. If drain is allowed to overflow into the compressor, it may cause a serious problem such as wear of the compressor blades, unstable operation of the compressor, an increased combustion vibration, a blow-off of flame in the combustor, increased bearing vibrations and the like, and thereby resulting in a failure which damages the gas turbine itself.

An example of drain detection according to the invention is depicted in FIG. 14. In the bottom portion of the compressor intake portion, a drain discharge hole is provided, and a drain outlet pipe 50 is provided with a drain slant to easily discharge the drain. The drain having been discharged is recovered in a drain groove. Drain level detector pipe 49 erecting vertically from drain outlet pipe 50 is provided with a level switch 48. When the drain level rises above a predetermined limit value, the control unit 35 is caused to send a signal to the feed water flow regulating valve 22 to decrease its opening so as to decrease the quantity of water injection. Further, when in excess of an allowable value of variations, water supply may be shut off for the protection of the main body of gas turbine. In this case, the control unit 35 sends a close operation signal to the feed water shut-off valve 21. Otherwise, the feedwater pump 20 may be stopped in emergency.

A tenth embodiment of the invention will be described with reference to FIGS. 1, 19 and 20.

Control unit controls so as to increase a fuel injection quantity to the combustor 2 when water spray quantity from the spray nozzle is more than when small.

Figure 19:
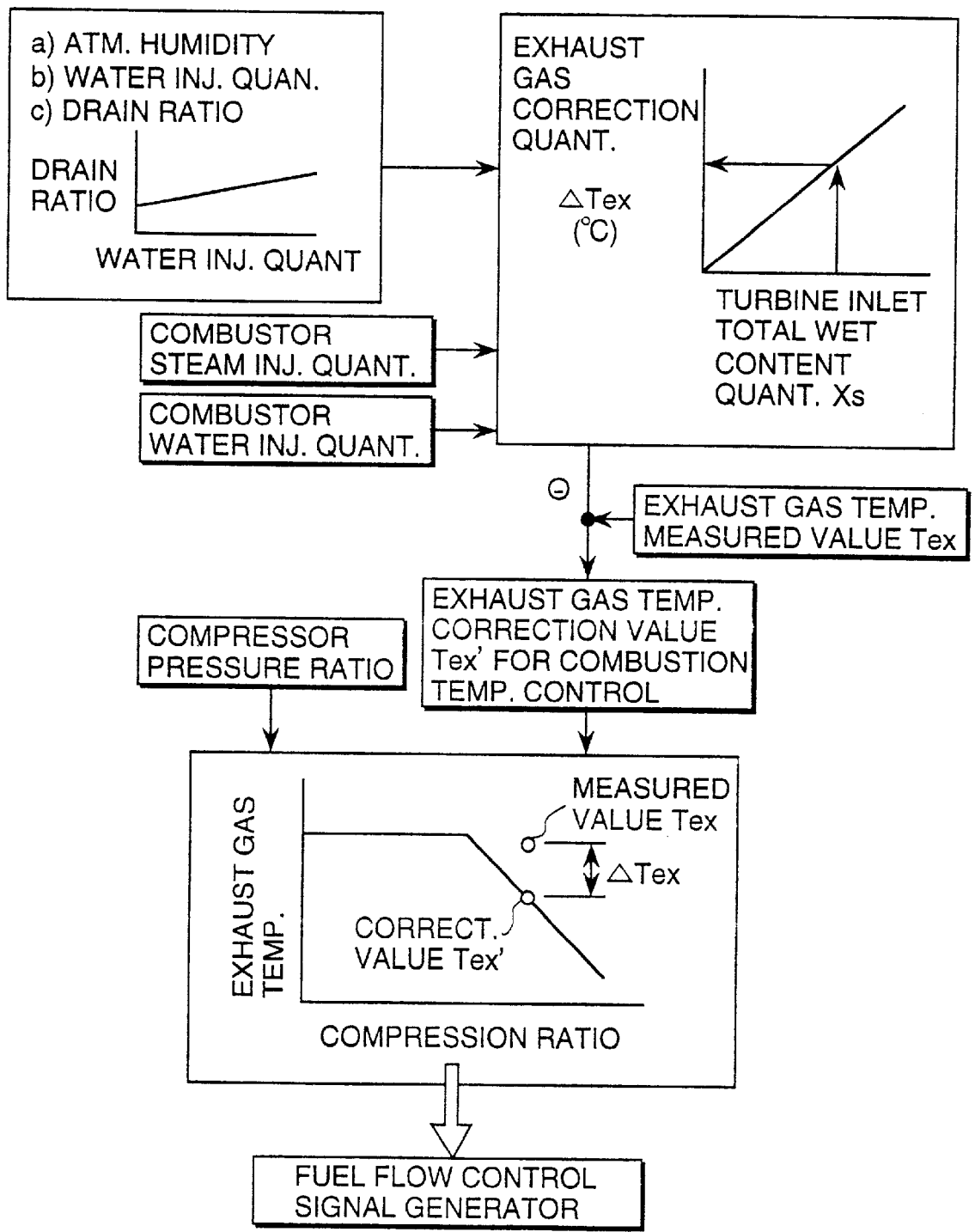
FIG. 19 is a schematic control block diagram indicating a control controlling fuel injection quantities into a combustor.

FIG. 19 shows an example of detecting the humidity of air supplied to the compressor and a water spray quantity of the spray nozzle 17, and controlling (or compensating) a fuel injection quantity to the combustor 2 based on the detected values. FIG. 20 shows an example of detecting the compressor discharge humidity and controlling (or compensating) a fuel injection quantity to the combustor 2 based on the detected values. A gas turbine exhaust gas temperature according to the absolute humidity of compressor and steam or water spray quantity of the combustor is compensated. By changing of setting an exhaust gas temperature control line to be higher or by compensating an exhaust gas measurement value, a fuel injection quantity is increased.

It is normal for the gas turbine under a rated load to be operated at a constant combustion temperature. However, a direct measurement of a combustion temperature is difficult since its combustion temperature is extremely high. Therefore, a gas turbine exhaust gas temperature is measured instead of direct measurement of the combustion temperature. In order to maintain the combustion temperature at a constant value, an exhaust gas temperature control line related to compressor discharge pressures or compressor compression ratios is predetermined, and a quantity of fuel flow is controlled so that measured values are on the control line. In a gas turbine of such a type wherein water injection is carried out in the upstream side of its compressor, an absolute humidity of air discharged from the compressor increases more than normal due to vaporization of water within the intake duct 13 and compressor 1, thereby resulting in a change of components of the turbine inlet gas due to its increased moisture component, and thereby changing a ratio of specific heat of the gas serving as a working medium within the turbine. In this case, although an effect of its added moisture content on the turbine efficiency is small, a drop in the ratio of specific heat due to the changes in the gas components becomes predominant, and an attempt to maintain the combustion temperature constantly results in an increase in its exhaust temperature.

Therefore, in actual operation of the gas turbine, if the same exhaust temperature control line is used irrespective of a difference in ratios of specific heat, operation at a combustion temperature lower than a design value occurs when its moisture content in the inlet of the turbine becomes large, thereby preventing the utmost utilization of the output improvement effect of the invention from being demonstrated.

Therefore, a control is executed so as to increase an inection quantity of fuel into the combustor 2 when a water injection quantity from the spray nozzle is larger than when small.

Figure 20:
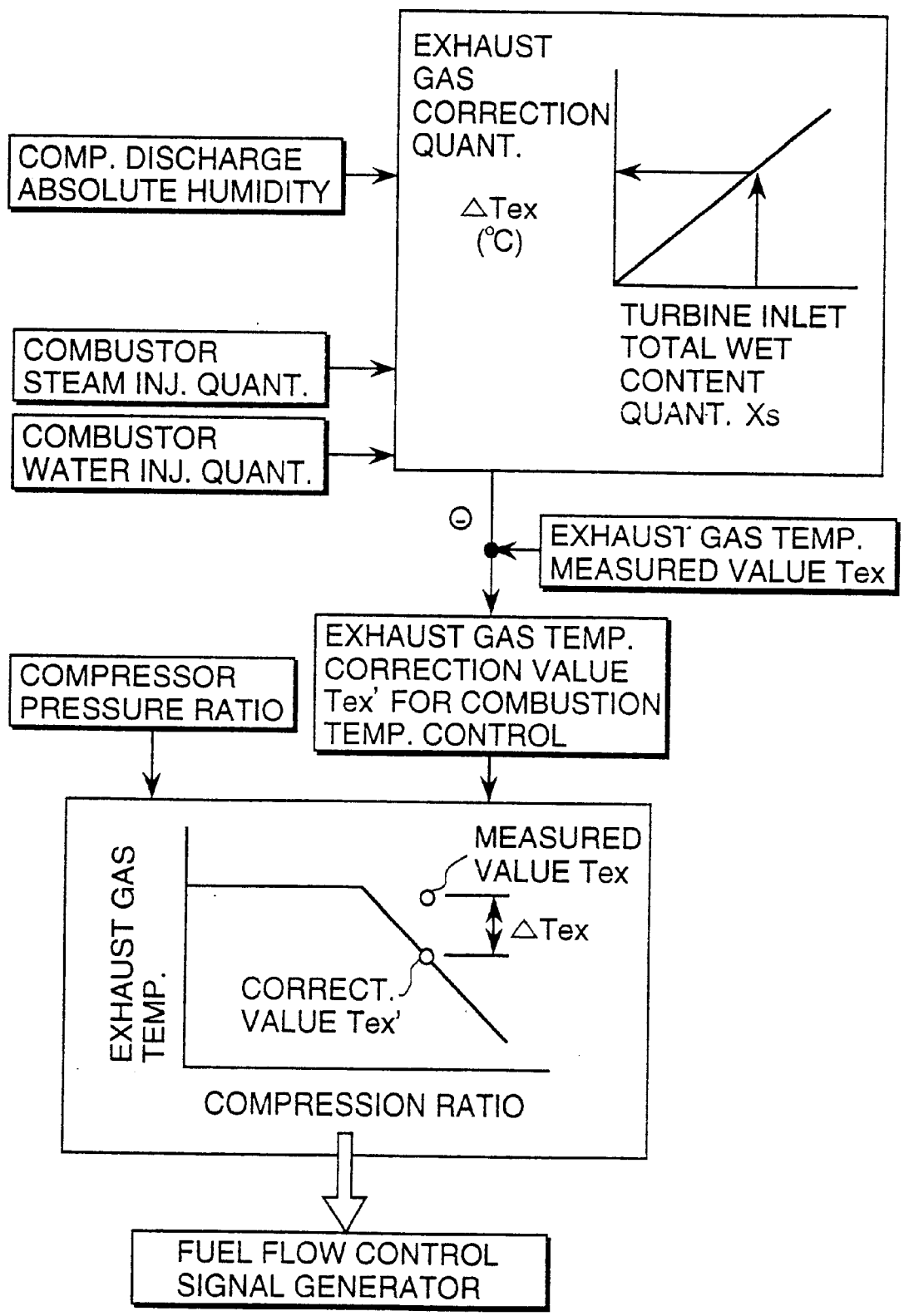
FIG. 20 is a schematic control block diagram indicating a control controlling fuel injection quantities into a combustor.

Therefore, as indicated in FIG. 20, by measuring an absolute humidity of a discharged air from the compressor, an exhaust gas temperature correction quantity is calculated corresponding to a change in combustion temperatures depending on its moisture content. By subtracting the above-mentioned exhaust gas temperature correction quantity from an actual exhaust gas temperature having been measured, an exhaust gas temperature correction value for use in the control of combustion temperatures is calculated. Thereby, it becomes possible to operate the gas turbine at a constant combustion temperature for any quantity of water injection, thereby achieving a maximum output argumentation effect.

Further, depending on a type of combustor, a steam injection or water injection is executed for its combustor in order to reduce NOx. Also in this case, its wet content in the inlet of the turbine increases, thereby changing a ratio of specific heat of the gas serving as the working medium in the turbine, and when an attempt is made to maintain its combustion temperature at a constant value, its exhaust temperature increases. Therefore, by calculating a net absolute humidity at the turbine inlet from a sum of a steam or water injection quantity to the combustor and an absolute humidity of compressor outlet air, then, an exhaust gas temperature correction quantity corresponding to a change in combustion temperatures resulting from its wet content is calculated. By subtracting the above-mentioned exhaust gas temperature correction quantity from an actual exhaust gas temperature having been measured, an exhaust gas temperature correction value for use for controlling combustion temperatures is calculated. Thereby, it becomes possible to operate the gas turbine at a constant combustion temperature for any quantity of water injection into the compressor, and for any quantity of steam or water injection into the combustor, thereby achieving a maximum output argumentation effect.

Further, the exhaust gas temperature control line may be corrected instead of correction of measured exhaust gas temperatures.

A detection means for absolute humidities of compressor discharge air may be the same as in the third embodiment. Further, the moisture content in the gas flowing into the combustor may be calculated as shown in FIG. 19, instead of the direct detection of the absolute humidity of the compressor discharge air, from an absolute humidity of the atmosphere under operational conditions and an effective water injection quantity. In this case, calculation of the effective water injection quantity is executed in the same manner as in the third embodiment of the invention.

An eleventh embodiment of the present invention will be described, referring to FIGS. 1, 21A and 21B.

The present embodiment, basically, may have a similar construction to that of the first embodiment. In addition to the construction, a detector for detecting NOx concentration is provided on the exhaust flow passage of the turbine 3.

By detecting NOx concentration, a water spray injection quantity from the spray nozzle 17 is controlled not to exceed a limit value. An example of the control is indicated in FIG.

Figure 7:
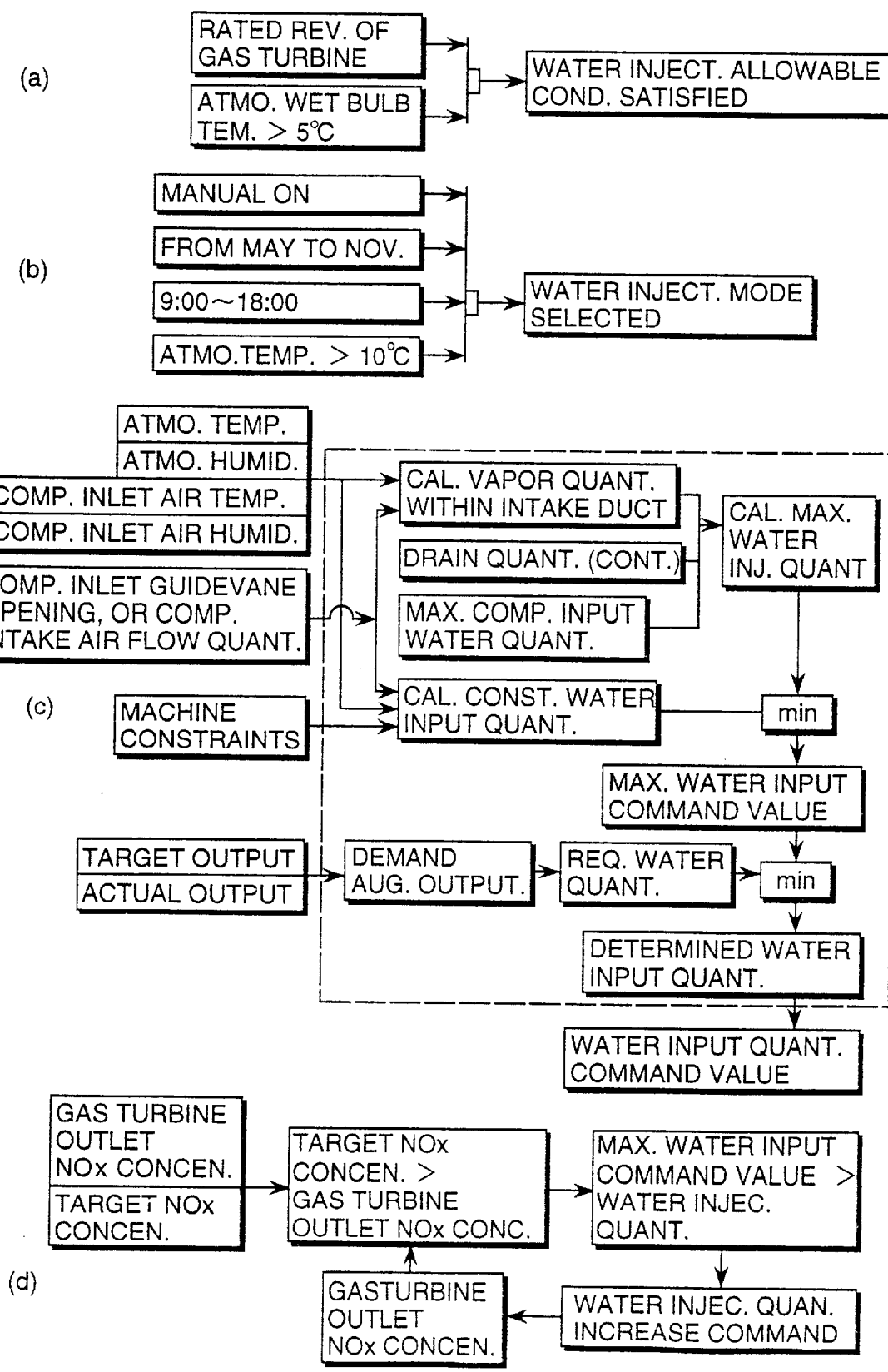
FIG. 7 is a block diagram indicating the control contents of an embodiment of the invention.

7-*d*. In FIG. 7-*d*, when the NOx concentration at the gas turbine inlet is higher than a target NOx concentration, water spray is injected to decrease the NOx concentration to the target value. In this case, a water spray injection quantity is within a range which is lower than a maximum water injection instruction value of FIG. 7-*c*.

Water spray injection increases a humidity of a compressor discharge air which is a combustion air for the combustor, and has the same effect as a NOx decreasing effect due to an increase of humidity which is caused by water or steam injection into the combustor. However, the method of water spray infection into the compressor lowers an air temperature within the intake air duct and is able to increase an output of the gas turbine by decreasing a power for the compressor.

Further, as compared with the above-mentioned NOx emission reduction executed by the water or steam injection into the combustor, in the present embodiment, a gas that water and air inside the combustor are homogeneously mixed flows in the combustor, so that a mixing condition of water and air is better. Therefore, NOx emission can be reduced with simple construction, suppressing combustion vibrations and maintaining a stable combustion.

Figure 21A:
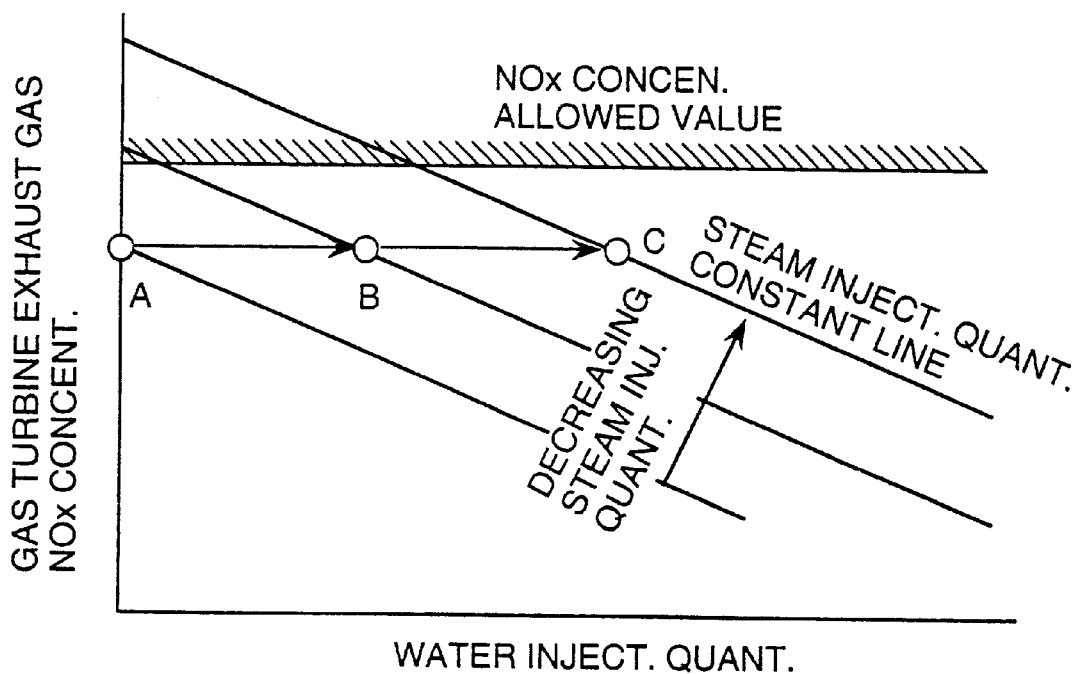
FIG. 21A is a diagrams indicating relationships of gas turbine exhaust gas NOx concentrations and water injection quantities in the compressor inlet.
Figure 21B:
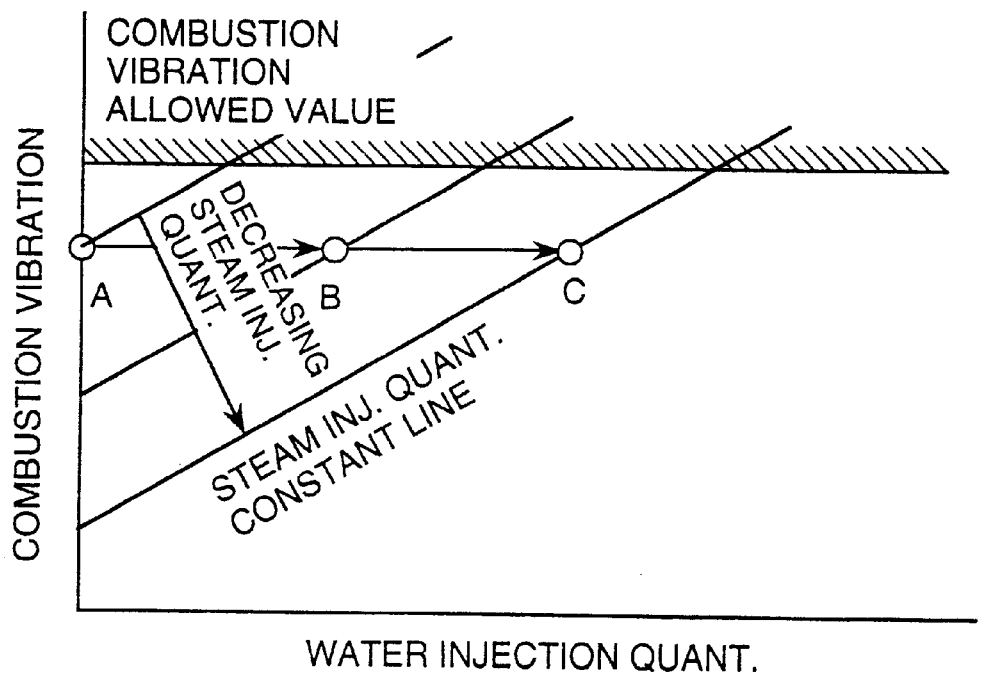
FIG. 21B is a diagrams indicating relationships of combustion vibrations and water injection quantities in the compressor inlet.

Further, In addition to the water spray injection by the spray nozzle 17, a case where a mechanism for injecting steam into the combustor is provided is shown in FIGS. 21A and 21B.

FIG. 21A indicates a relationship between water injection quantities and NOx concentrations in gas turbine's exhaust gas, and FIG. 21B indicates a relationship between water injection quantities and combustion vibration.

In FIGS. 21A and 21B, an operational condition with zero quantity of water injection in the upper stream of the compressor is defined to be at point A. When a quantity of steam or water injection into the combustor is constant, and when the quantity of water injection in the upstream side of the compressor is increased, a NOx concentration in the exhaust gas from the gas turbine decreases, however, combustion vibrations of the combustor increase. Therefore, the control unit 35 is caused to send a signal to the feedwater flow regulating valve 22 to decrease its opening and reduce the quantity of water injection so that the NOx concentration and combustion vibrations will be within allowable values, respectively.

Otherwise, in order to hold the combustion vibrations to constant while increasing the quantity of water injection in the upstream side of the compressor, the quantity of steam or water injection into the combustor may be reduced. However, there exists a contradicting relationship that reduction of the quantity of steam and water injection into the combustor will increase NOx concentration in the gas turbine's exhaust gas. Therefore, by monitoring both the above-mentioned combustion vibrations and the NOx concentration in the exhaust gas, and suppressing both of them within their allowable values, the quantity of steam and water injection into the combustor is controlled such that the point of operation in FIG. 21A, 21B is caused to shift from point A to point B, then to point C with an increasing quantity of water injection.

A twelfth embodiment of the invention will be described hereunder, referring to FIGS. 1, 22A and 22B.

In this embodiment, a control is executed so as to change a premixed ratio of the gas turbine according to a time of water spray injection of a large quantity and a time of water spray injection of a small quantity. The control is executed so as to increase a ratio of diffusion combustion when the water spray injection is larger than when small.

The present embodiment, basically, may have a similar construction to that of the first embodiment. In addition to the construction, a detector for detecting NOx concentration is provided on the exhaust flow passage of the turbine 3, and signals are input into the control unit 35. Further, combustion vibrations are detected and the signal is input into the control unit 35. For example, under the normal operational condition after starting has been completed, the control unit 35 controls so that a diffusion combustion ratio becomes more at the time of water spray injection than at the time of water injection stoppage so as to decrease a NOx emission quantity, preferably to suppress combustion vibrations in addition thereto. Further, the control is executed so as to increase the diffusion combustion ratio when a water injection quantity is larger when small.

Figure 22A:
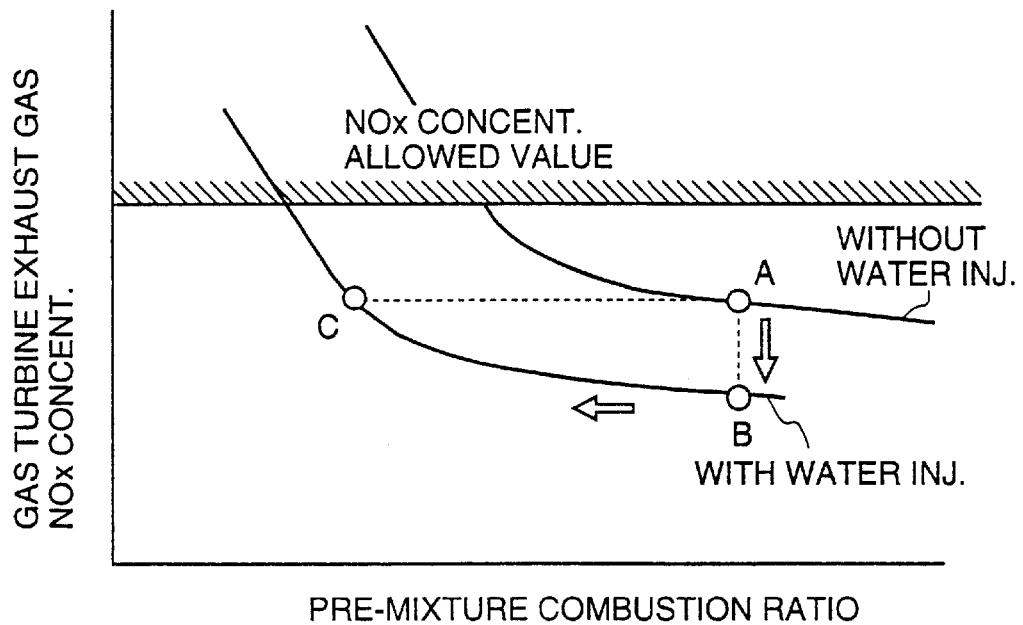
FIG. 22A is a diagrams indicating a relationship of gas turbine exhaust gas NOx concentrations and premixture combustion ratios in the combustor.
Figure 22B:
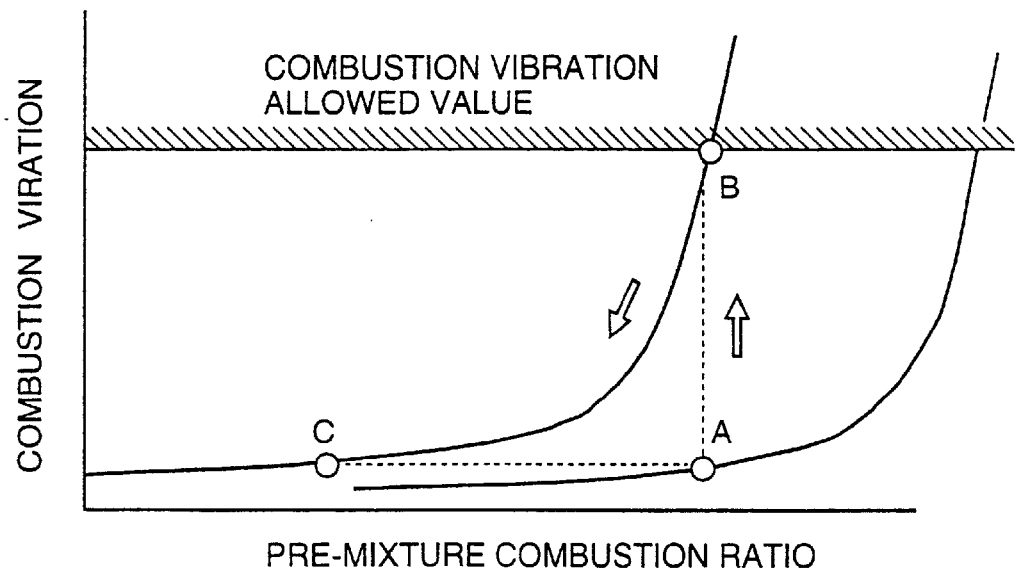
FIG. 22B is a diagrams indicating a relationship of combustion vibrations and premixture combustion ratios in the combustor.

FIG. 22A indicates a relationship of combustor's premixture combustion ratios versus gas turbine exhaust gas NOx concentrations, and FIG. 22B indicates a relationship of the premixture combustion ratios versus combustion vibrations.

When a gas fuel such as a liquidified natural gas or the like is used as a fuel for the combustor, the premixture combustion and diffusion combustion are used in combination generally. When its premixture combustion ratio is increased with an increasing load of the gas turbine, its gas turbine exhaust gas NOx concentration is caused to drop, however, there exists a point of operation where its combustion vibration increases. Therefore, in actual operation of the gas turbine, an optimal premixture combustion ratio is set at which both the exhaust gas NOx concentration and the combustion vibration can be suppressed within their allowable values. Normal point of operation in the gas turbine is indicated by point A in FIG. 22A, 22B. However, in the case where water injection is conducted in the upstream side of the compressor, the combustion vibration tends to occur more easily than in normal operation under the same premixture combustion ratio, thereby shifting its point of operation to point B. Therefore, in order to suppress its combustion vibration to the same level as point A of the normal operating point of the gas turbine, it becomes necessary to decrease its premixture combustion ratio and to increase its diffusion combustion ratio. However, when its premixture combustion ratio is decreased too small, the exhaust gas NOx concentration will increase.

Therefore, its premixture combustion ratio is decreased to operating point C at which both of the combustion vibration and the exhaust gas NOx concentration are ensured to be suppressed within their allowable values.

Fluid conditions change greatly by whether or not water spray injection is conducted and by variations in water injection quantities. However, according to the present embodiment, it is possible to cause the gas turbine to operate at a high output while maintaining the soundness of the plant by suppressing the combustion condition to come into instability and suppressing variations in NOx concentration and combustor pressure.

Water spray injection quantities or water droplet atomizing air quantities on the upstream side of the compressor are approximately in proportion with supply pressures of water or atomizing air.

From the characteristics of the spray nozzle 17, a water spray injection quantity and water supply pressure, and atomizing air quantity and air supply pressure can be determined univocally. However, in case where the spray nozzle 17 is choked, an opening area reduces, so that in order to inject the same water spray quantity, the supply pressure becomes higher. In an actual operation, it is impossible to monitor choking of the spray nozzle by eyes during continuous operation, a choking rate of the spray nozzle is calculated on the basis of deviations of supply pressure from the designed value. It is preferable to exchange the spray nozzle with another in case the choking rate exceeds a predetermined allowable value of choking rate.

Referring to FIG. 14, a drain preventing apparatus for pressure detection piping is explained.

Of the pressure detecting piping around the gas turbine main body, the following needs the drain preventing means, that is, a compressor inlet total pressure pipe 39 installed on an upper portion of the compressor intake portion 14, a wall pressure detector 43 of a casing of the inlet of the compressor inlet guide vane 7, and a compressor discharge pressure detector 46 at the discharge portion of the compressor 1. In FIG. 14, only the compressor inlet total pressor pipe 39 is shown. The measuring piping 67 has a drain gradient so as to prevent drain from remaining on the way, and it is provided with a drain recovery tank 69 at the lower portion thereof. The measuring piping 67 and 68 are connected to an upper portion of the drain recovery tank 69. The measuring piping 68 connects the drain recovery tank 69 to a pressure transducer 71. A drain discharge valve 70 is provided on the lower portion of the drain recovery tank 69. This embodiment also is applied for the humidity detection piping 59 at the compressor inlet and the humidity detecting piping 60 for compressor discharge air.

According to the present invention, a gas turbine and a control unit which are able to improve both output and thermal efficiency by water spray injection into the intake air introduced into the compressor inlet, along a practical operational control method can be provided.

What is claimed is:

1. A gas turbine having a compressor for compressing air supplied thereto and discharging the compressed air, a combustor for combusting the compressed air from said compressor and a fuel and a gas turbine to be driven by a combustion gas from said combustor, comprising:

a water injection unit, arranged at an upstream side of said compressor and constructed so that water droplets are sprayed into the air to be supplied to the compressor to decrease the temperature of the air to be supplied into said compressor to a temperature lower than an atmospheric temperature and the sprayed water droplets introduced into said compressor with the air having been decreased in temperature are evaporated during passage through said compressor, said injection unit having a water supply system, an air supply system and a spray nozzle for being supplied with water and air from said water supply system and said air supply system and spraying water droplets; and a controlling unit for controlling the air supply quantity so that a ratio of air to the water supplied to said spray nozzle becomes larger than that at time of rated operation, when said water droplets are smaller than those at the time of rated operation.

2. A gas turbine having a compressor for compressing air supplied thereto and discharging the compressed air, a combustor for combusting the compressed air from said compressor and a fuel and a gas turbine to be driven by a combustion gas from said combustor, comprising:

a water injection unit, arranged at an upstream side of said compressor and constructed so that water droplets are sprayed into the air to be supplied to the compressor to decrease the temperature of the air to be supplied into said compressor to a temperature lower than an atmospheric temperature and the sprayed water droplets introduced into said compressor with the air having been decreased in temperature are evaporated during passage through said compressor, said injection unit having a water supply system, an air supply system and a spray nozzle for being supplied with water and air from said water supply system and said air supply system and spraying water droplets; and a controlling unit for controlling the air supply quantity to be supplied to said spray nozzle so that a ratio of the air supply quantity to the water supply quantity is maintained constant at the ratio at time of rated operation, when said water droplet supply quantity is smaller than that at the time of rated operation.

\* \* \* \* \*